US012218334B2

(12) United States Patent  
Wu et al.

(10) Patent No.: US 12,218,334 B2  
(45) Date of Patent: Feb. 4, 2025

(54) POTASSIUM SECONDARY BATTERY

(71) Applicant: Ohio State Innovation Foundation, Columbus, OH (US)

(72) Inventors: Yiying Wu, Columbus, OH (US); Neng Xiao, Columbus, OH (US); William McCulloch, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 153 days.

(21) Appl. No.: 16/959,937

(22) PCT Filed: Jan. 2, 2019

(86) PCT No.: PCT/US2019/012079  
§ 371 (c)(1),  
(2) Date: Jul. 2, 2020

(87) PCT Pub. No.: WO2019/013608  
PCT Pub. Date: Jul. 11, 2019

(65) Prior Publication Data  
US 2021/0210812 A1  Jul. 8, 2021

Related U.S. Application Data

(60) Provisional application No. 62/670,673, filed on May 11, 2018, provisional application No. 62/613,294, filed on Jan. 3, 2018.

(51) Int. Cl.  
*H01M 12/08* (2006.01)  
*H01M 4/38* (2006.01)  
(Continued)

(52) U.S. Cl.  
CPC ......... *H01M 12/08* (2013.01); *H01M 4/381* (2013.01); *H01M 4/8605* (2013.01); *H01M 4/8673* (2013.01); *H01M 4/9016* (2013.01); *H01M 10/0564* (2013.01); *H01M 10/0568* (2013.01); *H01M 12/02* (2013.01);  
(Continued)

(58) Field of Classification Search  
None  
See application file for complete search history.

(56) References Cited

U.S. PATENT DOCUMENTS

2008/0026296 A1* 1/2008 Bowden ............ H01M 10/0569  
429/231.95  
2012/0145558 A1 6/2012 Schierle-Arndt et al.  
(Continued)

OTHER PUBLICATIONS

Zhou, Xiaoxi et al. Recent research progress in non-aqueous potassium-ion batteries. Sep. 11, 2017, PCCP, pp. 26495-26506 (Year: 2017).*  
International Search Report and Written Opinion of the International Searching Authority on PCT/US2019/012079 dated Mar. 15, 2019 (8 pages).  
(Continued)

*Primary Examiner* — Ula C Ruddock  
*Assistant Examiner* — Mary Grace Byram  
(74) *Attorney, Agent, or Firm* — Foley & Lardner LLP

(57) ABSTRACT

The present technology is directed to a potassium metal battery, particularly a potassium metal secondary battery, that includes a cathode; an anode that includes potassium metal; and a non-aqueous electrolyte that includes a potassium salt as well as a solvent. The solvent may include dimethoxyethane, digylme, triglyme, tetraglyme, or a mixture of any two or more thereof.

14 Claims, 41 Drawing Sheets

(51) Int. Cl.
    *H01M 4/86*       (2006.01)
    *H01M 4/90*       (2006.01)
    *H01M 10/0564*   (2010.01)
    *H01M 10/0568*   (2010.01)
    *H01M 12/02*      (2006.01)
    *H01M 4/02*       (2006.01)
    *H01M 4/48*       (2010.01)
    *H01M 4/58*       (2010.01)
    *H01M 4/583*      (2010.01)

(52) U.S. Cl.
    CPC ...... *H01M 2004/027* (2013.01); *H01M 4/483* (2013.01); *H01M 4/5815* (2013.01); *H01M 4/582* (2013.01); *H01M 4/583* (2013.01); *H01M 2004/8689* (2013.01); *H01M 2300/0025* (2013.01); *H01M 2300/0037* (2013.01)

(56) References Cited

U.S. PATENT DOCUMENTS

| | | | |
|---|---|---|---|
| 2016/0036108 A1* | 2/2016 | Lu | H01M 4/9041 429/405 |
| 2016/0204490 A1* | 7/2016 | Scott | H01M 4/8668 429/405 |
| 2016/0240896 A1* | 8/2016 | Zhang | H01M 10/0569 |
| 2017/0294676 A1 | 10/2017 | Komaba et al. | |

OTHER PUBLICATIONS

Ren, X. et al., "A Low-Overpotential Potassium-Oxygen Battery Based on Potassium Superoxide." J. Am. Chem. Soc. Feb. 12, 2013, 135, 2923-2926 <DOI: 10.1021/ja312059q>.

Xiao, N. et al., "Reversible Dendrite-Free Potassium Plating and Stripping Electrochemistry for Potassium Secondary Batteries." J. Am. Chem. Soc. Jun. 29, 2017, 139, 9475-9478; <DOI: 10.1021/jacs.7b94945>.

* cited by examiner

POTASSIUM SECONDARY BATTERY

CROSS-REFERENCE TO RELATED APPLICATIONS

This application is a U.S. National Phase Application under 35 U.S.C. § 371 of International Application No. PCT/US2019/012079, filed on Jan. 2, 2019, which claims the benefit of and priority to U.S. Provisional Appl. No. 62/613,294, filed Jan. 3, 2018, and U.S. Provisional Appl. No. 62/670,673, filed May 11, 2018, the entireties of each of which are hereby incorporated by reference for any and all purposes.

U.S. GOVERNMENT RIGHTS

This invention was made with government support under IIP-1542995 awarded by the National Science Foundation. The government has certain rights in the invention.

FIELD

The present technology is directed to potassium batteries. In particular, potassium secondary batteries are provided that exhibit long-term and highly reversible plating/stripping of K at room temperature with high coulombic efficiency, even with a high-voltage cathode.

BACKGROUND

Throughout this disclosure, various publications, patents, and published patent specifications are referenced by an identifying citation. Also within this disclosure are Arabic numerals referring to referenced citations, the full bibliographic details of which are provided immediately after the examples. The disclosures of these publications, patents, and published patent specifications are hereby incorporated by reference into the present disclosure to more fully describe the state of the art to which this invention pertains.

Potassium secondary batteries have been recognized as promising candidates for future energy storage technologies owing to their abundance, low cost, and substantial cell voltage.[1] In 2013, a K—$O_2$ battery was reported with a theoretical specific energy of 935 Wh/kg.[2] Since then, studies have been carried out to mitigate side reactions on K metal electrode to improve its stability and cycle life.[3] K—S batteries have also been demonstrated with a theoretical specific energy of 1023 Wh/kg.[4,5] In addition, different anode and cathode materials for potassium secondary batteries have been reported.[6-9]

The direct use of potassium (K) metal anode allows a much higher specific capacity compared to carbonaceous, alloying or intercalation compounds, but reversibly plating and stripping K in a proper electrolyte remains a major challenge. It is well-known that the K metal is highly reactive towards electrolyte components. As a result, the plating and stripping electrochemistry of K has been an unexplored area for decades and a strongly passivating solid electrolyte interface (SEI) is desired to stabilize the surface of potassium and achieve the aforementioned goals.

In the recent years, the plating and stripping studies on Li and Na metals have made encouraging progress through development of new electrolyte formulations.[10,11] In 2015, the Zhang group achieved high rate and stable cycling of Li metal anode using highly concentrated LiFSI-ether electrolyte.[12] Wu Xu et al. discovered that $LiPF_6$ additive enabled fast charging and stable cycling of lithium metal batteries.[13] Yi Cui et al. reported that a traditional $NaPF_6$ salt in diglyme can reversibly plate and strip Na with high coulombic efficiency.[14]

However, there has not been a reported electrolyte that can passivate potassium surface and allow long-term reversibility of K metal anodes. With the emergence of potassium-based energy storage technologies, discovery of desirable electrolytes to passivate the potassium surface in potassium is crucial.

The present technology described herein provides potassium metal secondary batteries where long-term and highly reversible plating/stripping of K at room temperature is realized with high coulombic efficiency, even when utilizing a high-voltage cathode (i.e., up to 5.0 V versus $K/K^+$).

SUMMARY

In an aspect, a battery is provided that includes a cathode; an anode that includes potassium metal ("the K metal anode"); and a non-aqueous electrolyte that includes potassium bis(fluorosulfonyl)imide (KFSI) as well as a solvent. The solvent includes dimethoxyethane, digylme, triglyme, tetraglyme, dimethylsulfoxide, or a mixture of any two or more thereof.

In another aspect, a battery is provided that includes a cathode; an anode comprising potassium metal; and a first non-aqueous electrolyte comprising a potassium salt and a first solvent; where the potassium metal of the anode is provided by electrodeposition of potassium ions in a second non-aqueous electrolyte comprising potassium bis(fluorosulfonyl)imide (KFSI) and a second solvent. The potassium salt of the first non-aqueous electrolyte may be potassium bis(trifluoromethanesulfonyl)imide (KTFSI).

In a further related aspect, an anode is provided that includes potassium metal provided by electrodeposition of potassium ions in a second non-aqueous electrolyte comprising potassium bis(fluorosulfonyl)imide (KFSI) and a second solvent.

DESCRIPTION OF THE DRAWINGS

FIGS. 3E & 3F full cycling performance of K anode with high areal capacity (0.5 mA/$cm^2$).

FIG. 5A provides the K deposition at 0.05 mA/cm$^2$ where FIG. 5B is the cross-section image. FIG. 5C provides the K deposition at 0.5 mA/cm$^2$ where FIG. 5D is the zoomed-in image. The photographic inset in FIG. 5A shows the shiny appearance of plated K film.

FIG. 6A provides the magnified image of plated K with KFSI-DME=0.1 electrolyte, and FIGS. 6B-C the plated K with KFSI-DME=0.5 electrolyte (3 mAh, 0.05 mA/cm$^2$). FIG. 6D provides the area for EDS mapping and FIG. 6E the elements distribution on the electrode surface. FIGS. 6F-I show the plated K at 1 and 4 mA/cm$^2$ (KFSI/DME=0.1). FIGS. 6J-K provide the results of SEM imaging of K anode after 200 cycles at 0.5 mA/cm$^2$, where the surface is porous but remained uniform and dendrite-free.

FIGS. 10A & 10B are the $^1$H NMR and $^{19}$F NMR spectrum, respectively, obtained from the K surface layer. The surface layer sample was scraped off from a K anode after cycling and then dissolved in D$_2$O solvent. FIGS. 10C & 10D are the $^1$H NMR and $^{19}$F NMR spectrum, respectively, of the electrolyte (extracted from separator) after 200 cycles (over 1000 hours).

DETAILED DESCRIPTION

Figure 1A:
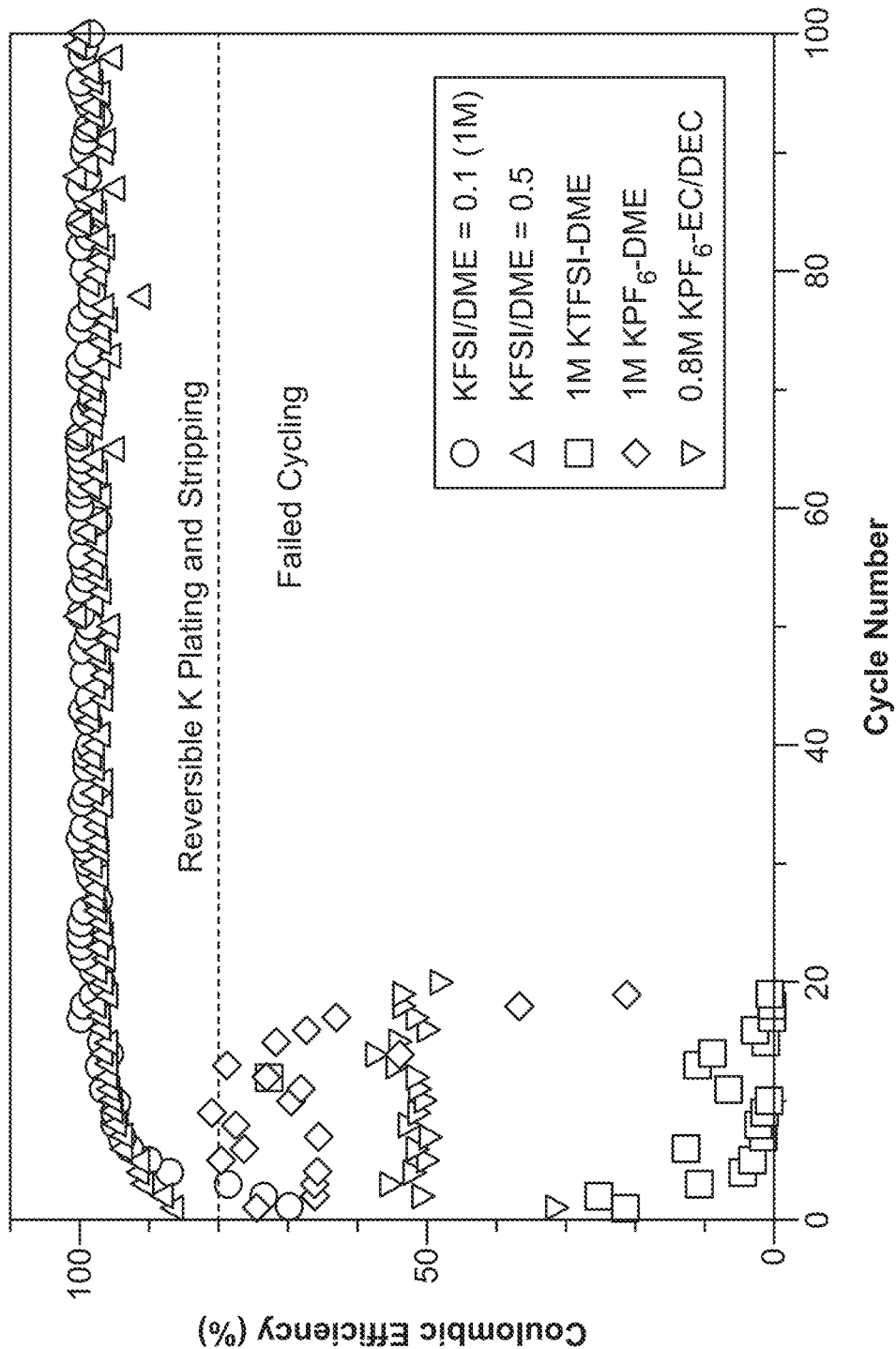
FIGS. 1A-E illustrate galvanostatic K plating and stripping on the Cu substrate among different electrolyte formulations at the rate of 0.05 mA/$cm^2$ (FIG. 1A), the voltage profiles and cycling performance with KFSI-DME=0.1 (1M) electrolyte (FIGS. 1B & 1C, respectively), plating and stripping curves at the rate of 4 mA/$cm^2$ (FIG. 1D), and cycling performance from 0.05 to 4 mA/$cm^2$ (FIG. 1E).

The following terms are used throughout as defined below.

As used herein and in the appended claims, singular articles such as "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term—for example, "about 10 wt. %" would mean "9 wt. % to 11 wt. %."

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 atoms refers to groups having 1, 2, or 3 atoms. Similarly, a group having 1-5 atoms refers to groups having 1, 2, 3, 4, or 5 atoms, and so forth.

"Substantially free" as used herein will be understood by persons of ordinary skill in the art and will vary to some extent depending upon the context. If there are uses of the term which are not clear to persons of ordinary skill in the art, given the context in which it is used, "substantially free" will mean that the substance is at about 0.5 wt % or less.

The term "non-aqueous electrolyte" as used herein will be understood by persons of ordinary skill in the art and will vary to some extent depending upon the context. If there are uses of the term which are not clear to persons of ordinary skill in the art, given the context in which it is used, a "non-aqueous electrolyte" will mean an electrolyte that includes less than about 0.1 wt % $H_2O$, preferably less than about 100 ppm $H_2O$, even more preferably less than about 50 ppm $H_2O$, and further preferably less than about 20 ppm $H_2O$, prior to initial discharge of an electrochemical cell containing the electrolyte. Thus, total water content in a "non-aqueous electrolyte" may be about 1000 ppm, about 100 ppm, about 50 ppm, about 20 ppm, about 10 ppm, about 5 ppm, about 1 ppm, or any range including and/or in between any two of these values. Because complete removal of every molecule of $H_2O$ in an electrolyte is practically impossible, it is understood that an electrolyte with, e.g., less than 1 ppm $H_2O$ prior to initial discharge includes sub-ppm levels of $H_2O$.

The Present Technology

In an aspect, a battery is provided that includes a cathode; an anode that includes potassium metal ("the K metal anode"); and a non-aqueous electrolyte that includes potassium bis(fluorosulfonyl)imide (KFSI) as well as a solvent. The solvent includes dimethoxyethane, diglyme, triglyme, tetraglyme, dimethylsulfoxide (DMSO), or a mixture of any two or more thereof. The K metal anode of such batteries may be plated and stripped over hundreds of cycles at room temperature with high coulombic efficiency without any surface coating on the K prior to initial discharge or separator modification prior to initial discharge. Such batteries may utilize high voltage cathodes, such as a potassium Prussian blue (KPB) cathode, with high coulombic efficiency. Thus, the battery of any embodiment disclosed herein is preferably a secondary battery, including a secondary potassium-air battery. In any embodiment herein, the non-aqueous electrolyte may be substantially free of non-water solvents that are not dimethoxyethane, diglyme, triglyme, tetraglyme, or DMSO. In any embodiment herein, the KFSI may be at a concentration in the non-aqueous electrolyte of about 0.05 M to about 10 M. Thus, the concentration of KFSI may be about 0.05 M, about 0.1 M, about 0.2M, about 0.3 M, about 0.4 M, about 0.5 M, about 0.6M about 0.7M, about 0.8 M, about 0.9 M, about 1 M, about 1.1 M, about 1.2 M, about 1.3 M, about 1.4 M, about 1.5 M, about 1.6 M, about 1.7 M, about 1.8 M, about 1.9 M, about 2 M, about 2.5 M, about 3 M, about 4 M, about 5 M, about 6 M, about 7 M about 8 M, about 9 M, about 10 M, or any range including and/or in between any two of these values. In any embodiment herein, it may be that the electrolyte is substantially free of potassium salts that are not KFSI prior to initial discharge.

The potassium metal of the battery may be commercial grade or of a higher purity. The potassium metal may include about 10 ppm to about 500 ppm of one or more of Al, Ba, Be, B, Ca, Cr, Co, Cu, Fe, Pb, Mg, Mn, Mo, Ni, Si, Ag, Na, Sr, Sn, Ti, and V. Thus, the potassium metal may include one or more of Al, Ba, Be, B, Ca, Cr, Co, Cu, Fe, Pb, Mg, Mn, Mo, Ni, Si, Ag, Na, Sr, Sn, Ti, and V where each of these may independently be included at about 10 ppm, about 20 ppm, about 30 ppm, about 40 ppm, about 50 ppm, about 60 ppm, about 70 ppm, about 80 ppm, about 90 ppm, about 100 ppm, about 110 ppm, about 120 ppm, about 130 ppm, about 140 ppm, about 150 ppm, about 160 ppm, about 170 ppm, about 180 ppm, about 190 ppm, about 200 ppm, about 220 ppm, about 240 ppm, about 260 ppm, about 280 ppm, about 300 ppm, about 350 ppm, about 400 ppm, about 450 ppm, about 500 ppm, or any range including and/or in between any two of these values. The potassium metal may include about O ppm to about 3000 ppm of O prior to initial discharge. Therefore, the amount of O in the potassium metal prior to initial discharge may be about 0 ppm, about 1 ppm, about 5 ppm, about 10 ppm, about 20 ppm, about 30 ppm, about 40 ppm, about 50 ppm, about 60 ppm, about 70 ppm, about 80 ppm, about 90 ppm, about 100 ppm, about 110 ppm, about 120 ppm, about 130 ppm, about 140 ppm, about 150 ppm, about 160 ppm, about 170 ppm, about 180 ppm, about 190 ppm, about 200 ppm, about 220 ppm, about 240 ppm, about 260 ppm, about 280 ppm, about 300 ppm, about 350 ppm, about 400 ppm, about 450 ppm, about 500 ppm, about 550 ppm, about 600 ppm, about 650 ppm, about 700 ppm, about 750 ppm, about 800 ppm, about 850 ppm, about 900 ppm, about 1000 ppm, about 1200 ppm, about 1400 ppm, about 1600 ppm, about 1800 ppm, about 2000 ppm, about 2200 ppm, about 2400 ppm, about 2600 ppm, about 2800 ppm, about 3000 ppm, or any range including and/or in between any two of these values.

In another related aspect, a battery is provided that includes a cathode; an anode comprising potassium metal; and a first non-aqueous electrolyte comprising a potassium salt and a first solvent; where the potassium metal of the anode is provided by electrodeposition of potassium ions in a second non-aqueous electrolyte comprising potassium bis(fluorosulfonyl)imide (KFSI) and a second solvent. The potassium salt of the first non-aqueous electrolyte may include $KPF_6$, $KBF_4$, $KClO_4$, $KAsF_6$, $KCF_3SO_3$, potassium bis(oxalato)borate, potassium difluoro(oxalate)borate, $K_2SiF_6$, $KSbF_6$, $KC(CF_3SO_2)_3$, potassium bis(trifluoromethanesulfonyl)imide (KTFSI), or a combination of any two or more thereof. In any embodiment herein, the potassium salt may be at a concentration in the first non-aqueous electrolyte of about 0.05 M to about 10 M. Thus, the concentration of potassium salt may be about 0.05 M, about 0.1 M, about 0.2M, about 0.3 M, about 0.4 M, about 0.5 M, about 0.6M about 0.7M, about 0.8 M, about 0.9 M, about 1 M, about 1.1 M, about 1.2 M, about 1.3 M, about 1.4 M, about 1.5 M, about 1.6 M, about 1.7 M, about 1.8 M, about 1.9 M, about 2 M, about 2.5 M, about 3 M, about 4 M, about 5 M, about 6 M, about 7 M about 8 M, about 9 M, about 10 M, or any range including and/or in between any two of these values. In any embodiment herein, KTFSI may be at a concentration in the first non-aqueous electrolyte of about 0.05 M to about 10 M. Thus, the concentration of KTFSI may be about 0.05 M, about 0.1 M, about 0.2M, about 0.3 M, about 0.4 M, about 0.5 M, about 0.6M about 0.7M, about 0.8 M, about 0.9 M, about 1 M, about 1.1 M, about 1.2 M, about 1.3 M, about 1.4 M, about 1.5 M, about 1.6 M, about 1.7 M, about 1.8 M, about 1.9 M, about 2 M, about 2.5 M, about 3 M, about 4 M, about 5 M, about 6 M, about 7 M about 8 M, about 9 M, about 10 M, or any range including and/or in between any two of these values. In any embodiment herein, it may be that the first non-aqueous electrolyte is substantially free of potassium salts that are not KTFSI prior to initial discharge.

In a further related aspect, an anode is provided that includes potassium metal provided by electrodeposition of potassium ions in a second non-aqueous electrolyte comprising potassium bis(fluorosulfonyl)imide (KFSI) and a second solvent. The second solvent includes dimethoxyethane, digylme, triglyme, tetraglyme, dimethylsulfoxide (DMSO), or a mixture of any two or more thereof. In any embodiment herein, the non-aqueous electrolyte may be substantially free of non-water solvents that are not dimethoxyethane, digylme, triglyme, tetraglyme, or DMSO. In any aspect and embodiment herein, the KFSI may be at a concentration in the second non-aqueous electrolyte of about 0.05 M to about 10 M. Thus, the concentration of KFSI may be about 0.05 M, about 0.1 M, about 0.2M, about 0.3 M, about 0.4 M, about 0.5 M, about 0.6M about 0.7M, about 0.8 M, about 0.9 M, about 1 M, about 1.1 M, about 1.2 M, about 1.3 M, about 1.4 M, about 1.5 M, about 1.6 M, about 1.7 M, about 1.8 M, about 1.9 M, about 2 M, about 2.5 M, about 3 M, about 4 M, about 5 M, about 6 M, about 7 M about 8 M, about 9 M, about 10 M, or any range including and/or in between any two of these values. In any embodiment herein, it may be that the second non-aqueous electrolyte is substantially free of potassium salts that are not KFSI prior to electrodeposition.

The anode of any aspect and/or embodiment herein may be disposed on a current collector. The current collector provides contact between the potassium metal and an external load to allow for the flow of electrons through a circuit to which anode is connected. The current collector may be a conductive material. Illustrative current collectors include, but are not limited to, aluminum, nickel, platinum, palladium, gold, silver, copper, iron, stainless steel, rhodium, manganese, vanadium, titanium, tungsten, combinations thereof, alloys thereof, and any carbon-coated variant thereof.

The cathode of any aspect and/or embodiment herein may include positive electroactive materials that preferably include potassium (also referred to herein as "potassium-containing positive electroactive materials"). Examples include, but are not limited to, olivine-based materials (such as potassium-iron-phosphates (e.g., $KFePO_4$), potassium-manganese-phosphates (e.g., $KMnPO_4$), and potassium-cobalt-phosphates (e.g., $KCoPO_4$)), fluorinated olivine-based materials (e.g., $K_2FePO_4F$, $K_2MnPO_4F$, $K_2CoPO_4F$), potassium-containing iron-cyano complexes (e.g., potassium Prussian blue); potassium-containing transition metal oxides (e.g., $NaFeO_2$, $KCoO_2$, $KCrO_2$, $KMnO_2$, $KNiO_2$, $KNi_{1/2}Ti_{1/2}O_2$, $KNi_{1/2}Mn_{1/2}O_2$, $K_{2/3}Fe_{1/3}Mn_{2/3}O_2$, $KNi_{1/3}Co_{1/3}Mn_{1/3}O_2$, $K_{2/3}MnO_2$, $KMn_2O_4$, $K_{2/3}Ni_{1/3}Mn_{2/3}O_2$), potassium-containing transition metal sulfides, and potassium-containing transition metal halides. Such potassium-containing positive electroactive materials may be sequestered with a binder to prevent migration of the material through the cell. The binder may be any polymeric binder known for retaining the electroactive materials. Illustrative binders include, but are not limited to, one or more of poly(acrylonitrile) (PAN), polyvinylidene fluoride (PVDF), polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CMC), gelatin, a co-polymer of any two or more such polymers, or a blend of any two or more such polymers. The cathode may include a carbon material, such as microporous carbon, mesoporous carbon, mesoporous microbeads, graphite, expandable graphite, carbon black, carbon nanotubes, or a mixture of any two or more thereof. Commercial examples of carbon black include, but are not limited to, Super P, Black Pearl 2000, Denka Black, Vulcan XC72R, and Ketjen black. The cathode may be disposed on a current collector, such as aluminum, nickel, platinum, palladium, gold, silver, copper, iron, stainless steel, rhodium, manganese, vanadium, titanium, tungsten, combinations thereof, alloys thereof, and any carbon-coated variant thereof, where the current collector may be a foil, mesh, or screen.

The cathode of any aspect and/or embodiment herein may include an air cathode, such that the battery of any aspect and/or embodiment herein is a potassium-air battery (e.g., a potassium-air secondary battery). The air cathode may include a porous carbon material, such as a high surface area porous carbon material, where illustrative examples include microporous carbon, mesoporous carbon, mesoporous microbeads, graphite, expandable graphite, carbon black, or carbon nanotubes. Commercial examples of carbon black are provided above in this disclosure. The air cathode may optionally include a metal-based catalyst with the porous carbon material, where the optional metal-based catalyst in the air cathode is used for promoting the reaction of the air with the potassium and the decomposition of the discharged product back to its original state. The metal-based catalyst may include one or more of Pt, Pd, Fe, Ti, Zr, Zn, Ag, Au, Ni, Co, Mn, Ce or La. Suitable metal catalysts include, but are not limited to, metal oxides such as $MnO_2$, $Fe_3O_4$, PdO, NiO, $Ni_2O_3$, $Co_3O_4$, CuO, and $TiO_2$. However, the air cathode may be substantially free of such metal-based catalysts, and the air cathode of any aspect and/or embodiment herein may be free of such metal-based catalysts.

The porous carbon material of the air cathode may be sequestered with a binder to prevent migration of the material through the cell. For example, the porous carbon material may be intimately mixed with a binder either by heating of the binder to a liquid state or in solution with a solvent. In the former case, a molten mixture of the porous active carbon material and the binder are place in a mold and cooled to solidify the binder. In the latter case, the porous active carbon material, binder, and solvent are mixed, placed into a form or mold, and the solvent removed. The binder may be any polymeric binder known for retaining the electroactive materials. Illustrative binders include, but are not limited to, one or more of poly(acrylonitrile) (PAN), polyvinylidene fluoride (PVDF), polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CMC), gelatin, a co-polymer of any two or more such polymers, or a blend of any two or more such polymers. Loading of the carbon in the binder should be sufficient to support electron transfer in the cell and provide a sufficient cell voltage. For example, the loading may be from about 0.1 $mg_{carbon}/cm^2$ to about 2 $mg_{carbon}/cm^2$, such as from about 0.5 $mg_{carbon}/cm^2$ to about 1.5 $mg_{carbon}/cm^2$. For example, the loading may be about 1.0 $mg_{carbon}/cm^2$.

The air cathode may also include a gas-diffusion layer (GDL) upon which the porous carbon material is disposed. The GDL allows for additional oxygen passage into the cell for better, and more even distribution of the oxygen throughout the cell. GDL materials may include, but are not limited to, paper and polymers. The porous carbon material may be sequestered on a current collector, such as carbon paper, aluminum, nickel, platinum, palladium, gold, silver, copper, iron, stainless steel, rhodium, manganese, vanadium, titanium, tungsten, combinations thereof, alloys of any two or more of these metals, and any carbon-coated variant of such metals, combinations, and/or alloys. The current collector may be a foil, mesh, or screen.

The batteries of the present technology may take any form as is known for such batteries. For example, a battery of the present technology may be a coin cell, the structure of which is generally well known. For a potassium-air battery that is a coin cell, the cathode side of the coin cell may contain a shell covering that is porous or has holes in it to allow for air penetration into the cell, while the anode side of the coin cell is a solid shell. Electrical contacts are made with the outer surface of the shell. According to other exemplary embodiments, other types of batteries may be employed using the present technology.

In any aspect and/or embodiment herein of the present technology, the battery may include a separator disposed between the cathode and the anode. The separator may be a porous paper, porous ceramic, or porous polymer separator. Illustrative separators include, but are not limited to, a polyimide, a polyethylene, a Celgard polymer separator, paper, glass (e.g., glass fibers), and a ceramic.

The examples herein are provided to illustrate advantages of the present technology and to further assist a person of ordinary skill in the art with preparing or using the the present technology. The examples herein are also presented in order to more fully illustrate the preferred aspects of the present technology. The examples should in no way be construed as limiting the scope of the present technology. The examples can include or incorporate any of the variations, aspects, or embodiments of the present technology described above. The variations, aspects, or embodiments described above may also further each include or incorporate the variations of any or all other variations, aspects, or embodiments of the present technology.

EXAMPLES

Experimental Details

Materials: Potassium hexafluorophosphate ($KPF_6$) (99.5%, Sigma-Aldrich), potassium bis(trifluoromethanesulfonyl)imide (KTFSI) (Solvionic), and potassium bis(fluorosulfonyl)imide (KFSI) (>99.9%, water content<15 ppm, Fluolyte) were dried under high vacuum at 100° C. for at least 48 h prior to use. 1,2-dimethoxyethane (DME) (BASF) was stored over 3 Å molecular sieves (Sigma-Aldrich). The water contents in 1M electrolytes were below 10 ppm as determined by Karl-Fischer titration (concentrated KFSI-DME (mole ratio of salt/solvent≥0.6) was below 15 ppm). The electrolytes were prepared by dissolving salts into the solvents by different concentrations. Cu foil (99.98%) was purchased from Sigma-Aldrich and pretreated to remove any oxidized surface. All the materials were stored and handled in an argon-filled glovebox (<0.5 ppm $H_2O$ and <1.0 ppm $O_2$). Salt/solvent mole ratios were mainly used for the concentration notations of KFSI-DME electrolytes. Molarity was used for the rest of electrolyte formulations.

Electrochemical measurements: The electrochemical deposition of potassium was studied using CR2032-type coin cells, each of which consisted of a Cu foil (15.5 cm in diamerter) as the working electrode, a trilayer CELGARD separator (polypropylene-polyethylene-polypropylene, 25 μm thickness) and K metal (99.5%, Sigma-Aldrich) as the counter electrode. 40 μL electrolyte was used in each cell. Galvanstatic plating and stripping was tested in a K/Cu half-cell with a pre-deposited K metal anode (3 mAh) to ensure a uniform anode with controlled K amount. The cycling was carried out using an MTI battery analyzer (BST8-WA) with the cutoff of 1.0 V (vs $K^+/K$) or equal plating time. The anodic limits of KFSI-DME electrolytes was measured by LSV at the scan rate of 2 mV/s. Pt (area=0.031 $cm^2$) was used as the working electrode, with a graphite counter electrode and K reference electrode. To test the KFSI/DME electrolyte in a K/potassium Prussian blue (KPB) full cell, KPB was synthesized via a reported method and used as the cathode material.[6] The KPB cathode was fabricated by mixing the KPB powder, Super P carbon powder (MTI Corporation) and poly(vinylidenefluoride) (PVDF) (Sigma-Aldrich) at a weight ratio of 60:30:10 in N-methylpyrrolidone (Sigma-Aldrich). The slurry was then pasted onto the Al foil (99.99%, Alfa Aesar) and dried at 70° C. for 12 h under vacuum. After the pre-cycling to remove water residue in KPB material, the K/KPB full cell was cycled between 2.0 V and 4.0 V (vs $K^+/K$) at the rate of 100 $mA/g_{(KPB)}$.

Characterizations: Coin cells were disassembled in glovebox to obtain the desired samples for optic photographs and characterizations. The electrodes were repeatedly rinsed with DME solvent to remove residual electrolyte before analyses. Scanning electron microscopy (SEM) was performed using FEI/Philips Sirion field emission SEM to image the morphological characteristics with an accelerating voltage of 5 kV. Discharged electrode samples were prepared in a glovebox and transferred to the SEM chamber using an air-free SEM holder to prevent sample exposure to the ambient air. Energy-dispersive X-ray spectroscopy (EDS) was employed to map the surface chemical components with 10 kV. X-ray photoelectron spectroscopy (XPS) analysis was performed on a Kratos Axis Ultra XPS spectrometer using monochromatic Al Kα radiation. Samples were rinsed by DME solvent and then transferred to the instrument using an air-free holder. All spectra were calibrated by referencing the C 1s peak position of the C—C peak at a binding energy of 284.8 eV. The spectra curve was fitted using a combined Gaussian-Lorentzian profile using the CasaXPS program. $^1$H-NMR and $^{19}$F-NMR were carried out on a 400 MHz NMR spectrometer (Bruker, Avance III) after immersing the scratched surface samples in $D_2O$ (99.9 atom % D, Sigma-Aldrich). Raman spectra were collected at room temperature using a Renishaw inVia Raman microscope under a 785 nm-edge laser excitation for the samples (sealed in Borokapillaren capillary tubes).

Series 1—Results and Discussion

Figure 1B:
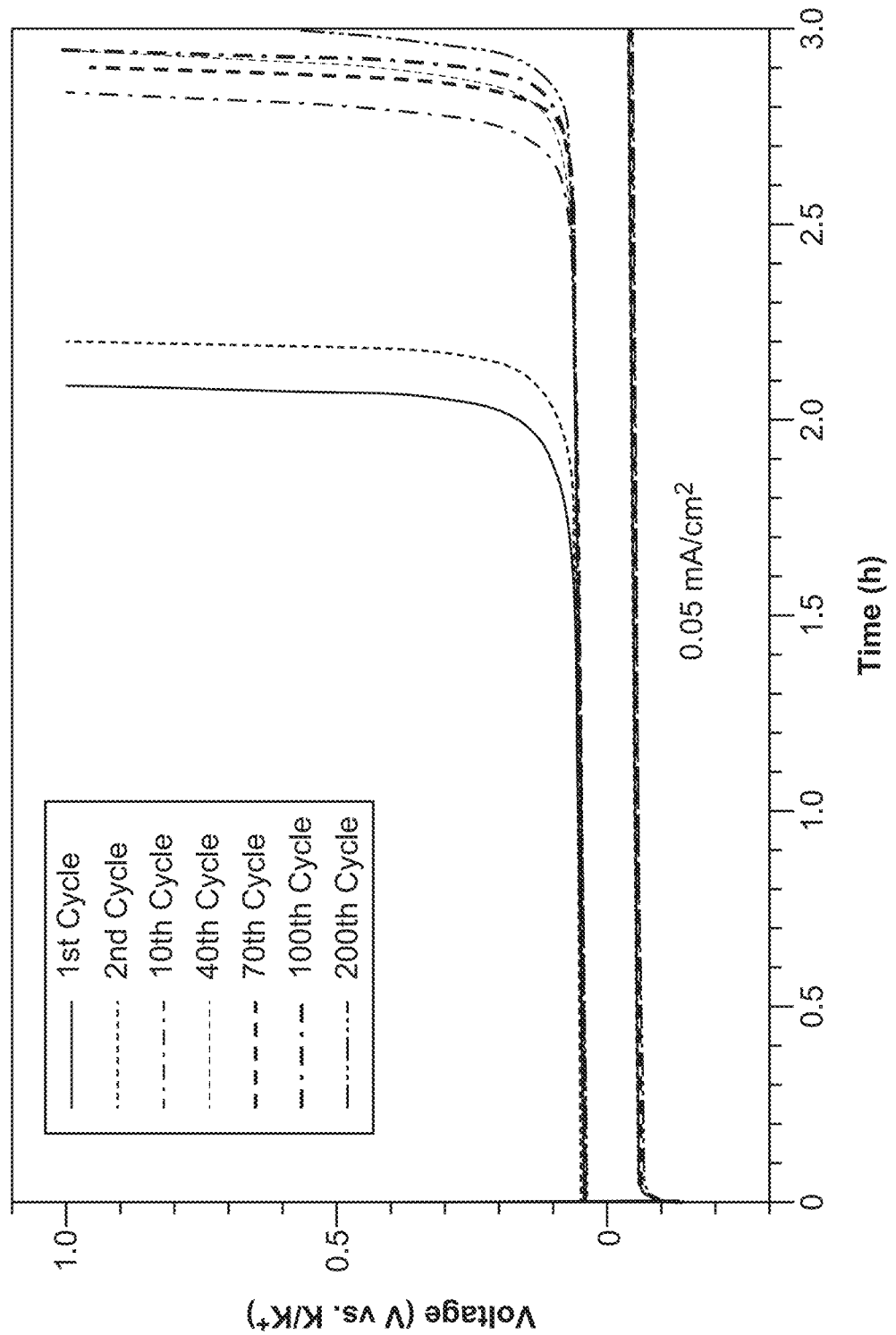
Figure 1C:
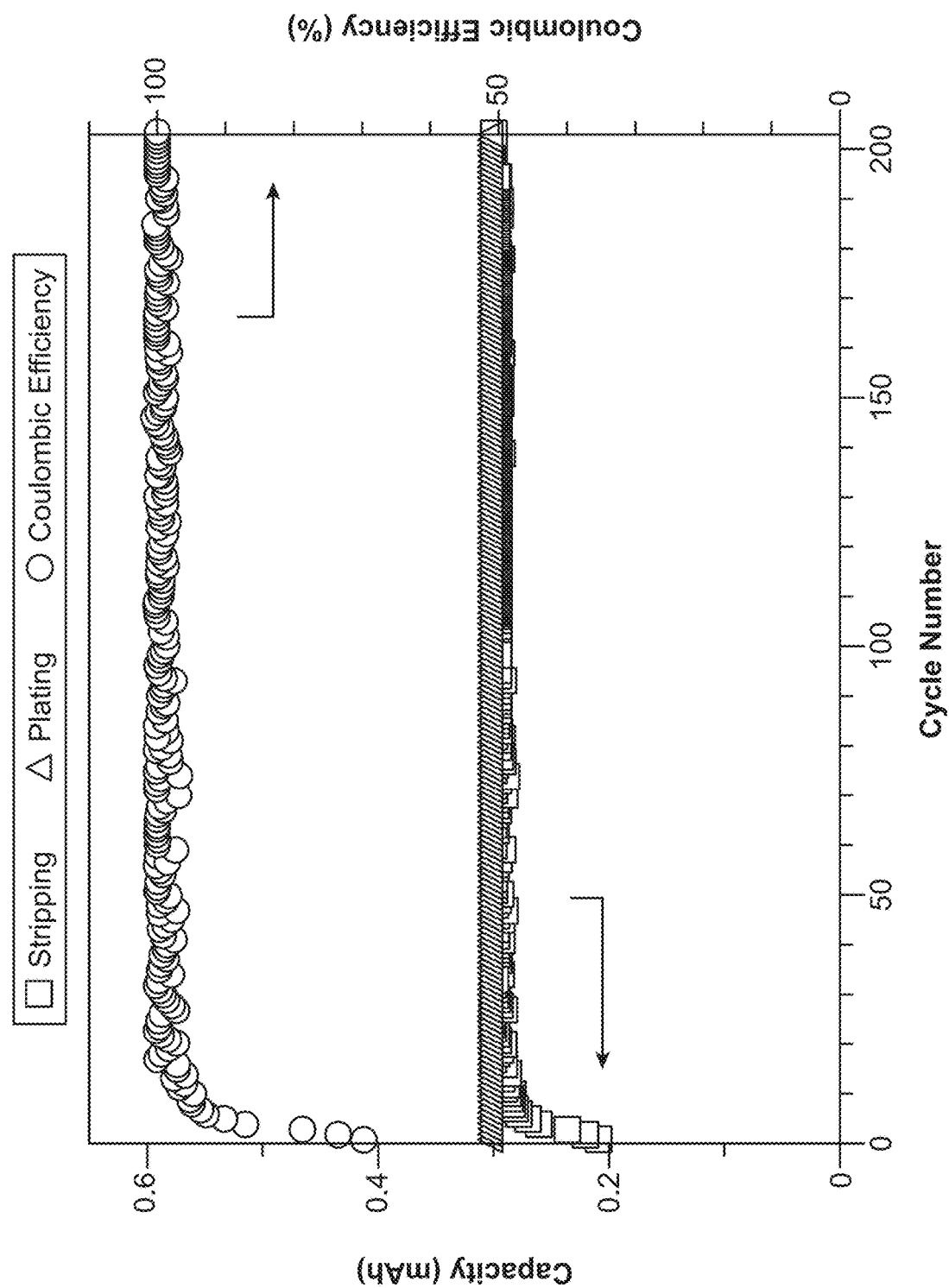
Figure 1D:
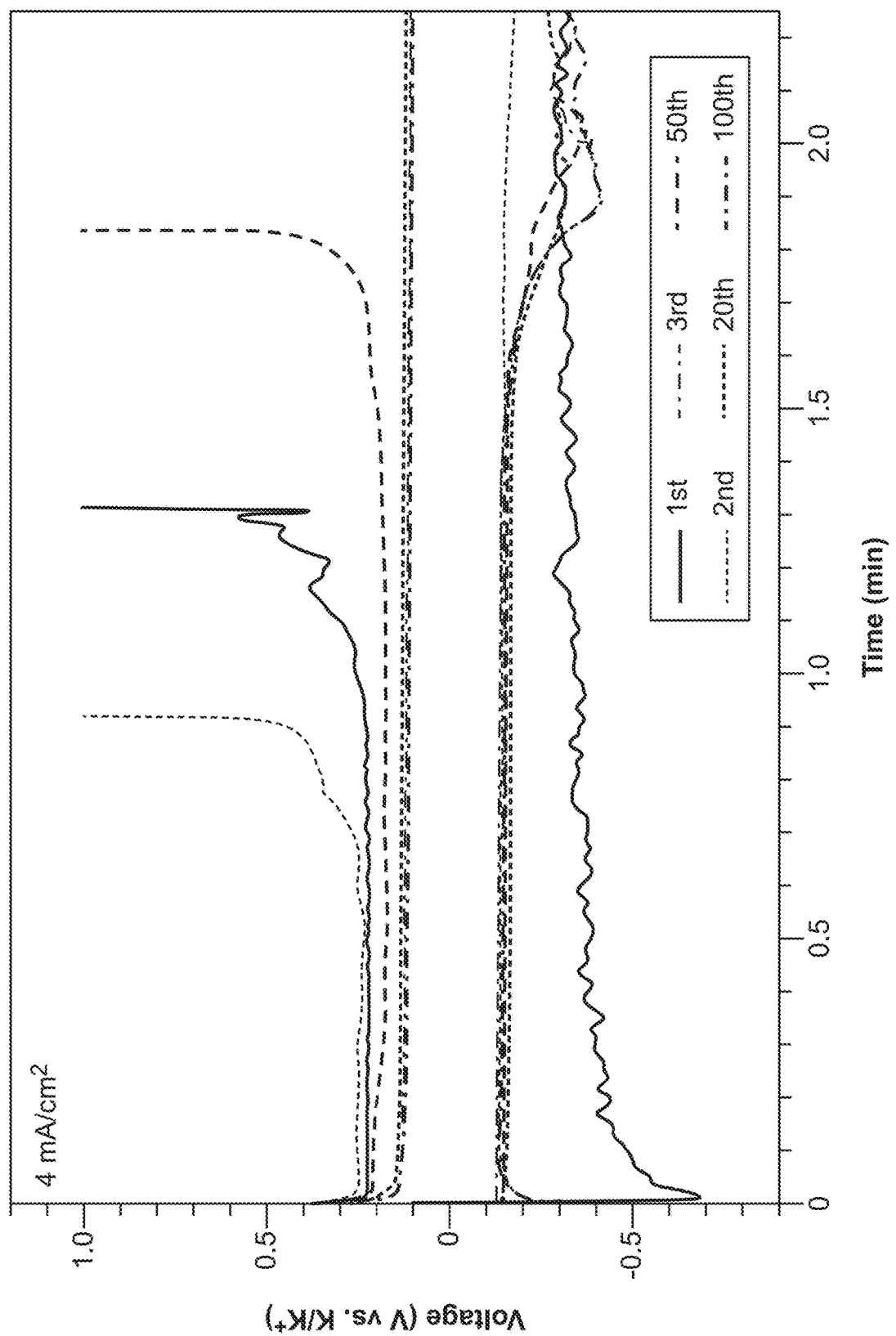
Figure 1E:
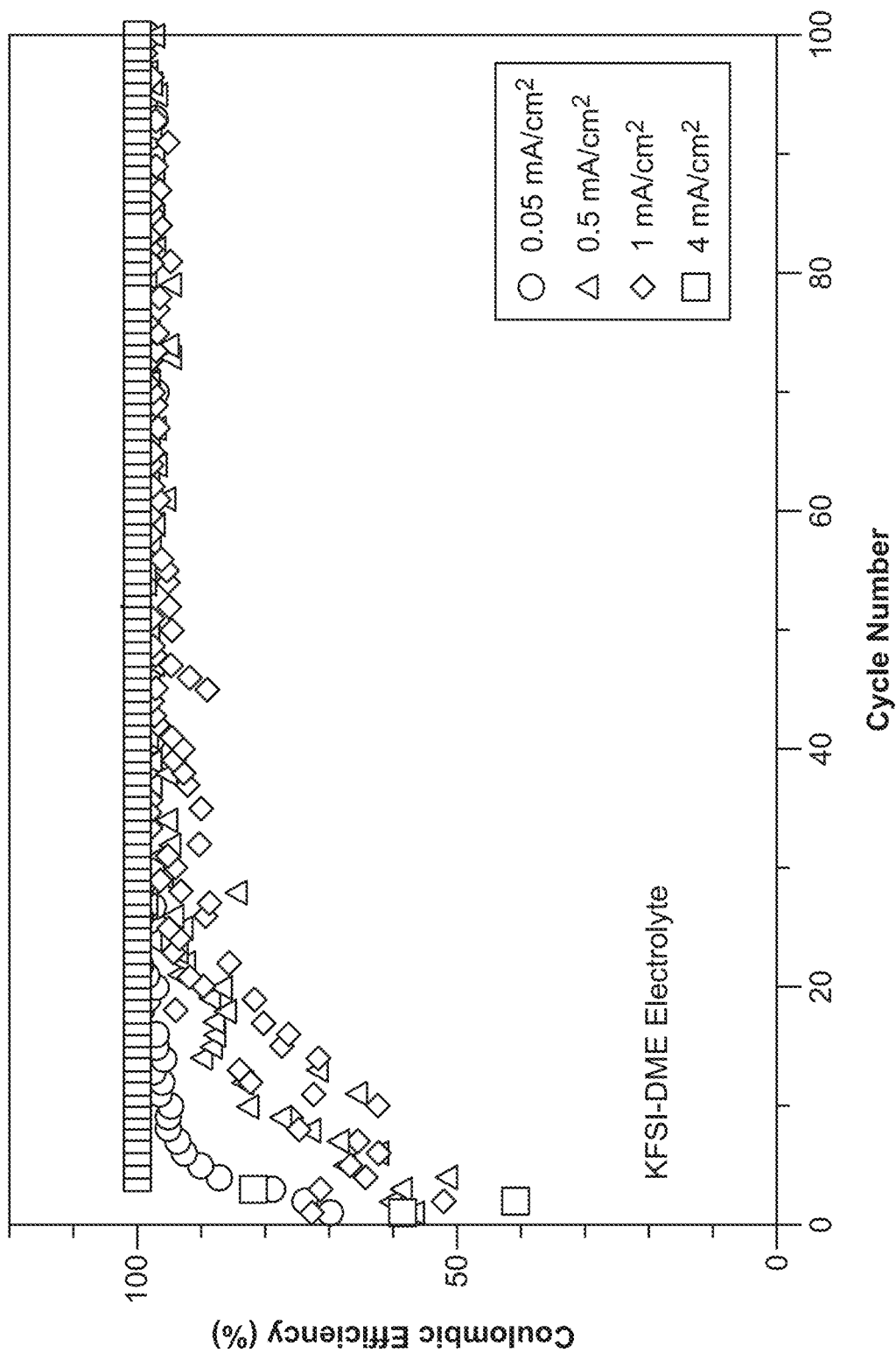
Figure 2A:
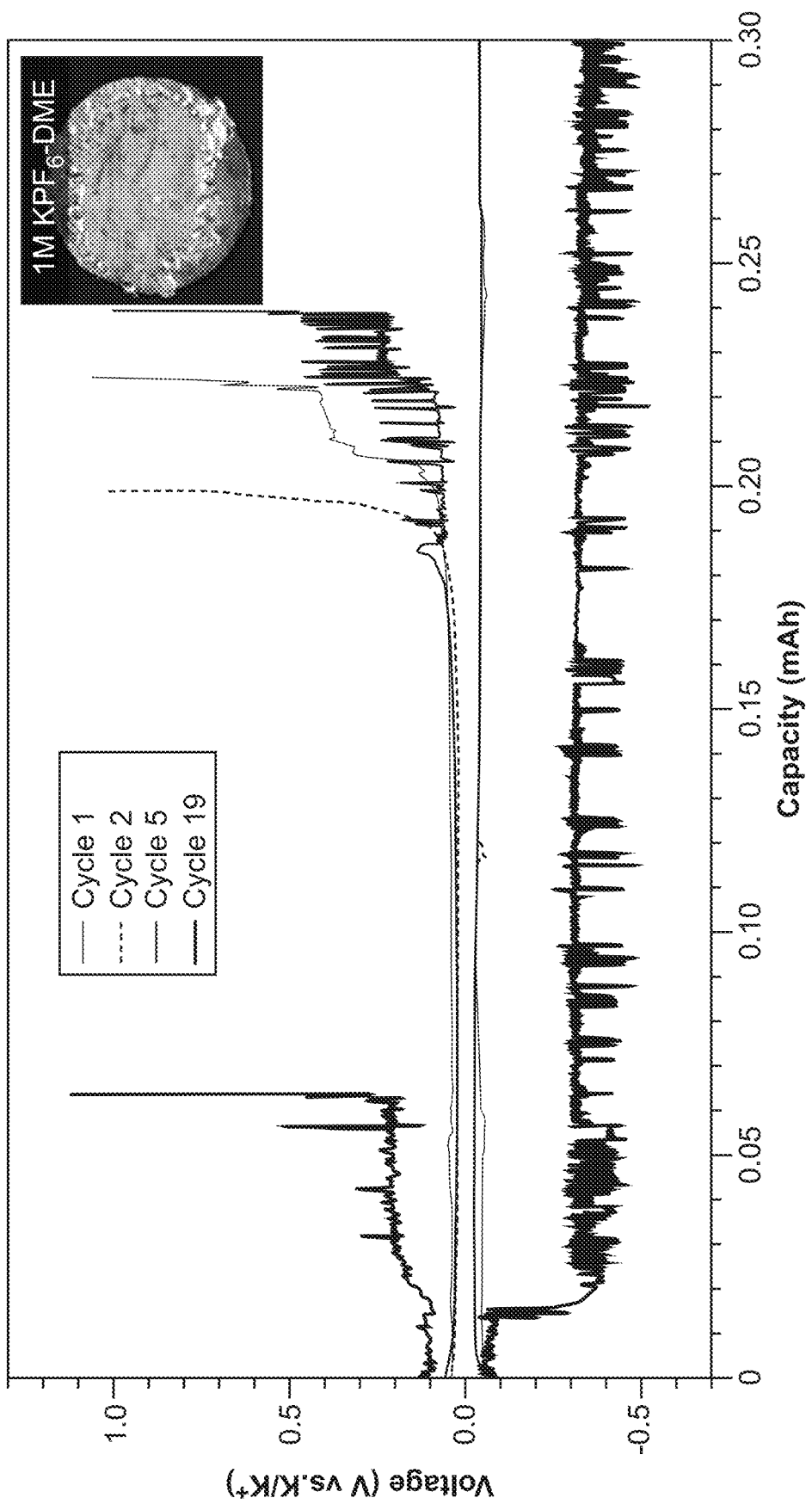
FIGS. 2A-D illustrate the discharge/charge curves of K/Cu cells with the electrolytes of 1M $KPF_6$-DME (FIG. 2A), 1M KTFSI-DME (FIG. 2B), KTFSI/DME=0.5 (FIG. 2C; inset graph shows the cycling cutoff by voltage only and non-uniform deposition) and (d) 0.8M $KPF_6$-EC/DEC (FIG. 2D). The rate is 0.05 mA/$cm^2$. The inset photographs in each of FIGS. 2A-D are of 3 mAh K deposited on Cu substrate.
Figure 2B:
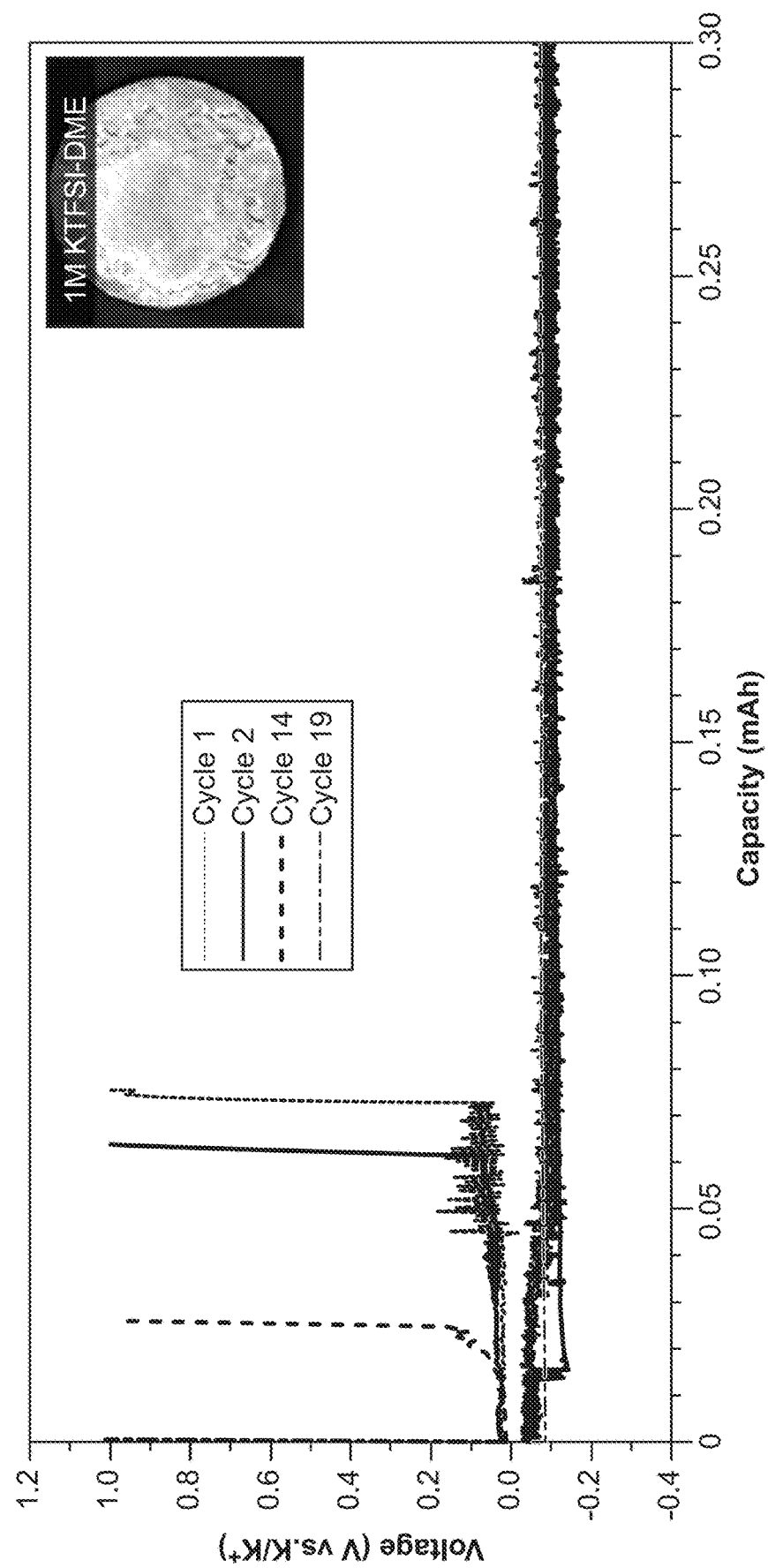
Figure 2C:
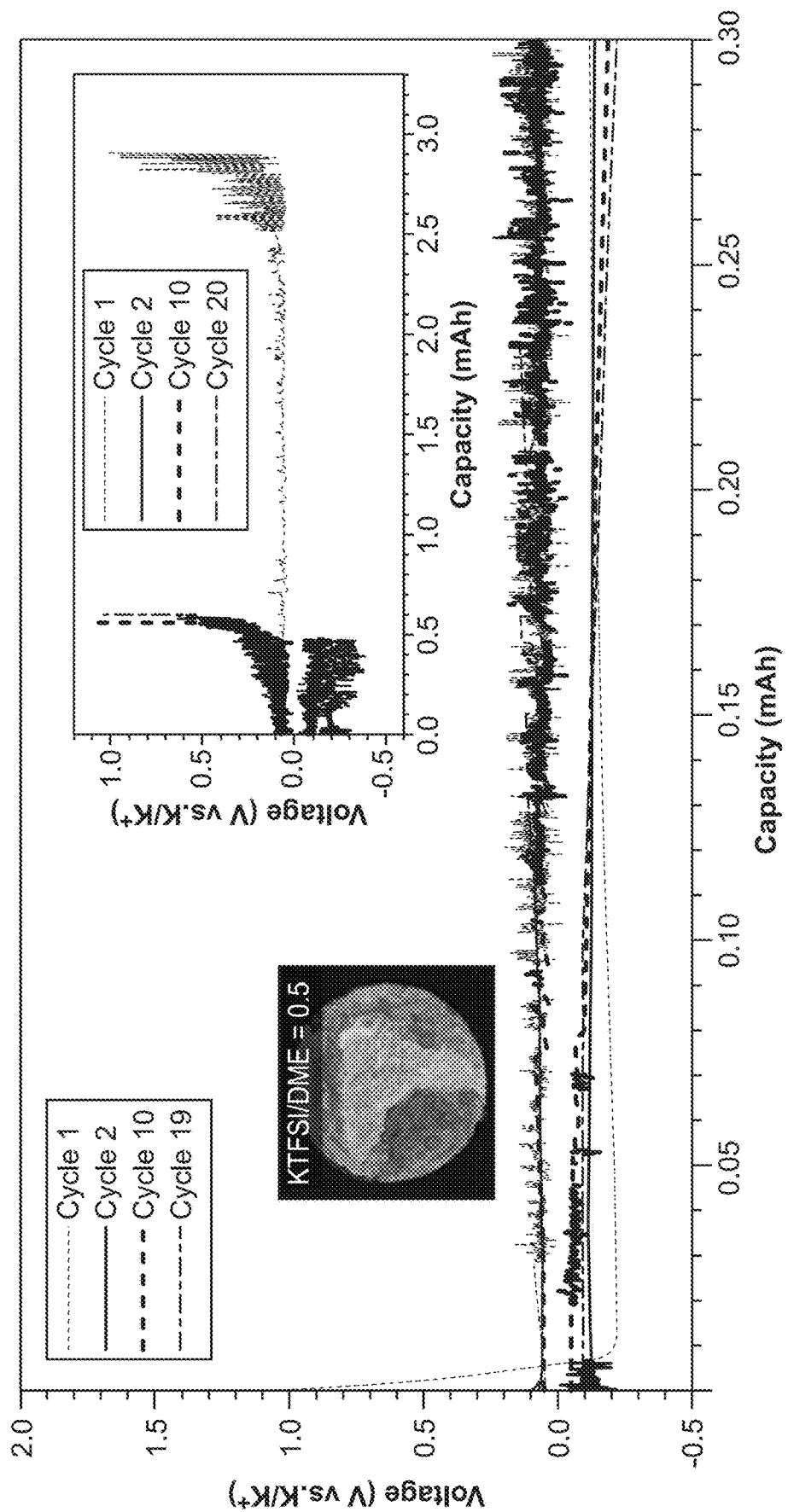
Figure 2D:
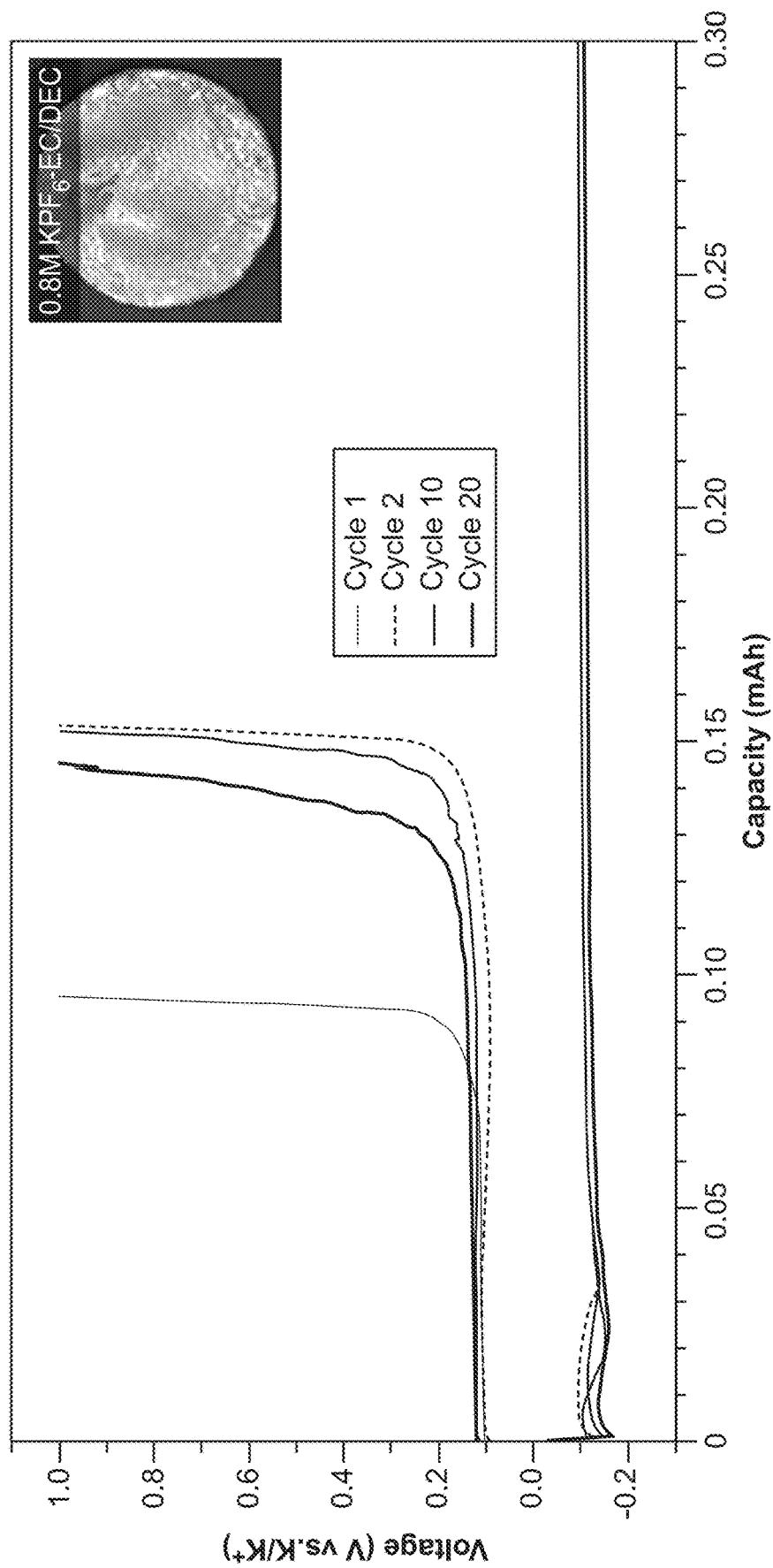
Figure 3A:
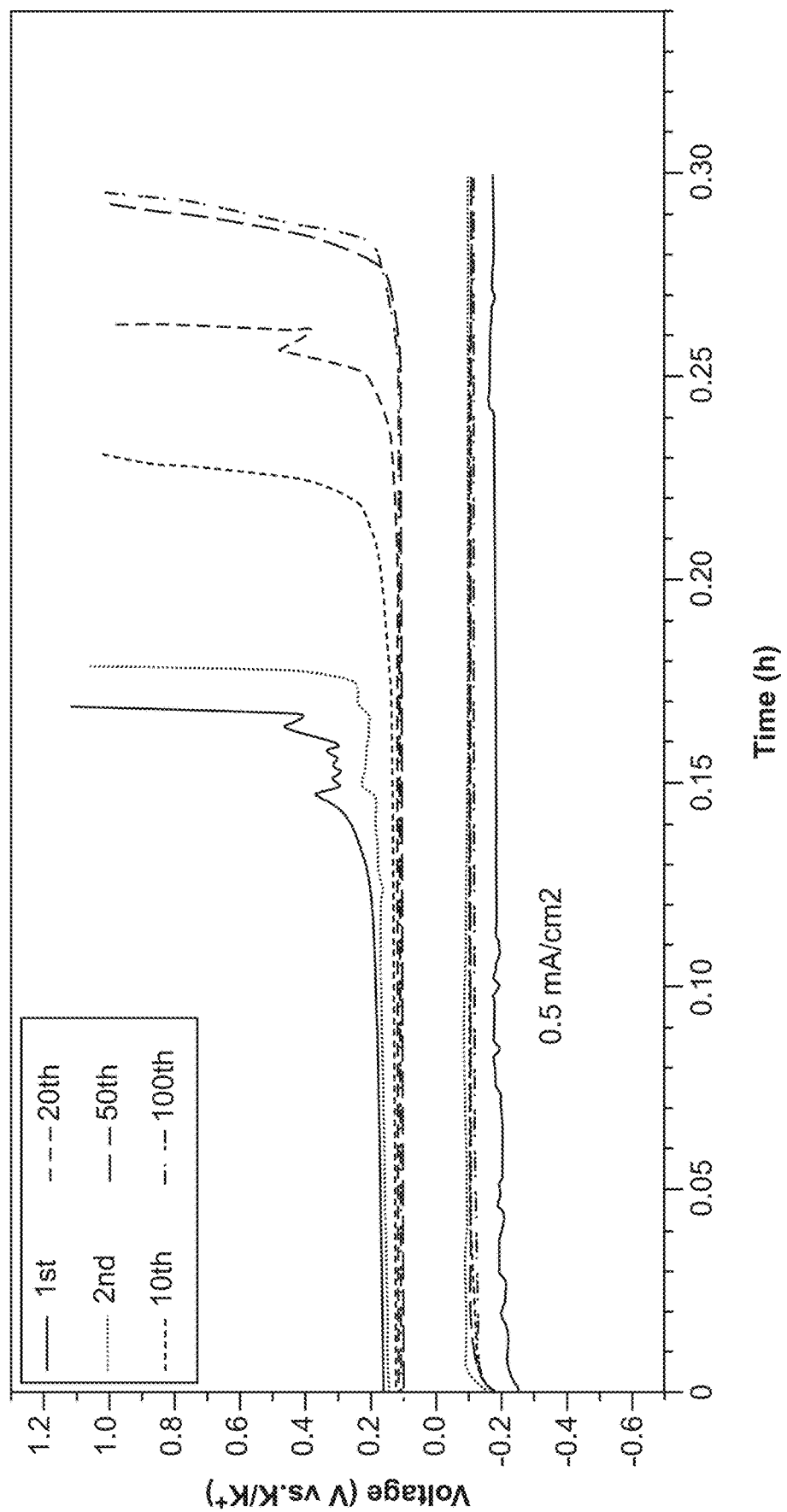
FIGS. 3A-F provide performance data for KFSI/DME=0.1 electrolyte (mole ratio), where discharge/charge curves at different rates of 0.5 mA/$cm^2$ (FIG. 3A), 1 mA/$cm^2$ (FIG. 3B), 2 mA/$cm^2$ (FIG. 3C), and 4 mA/$cm^2$ (FIG. 3D). The cycling at high currents gave K/K symmetric cell behavior due to the residual K accumulation on Cu electrode.
Figure 3B:
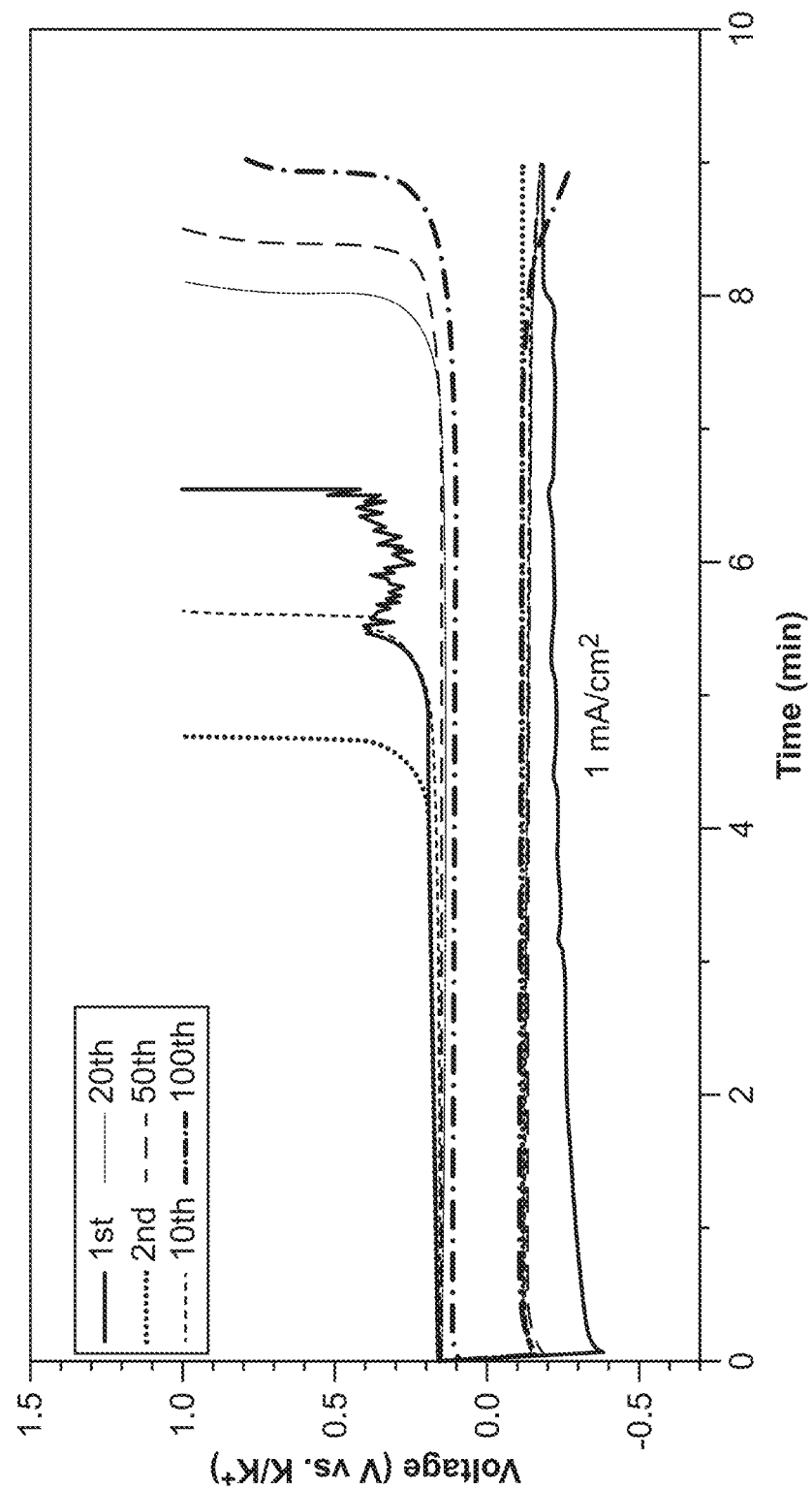
Figure 3C:
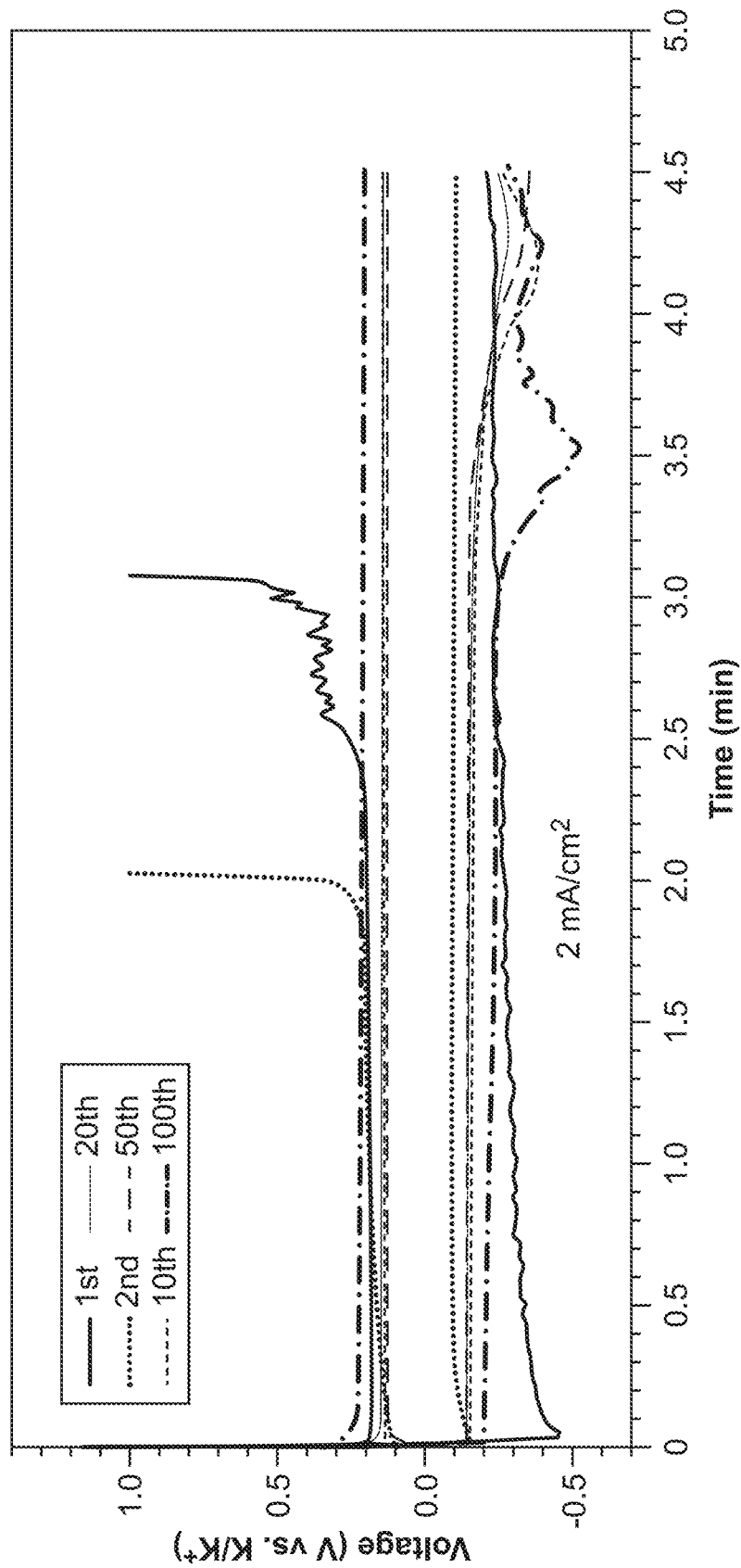
Figure 3D:
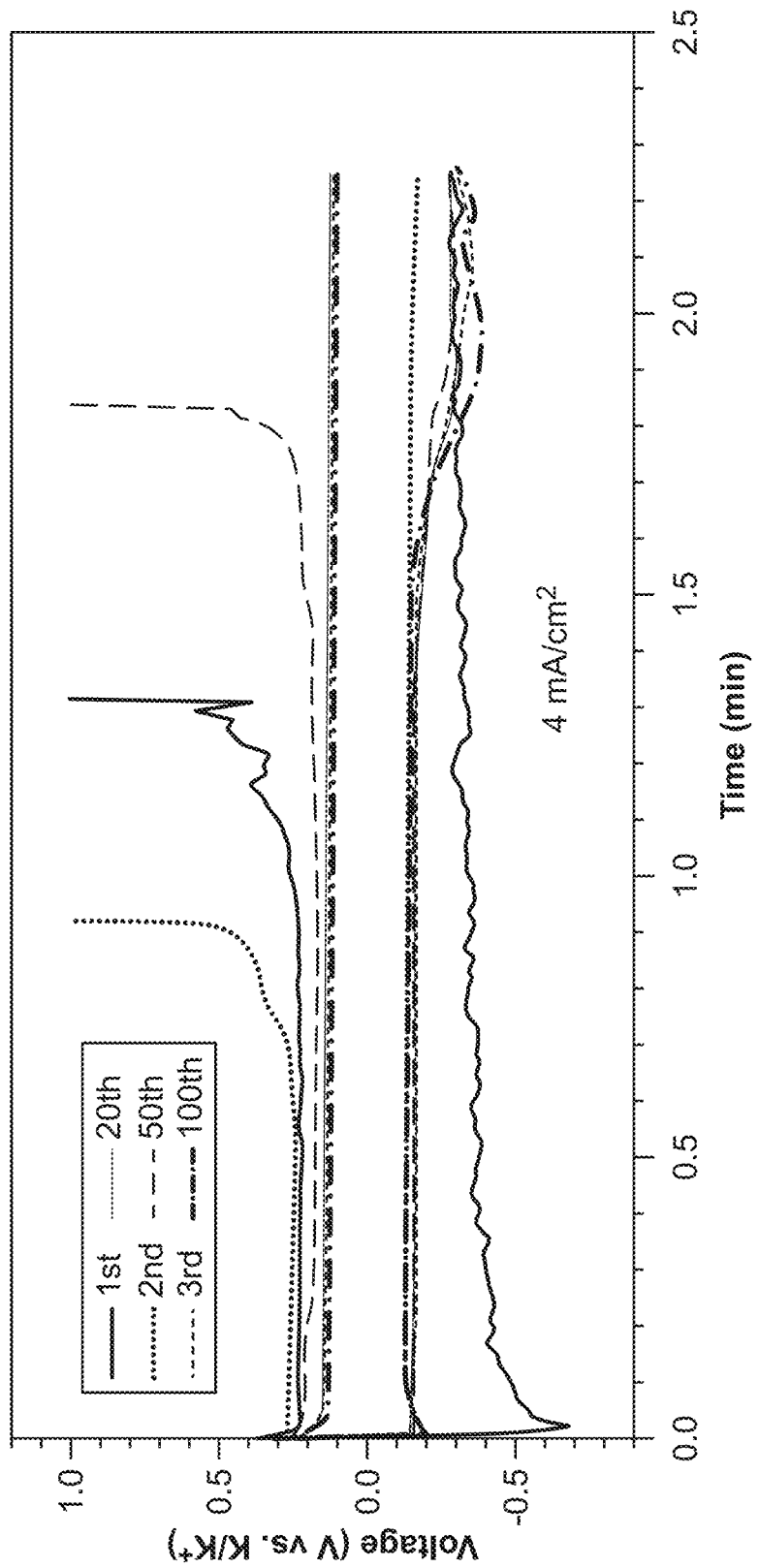
Figure 3E:
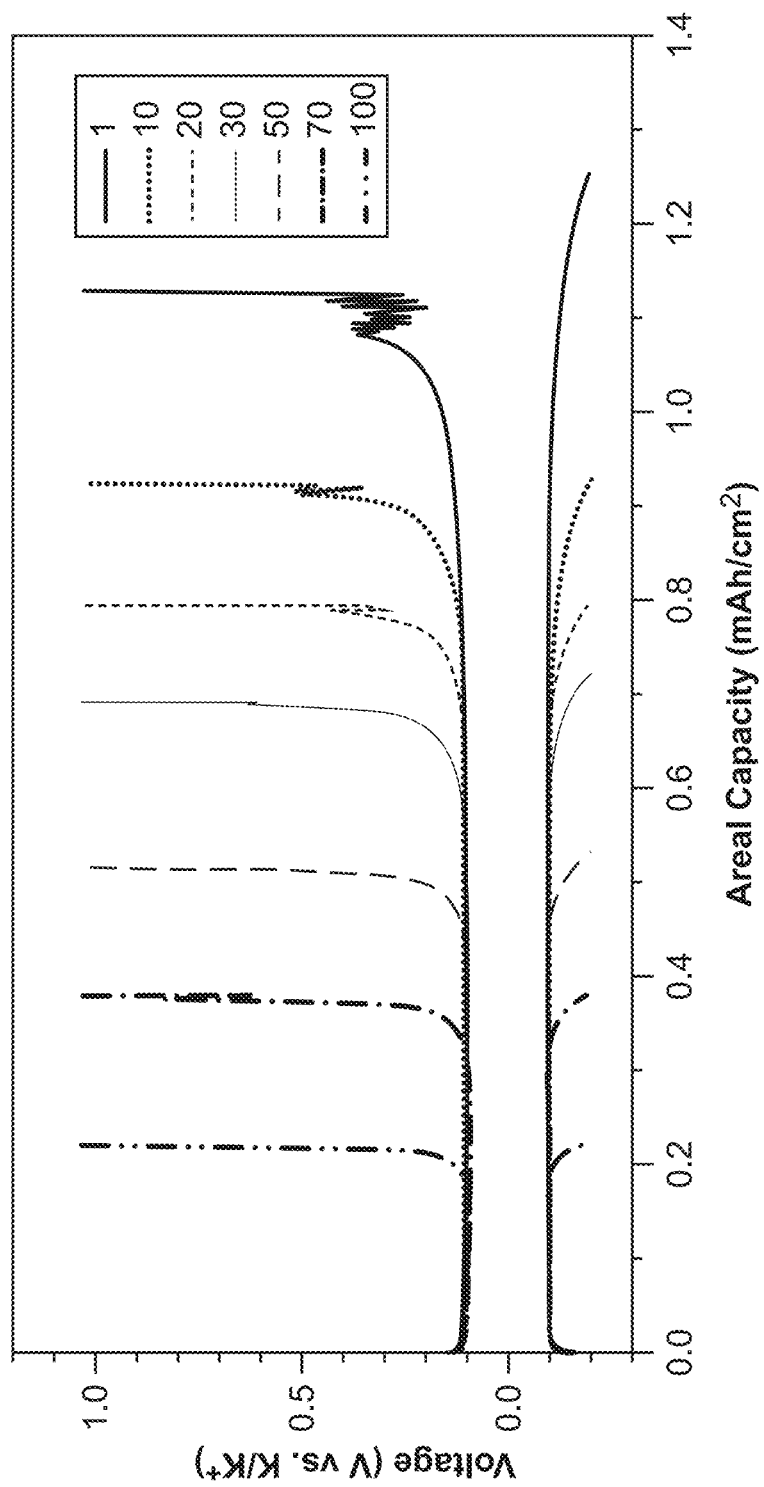
Figure 3F:
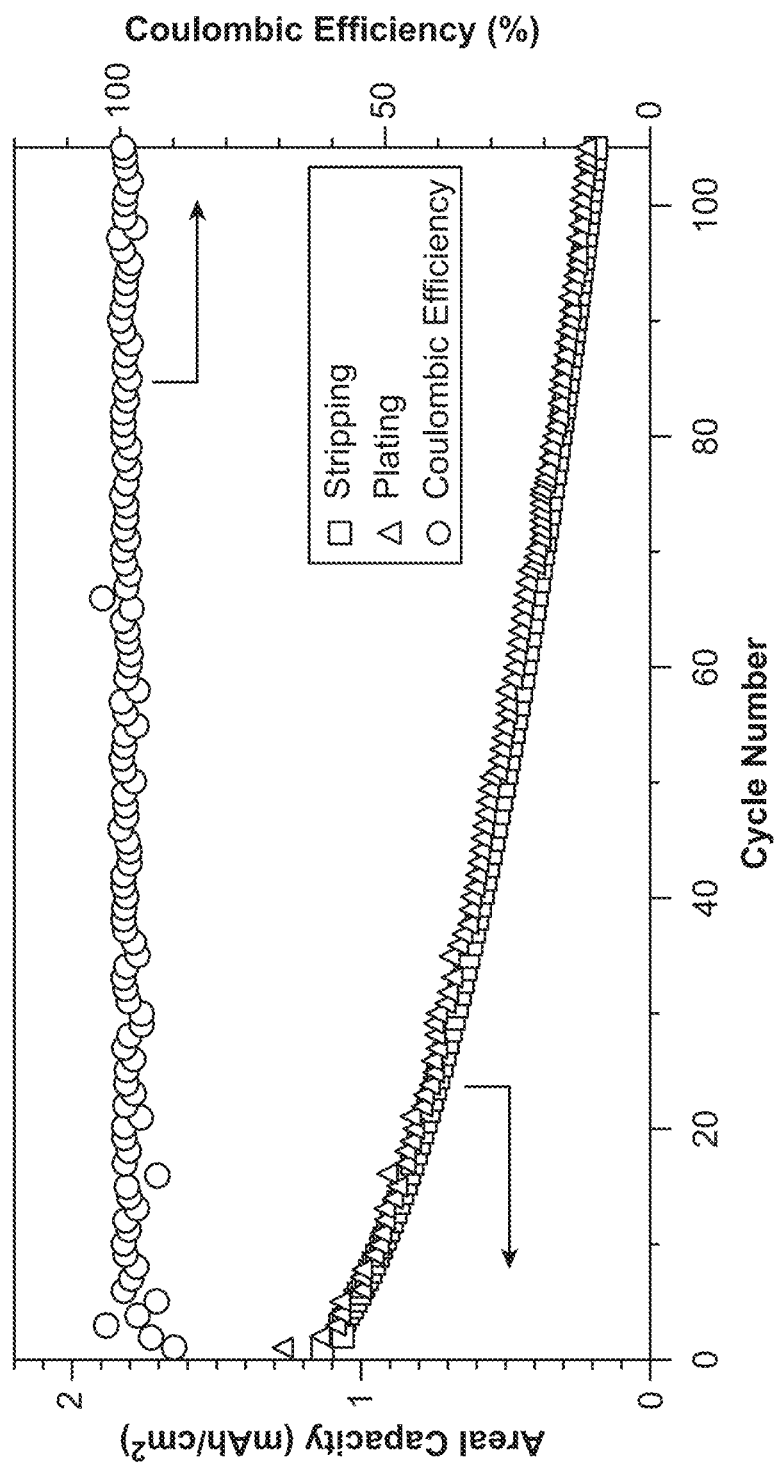
Figure 4A:
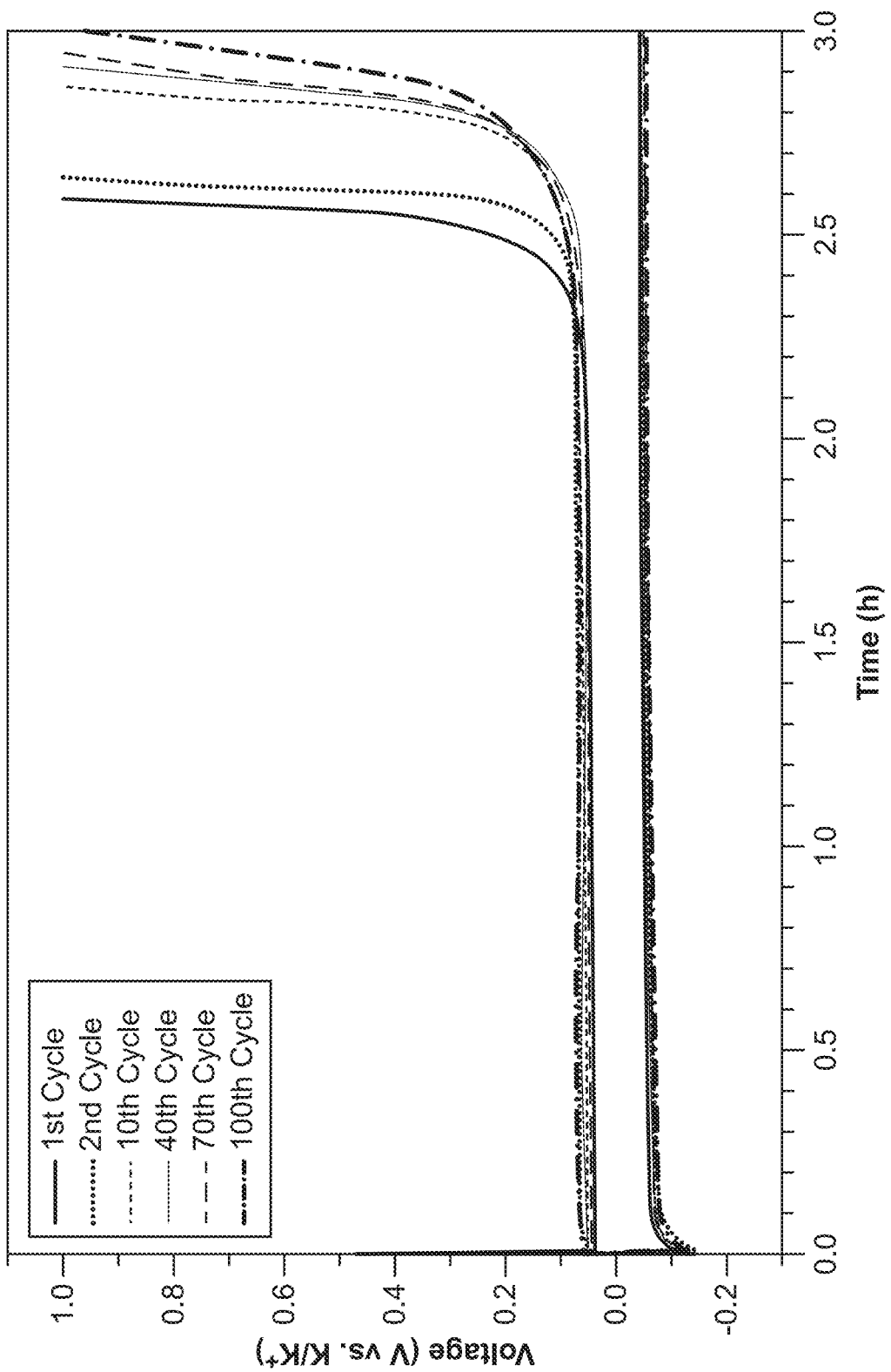
FIGS. 4A-B illustrate the discharge/charge profiles (FIG. 4A) and cycling performance (FIG. 4B) results with KFSI-DME=0.5 electrolyte (mole ratio) at 0.05 mA/$cm^2$.
Figure 4B:
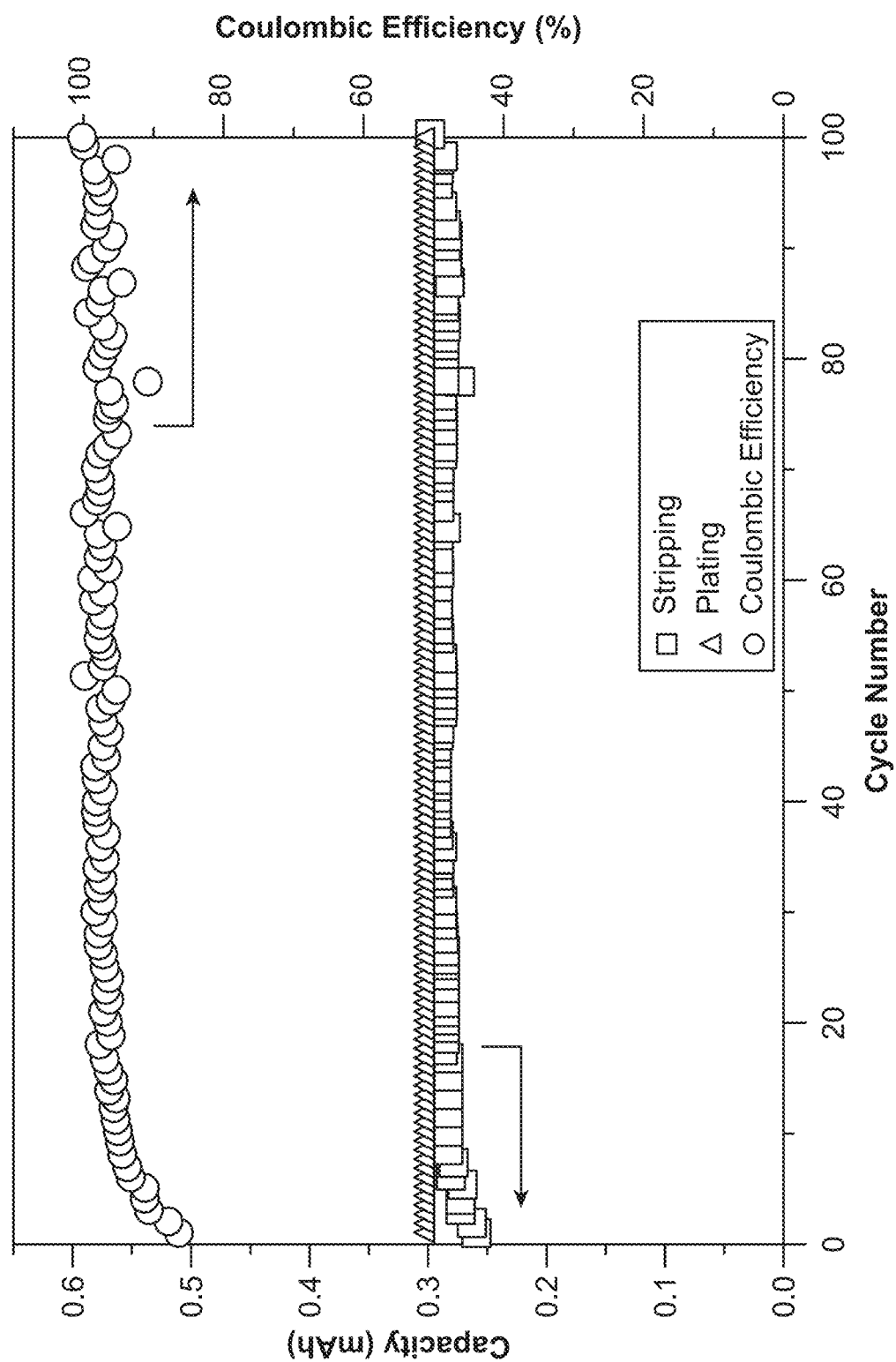

Galvanostatic cycling experiments were performed in order to evaluate the reversibility of K deposition/dissolution processes in various electrolytes. The coin cells were assembled with a K counter electrode, a bare Cu working electrode, and a separator in between. A fixed rate of 0.05 $mA/cm^2$ was used during cycling with a charging cut-off at either 1.0 V (vs. $K/K^+$) or the same discharge depth. The coulombic efficiency for each cycle was defined by the ratio of K plating capacity to K stripping capacity. Among the different electrolytes tested, KFSI salt in DME was the only formulation that enabled a reversible K plating and stripping in the long term (FIG. 1A). 1M $KPF_6$-DME, 1M KTFSI-DME and 0.8M $KPF_6$-EC/DEC (water<10 ppm) all failed to perform reversible K plating/stripping and resulted in cell failure within tens of cycles due to rapid capacity decay and low coulombic efficiency (FIG. 2). In contrast, using both dilute (mole ratio=0.1) and concentrated (mole ratio=0.5) KFSI-DME electrolytes can achieve high coulombic efficiency of 99% over 100 cycles. Further, utilizing 0.1 M KFSI in DME also exhibited high coulombic efficiency over multiple cycles. More importantly, this was also the first demonstration of highly reversible K metal plating/stripping electrochemistry. FIGS. 1B & 1C report galvanostatic discharge/charge curves and cycling performance (respectively) using KFSI/DME=0.1 electrolyte (mole ratio, 1M in molarity) in a K/Cu half-cell. Due to the initial side reactions between KFSI-DME and highly reductive K metal, the coulombic efficiency was below 90% in the first 5 cycles. However, the formation of SEI occurred and prevented the continuous consumption of electrolyte. Therefore, coulombic efficiency kept increasing as cycling proceeded and eventually reached 99% with the subsequent cycles. The overpotential remained unchanged within 200 cycles, indicating that a stable SEI was readily established in the early stages. Meanwhile, the reversibility of K plating and stripping was maintained with higher cycling rate/capacity (FIGS. 1D-E and FIG. 3) and electrolyte concentration (FIG. 4). At 4 mA/cm$^2$, the charging profile stopped curving up once residual K accumulated on the Cu electrode side, which gave K/K symmetric cell behavior. The higher coulombic efficiency of initial cycles in KFSI/DME=0.5 electrolyte was likely due to the fewer free DME molecules available for reduction by K metal.

Figure 5:
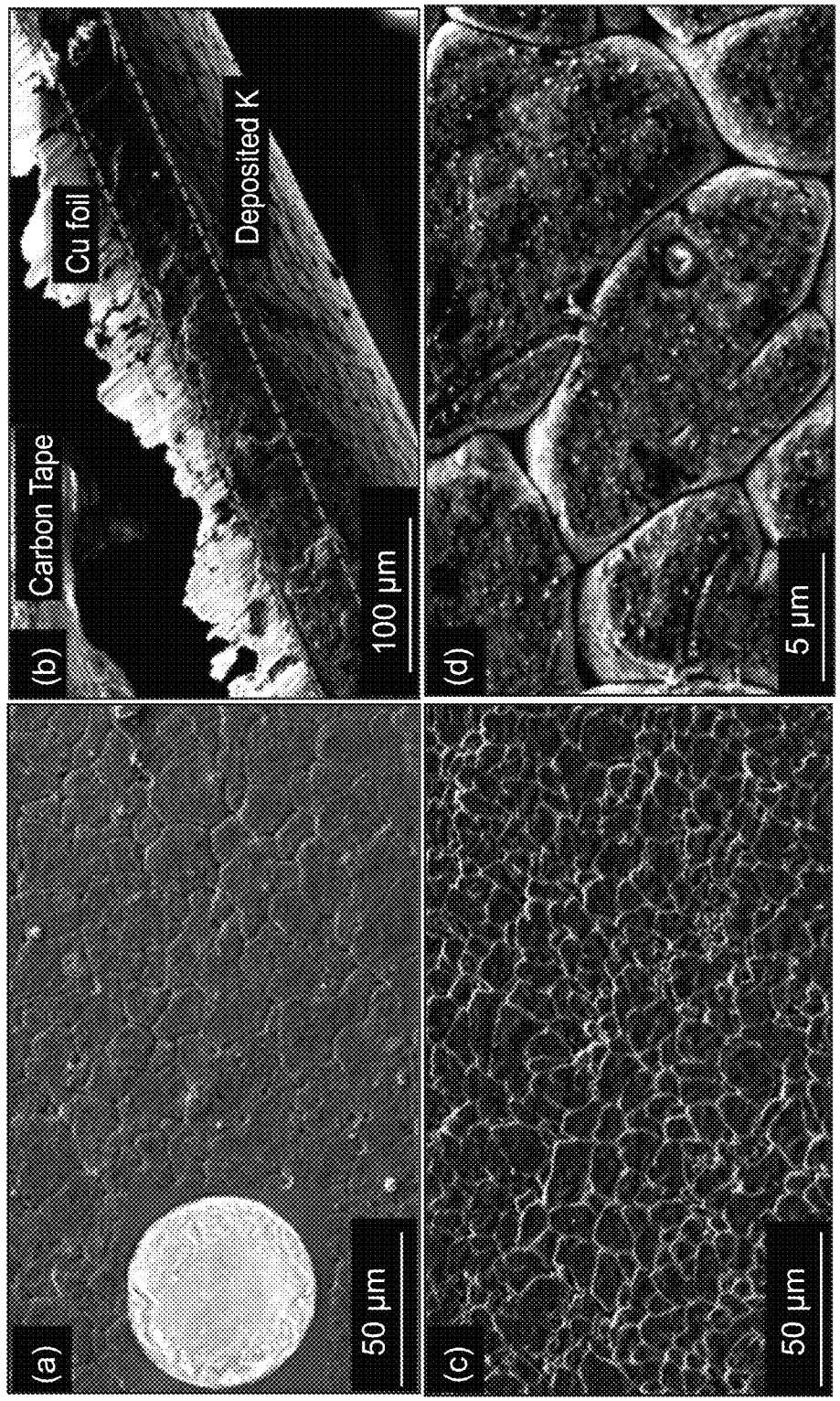
FIGS. 5A-D provide the results of scanning electron microscopy (SEM) imaging on the electrochemically plated K (3 mAh) with KFSI/DME=0.1 electrolyte (mole ratio).
Figure 6:
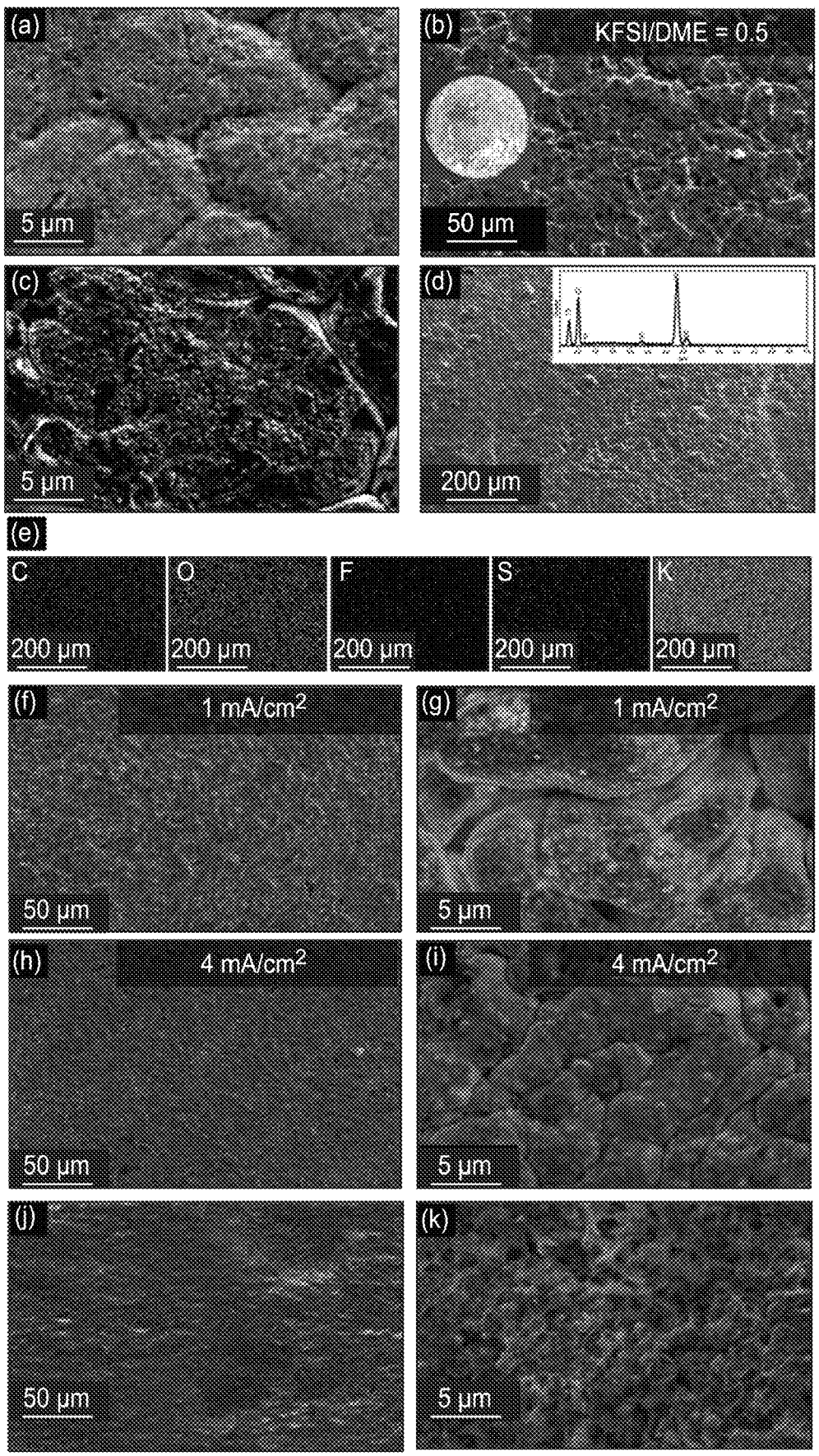
FIGS. 6A-K provides images of plated K and the K anode.
Figure 7:
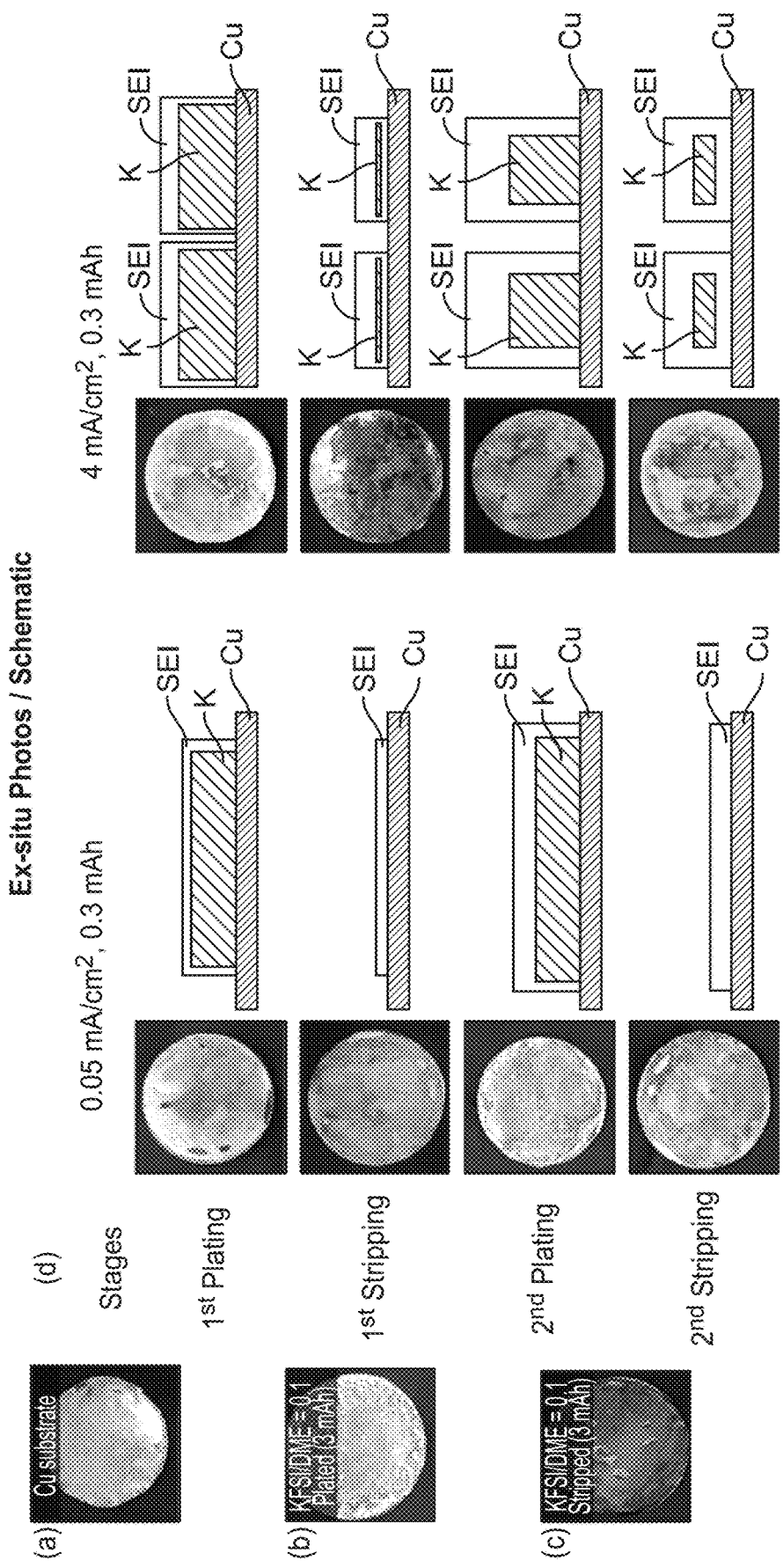
FIGS. 7A-D are photographs of pristine Cu substrate (FIG. 7A), electrochemically deposited 3 mAh K (FIG. 7B), the same cell charged back and cut-off at 1.0 V (1$^{st}$ cycle) (FIG. 7C), and ex-situ photos with an accompanying schematic of Cu electrode at different stages with low and high current densities (FIG. 7D).
Figure 8B:
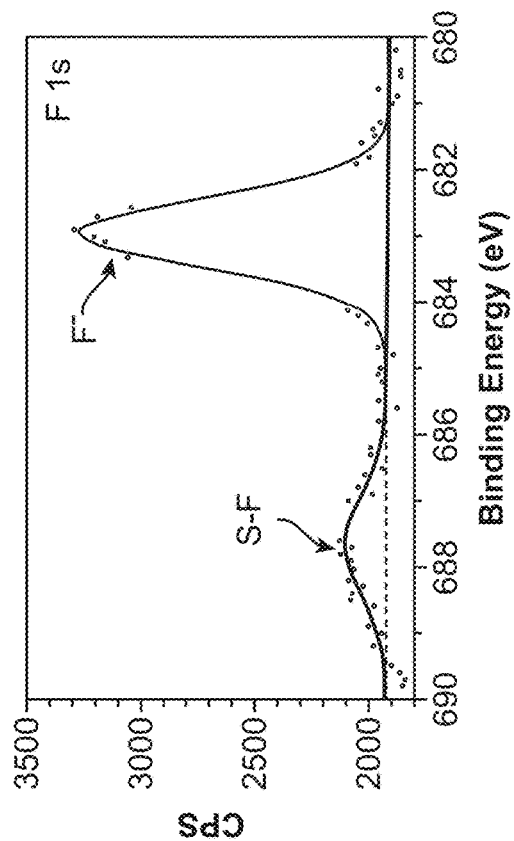
FIGS. 8A-D provides the results of X-ray photoelectron spectroscopy (XPS) characterization of K anode surface after cycling in KFSI/DME=0.1 electrolyte, including the XPS spectra of the K 2p and C 1s regions (FIG. 8A), O 1s regions (FIG. 8B), S 2p regions (FIG. 8C), and F 1s regions (FIG. 8D). The thick colorful lines represent the fitted results.
Figure 8D:
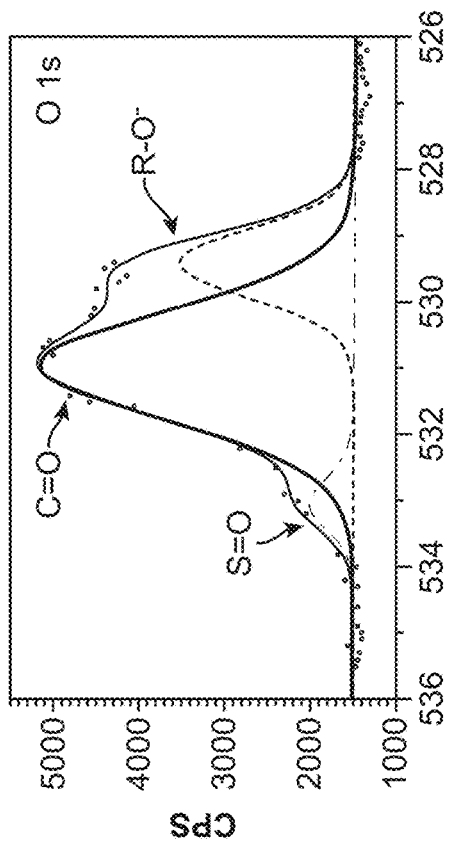
Figure 8A:
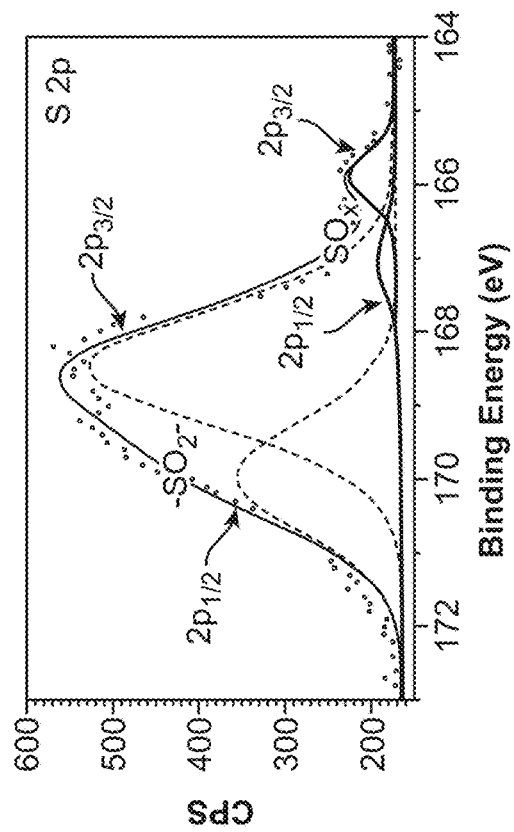
Figure 8C:
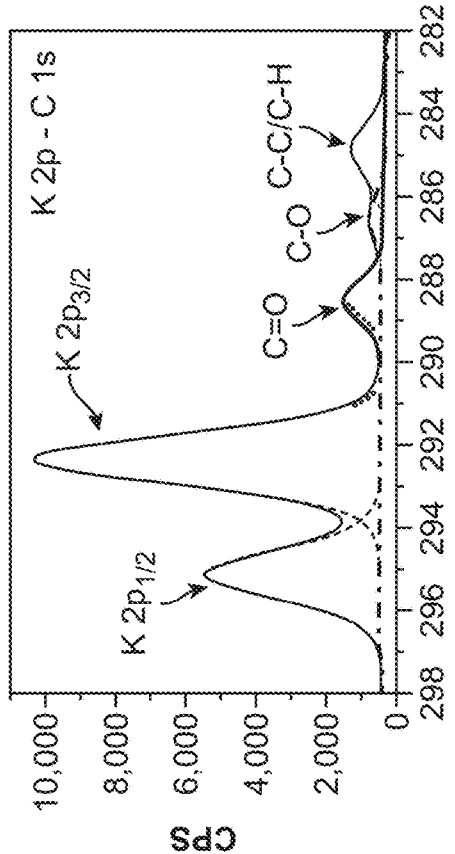
Figure 9B:
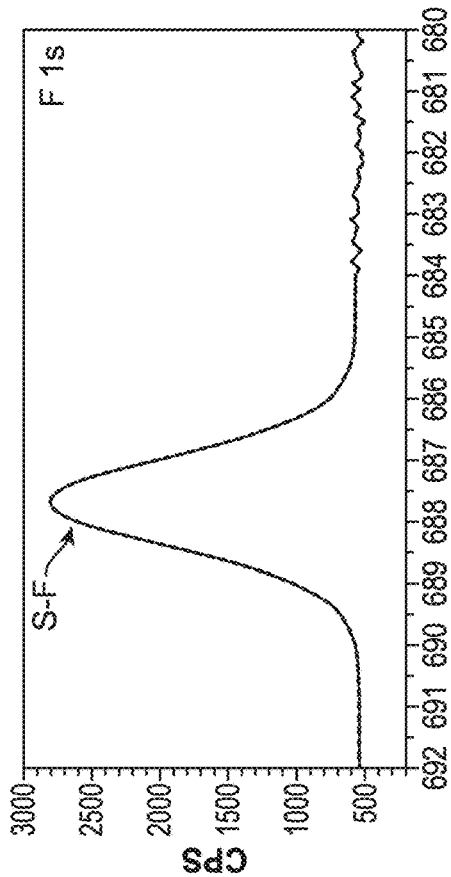
FIGS. 9A-D provide the XPS spectra of pristine KFSI salt in its solid state, including the K 2p and C 1s regions (FIG. 9A), O 1s regions (FIG. 9B), S 2p regions (FIG. 9C), and F 1s regions (FIG. 9D).
Figure 9D:
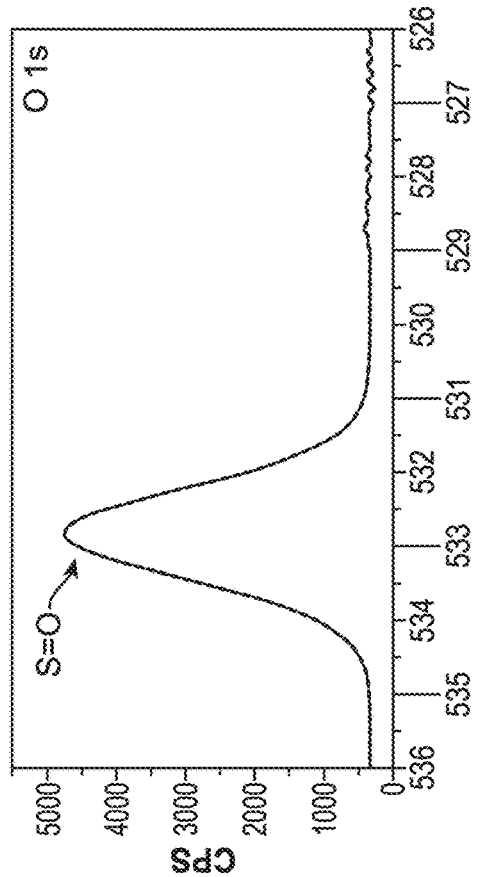
Figure 9A:
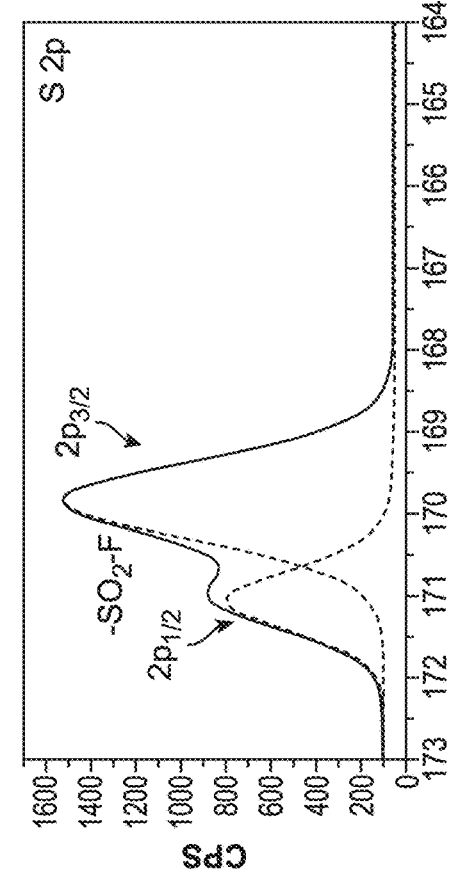
Figure 9C:
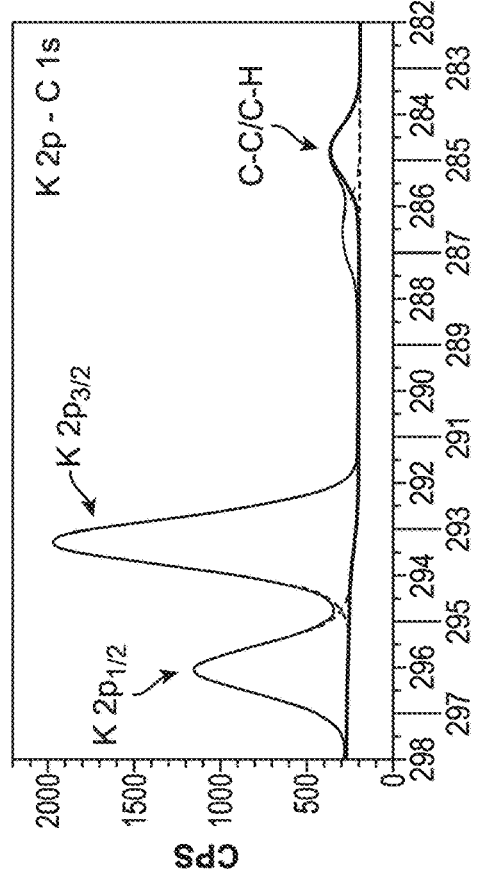

Since the reversibility of metal anode is determined by its surface morphology and SEI composition, scanning electron microscopy (SEM) and energy dispersive X-ray spectroscopy (EDS) were applied to further examine the electrochemically deposited K. FIGS. 5A-D illustrate the surface morphology and cross-section of K from 3 mAh deposition at the rates of 0.05 and 0.5 mA/cm$^2$. The electrochemically deposited K metal displayed a flat and uniform morphology on the Cu substrate. The entire surface was evenly covered by numerous brick-like domains with an average grain size of 15 μm. The inset in FIG. 5A shows uniform K coverage with metallic luster. The zoomed-in image illustrates that each domain is composed of numerous tiny crystals. This ordered surface morphology should benefit the compactness of SEI, prevent excessive side reactions, and maintain a dendrite-free K electrode upon cycling. Furthermore, the EDS mapping (FIG. 6E) revealed that the SEI is composed of C, O, F, S and K elements, which distribute evenly across the electrode surface. The plated K can also be readily stripped by the subsequent charging process (FIGS. 7A-C).

To better understand the contribution of KFSI-DME electrolyte towards SEI formation, X-ray photoelectron spectroscopy (XPS) was used to probe the chemical components of the cycled K anode surface. FIG. 8 shows the XPS spectra of K 2p, C 1s, O 1s, S 2p and F 1s. The S 2p 3/2 peak at 168.5 eV binding energy is likely from the —SO$_2$— fragment after the decomposition of FSI$^-$ anion. Compared with the binding energy of S 2p 3/2 in pristine KFSI (FIG. 9), the shift may indicate the effect of losing electron-withdrawing F after the S—F bond breakage. Meanwhile, a weak signal at 165.9 eV is associated with potassium sulfate species (KSO$_x$), resulting from the further cleavage of N—S bond. It was discovered that the F 1s spectrum shows two different fluorine species, which can be assigned to S—F species at 687.7 eV and KF species at a lower binding energy of 682.9 eV.[3] The detected KF species indicate that the S—F bond in the FSI$^-$ is cleaved. In the C 1s, the C—O and C=O species in the surface layer should originate from the decomposition of DME solvent. The O 1s signals implied the existence of S=O and C=O along with some oxide species.[3]

Figure 10B:
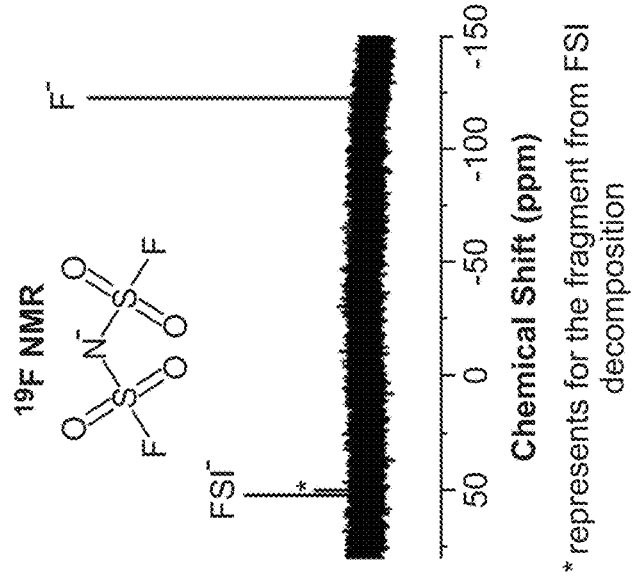
FIGS. 10A-D provide the results of room temperature 400 MHz nuclear magnetic resonance (NMR) spectroscopy, where
Figure 10D:
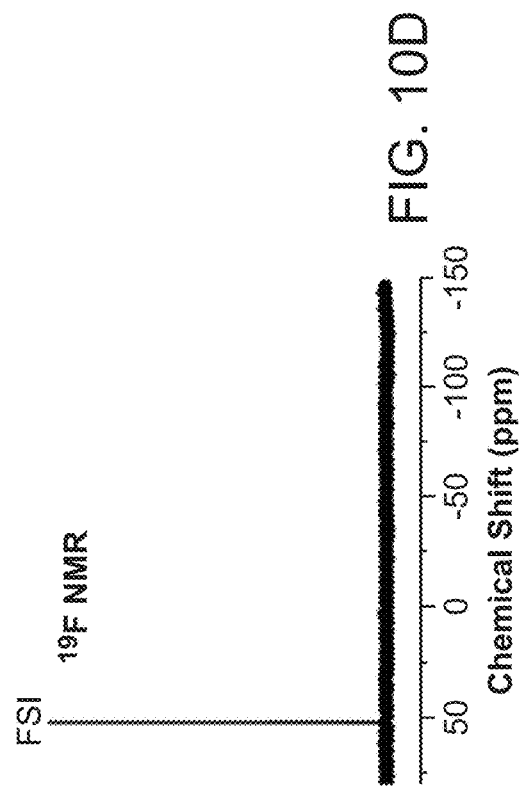
Figure 10A:
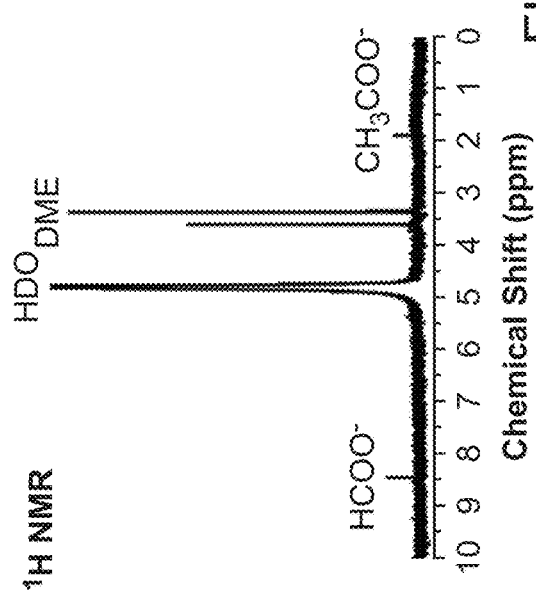
Figure 10C:
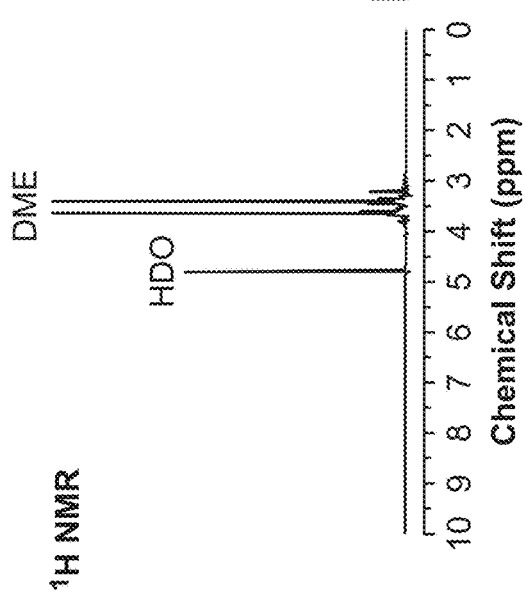

$^1$H-NMR and $^{19}$F-NMR further confirmed the components of the surface layer (FIGS. 10A-B). The surface layer was dissolved in D$_2$O for NMR measurements. Small amounts of formate (HCOO$^-$, δ=8.45 ppm) and acetate (CH$_3$COO$^-$, δ=1.9 ppm) species were detected in the $^1$H-NMR, indicating a slight decomposition of DME molecules on the K surface. In the $^{19}$F-NMR, a notable F$^-$ peak (δ=−122 ppm) was observed, which corresponds to the KF formed by the decomposition of FSI$^-$ anion. Besides the KFSI salt residual peak (δ=52 ppm), another new weak peak showed up at δ=50 ppm, implying that the cleavage of N—S or S—F bonds in FSI$^-$ ions also left —SO$_2$—F species, such as FSI(—F). The aforementioned organic and inorganic components worked synergistically synergistically to both passivate K surface and conduct K$^+$, which enabled the reversible K deposition and dissolution electrochemical processes in KFSI-DME electrolyte.

Figure 11A:
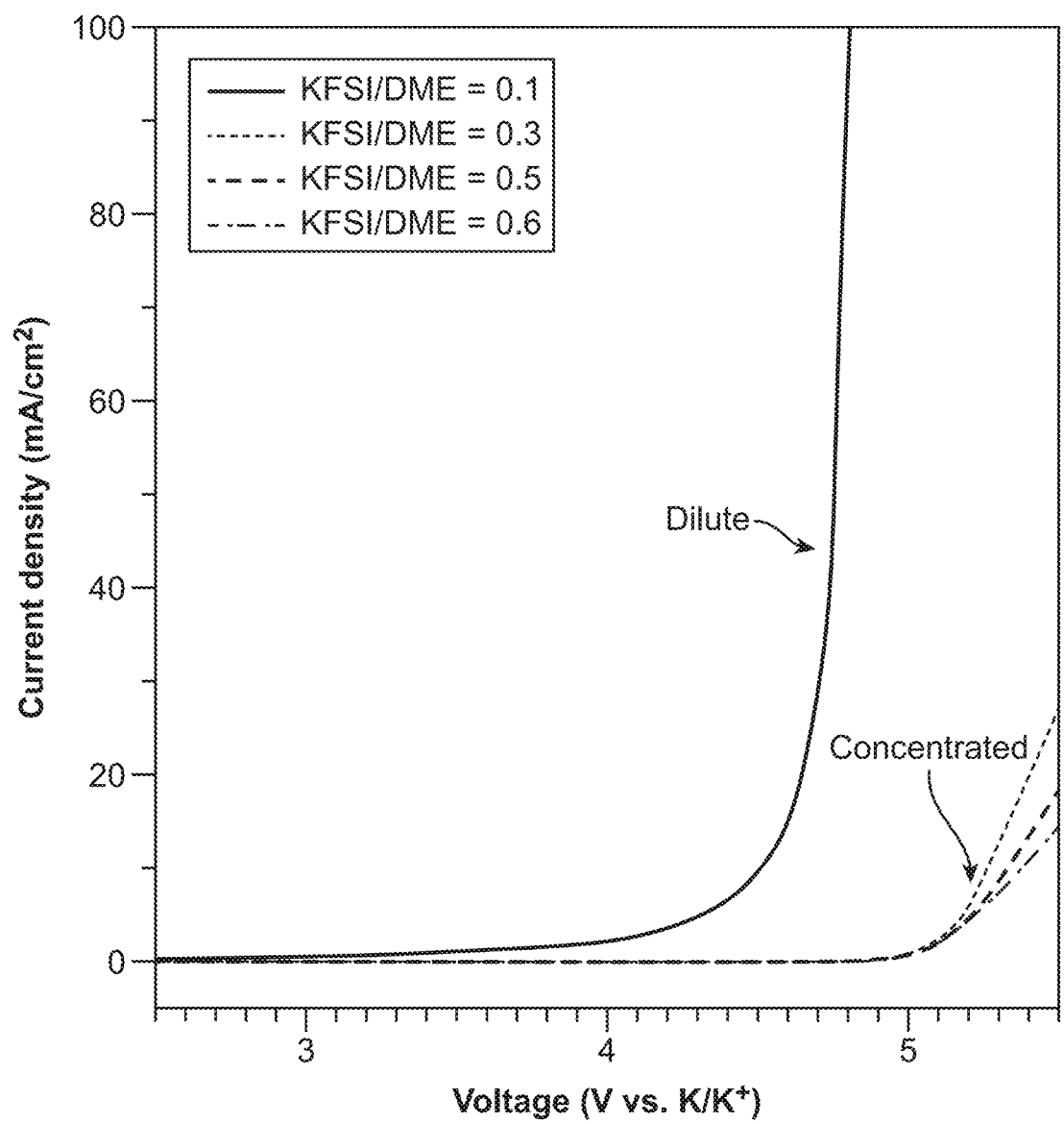
FIG. 11A-B illustrate the electrochemical stability of KFSI-DME electrolytes (Pt working electrode=0.031 cm$^2$) (FIG. 11A) and Raman spectra of KFSI-DME electrolytes with various concentrations (mole ratios)(FIG. 11B).

Besides the K plating and stripping behavior, the electrochemical stability of KFSI-DME electrolyte is also critical for evaluating this new electrolyte in rechargeable K batteries. Linear sweep voltammetry (LSV) was used to probe the oxidation stability of KFSI-DME electrolytes and the concentration effect. As illustrated in FIG. 11A, the dilute KFSI-DME electrolyte exhibits a rapid increase of anodic current from 3.5 V, indicating a relatively narrow electrochemical window due to electrolyte decomposition. In contrast, concentrated KFSI-DME electrolytes revealed much enhanced oxidation durability and no significant anodic current was induced up to 5.0 V versus K/K$^+$.

Figure 11B:
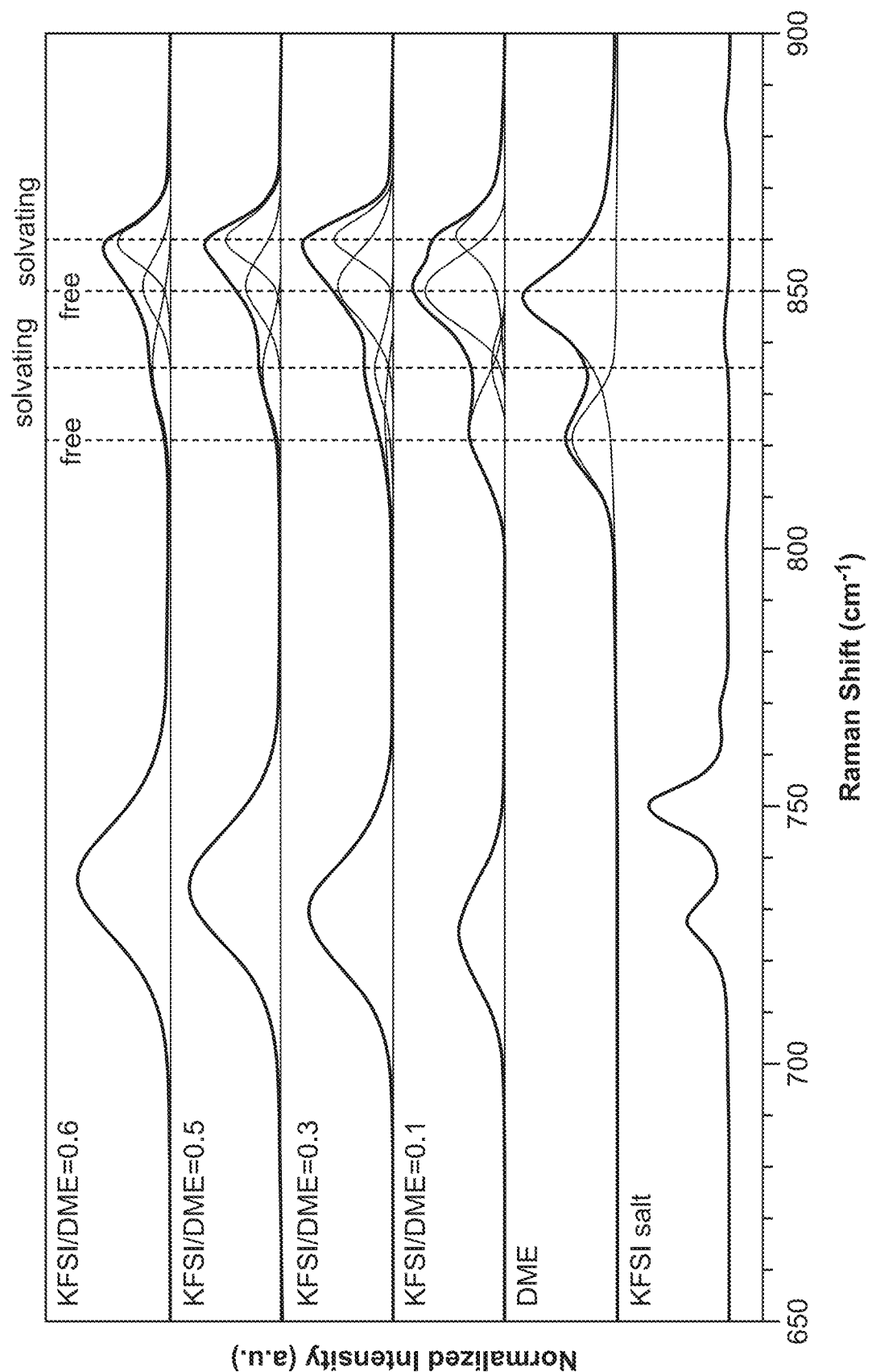

To further understand their solvation structures, FIG. 11B compares the Raman spectra for KFSI-DME electrolytes at different concentrations. The Raman peak at 700-780 cm$^{-1}$ results from the vibration of FSI anions solvated by DME. In the dilute KFSI-DME electrolyte, the majority of FSI exists as free anions due to the dissociation of KFSI salt and strong K$^+$-coordinating ability of DME molecules. While in the concentrated solutions, the FSI$^-$ behaves more like its solid state. On account of more interaction with K$^+$ and fewer free FSI ions, the FSI peak then shifts to a higher wavenumber. The pure DME solvent shows two characteristic peaks at 821 and 851 cm$^{-1}$ for CH$_2$ rocking and C—O stretching.[18] After dissolving KFSI in DME, two additional peaks appear at 835 and 860 cm$^{-1}$ respectively, and keep growing with the increase of salt concentration (DME solvating K$^+$). The Raman spectra shows a distinct difference between KFSI/DME=0.1 and KFSI/DME=0.3 electrolytes regarding the intensities of the free and solvating peaks, which aligns well with our observation in LSV. The DME molecules in the concentrated electrolyte solution tend to donate their oxygen lone pair electrons to K$^+$ (solvation) and therefore have lower highest occupied molecular orbital (HOMO) than free DME molecules in the dilute solution. The decrease in HOMO energy levels then mitigate the oxidative decomposition of concentrated KFSI-DME electrolyte.[19]

Figure 12A:
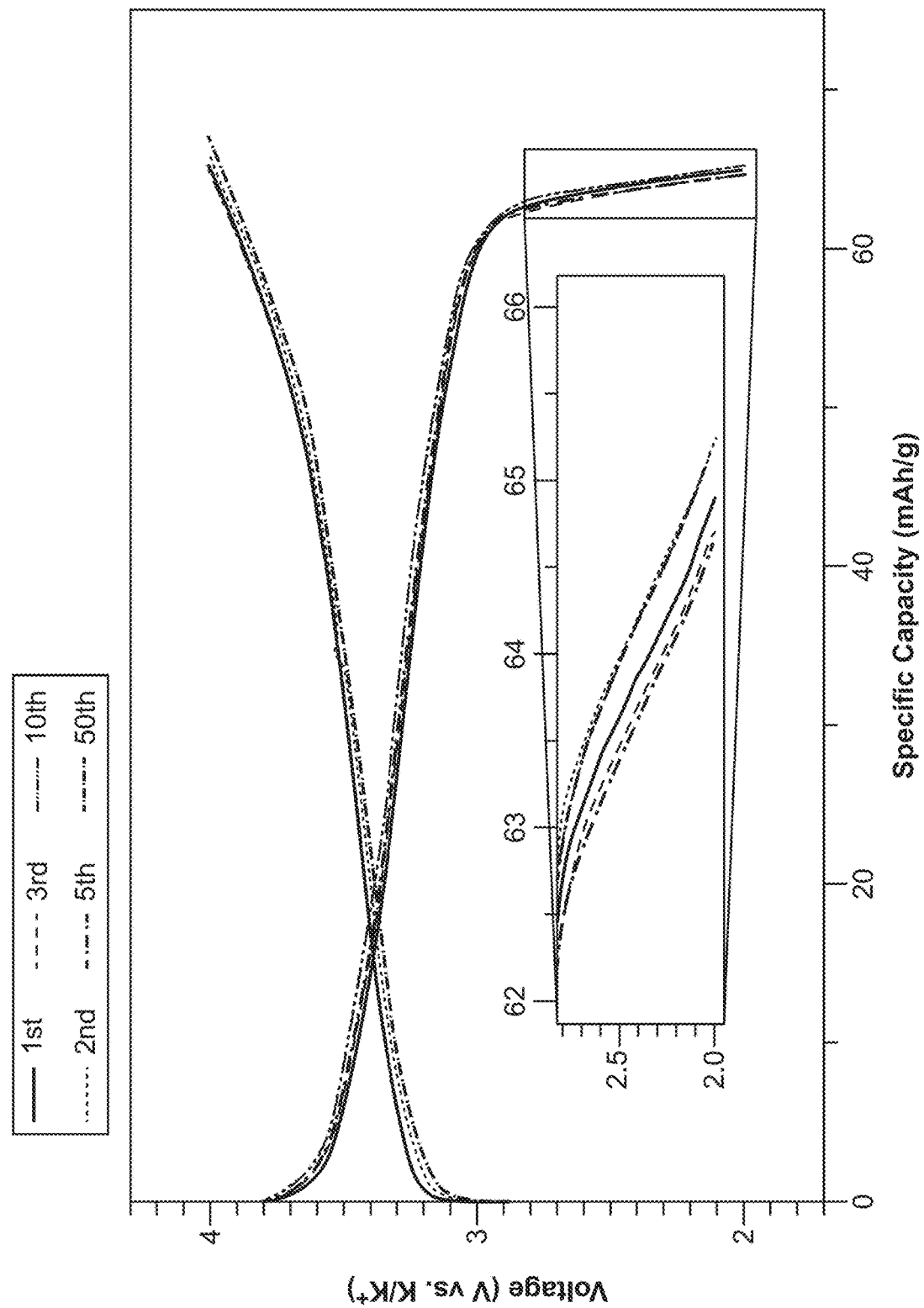
FIGS. 12A-B illustrate the voltage profiles (FIG. 12A) and cycling performance (FIG. 12B) of K/KPB cell with KFSI-DME=0.6 electrolyte (water<15 ppm) at a rate of 100 mA/g$_{(KPB)}$.
Figure 12B:
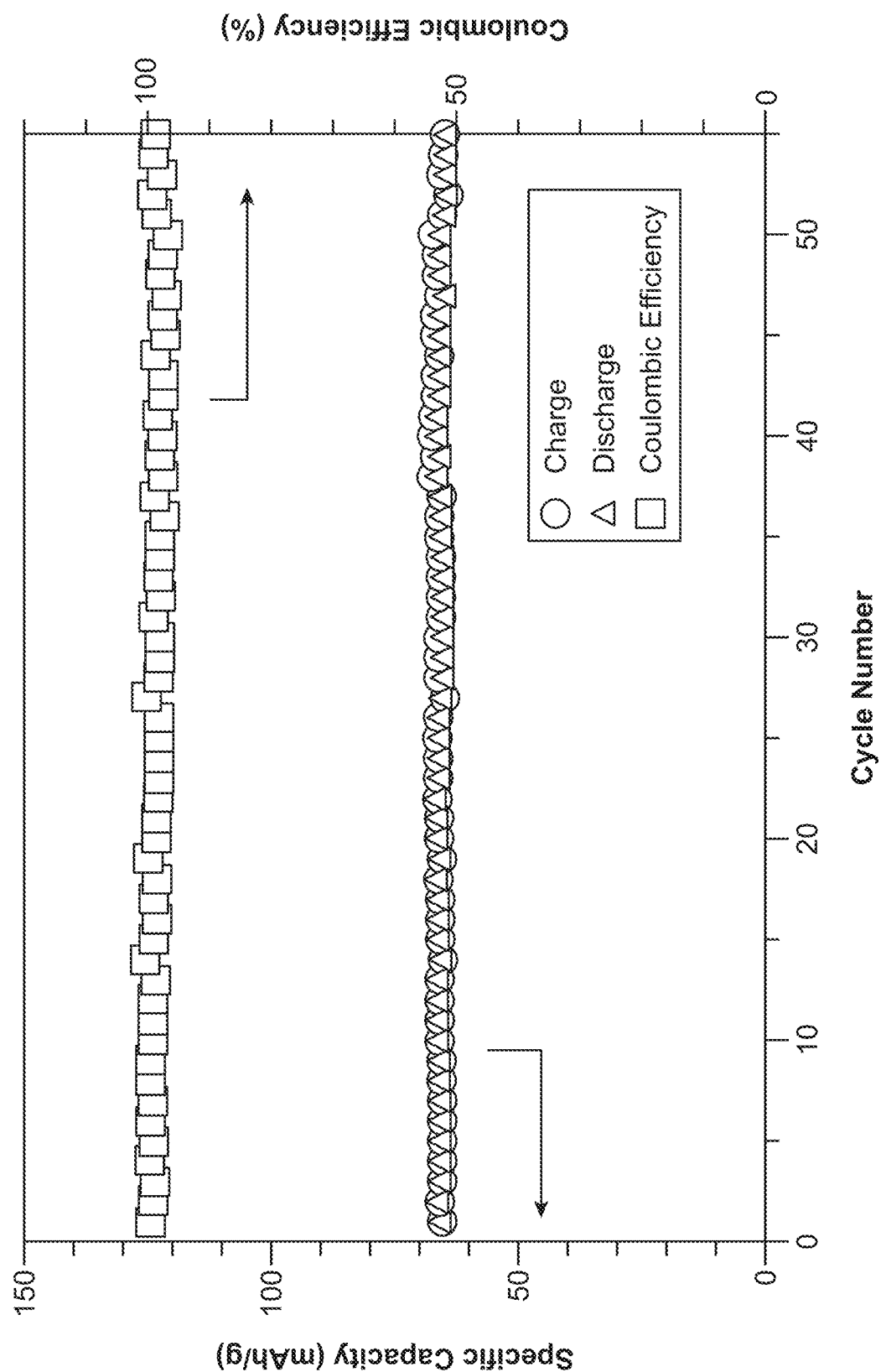
Figure 13A:
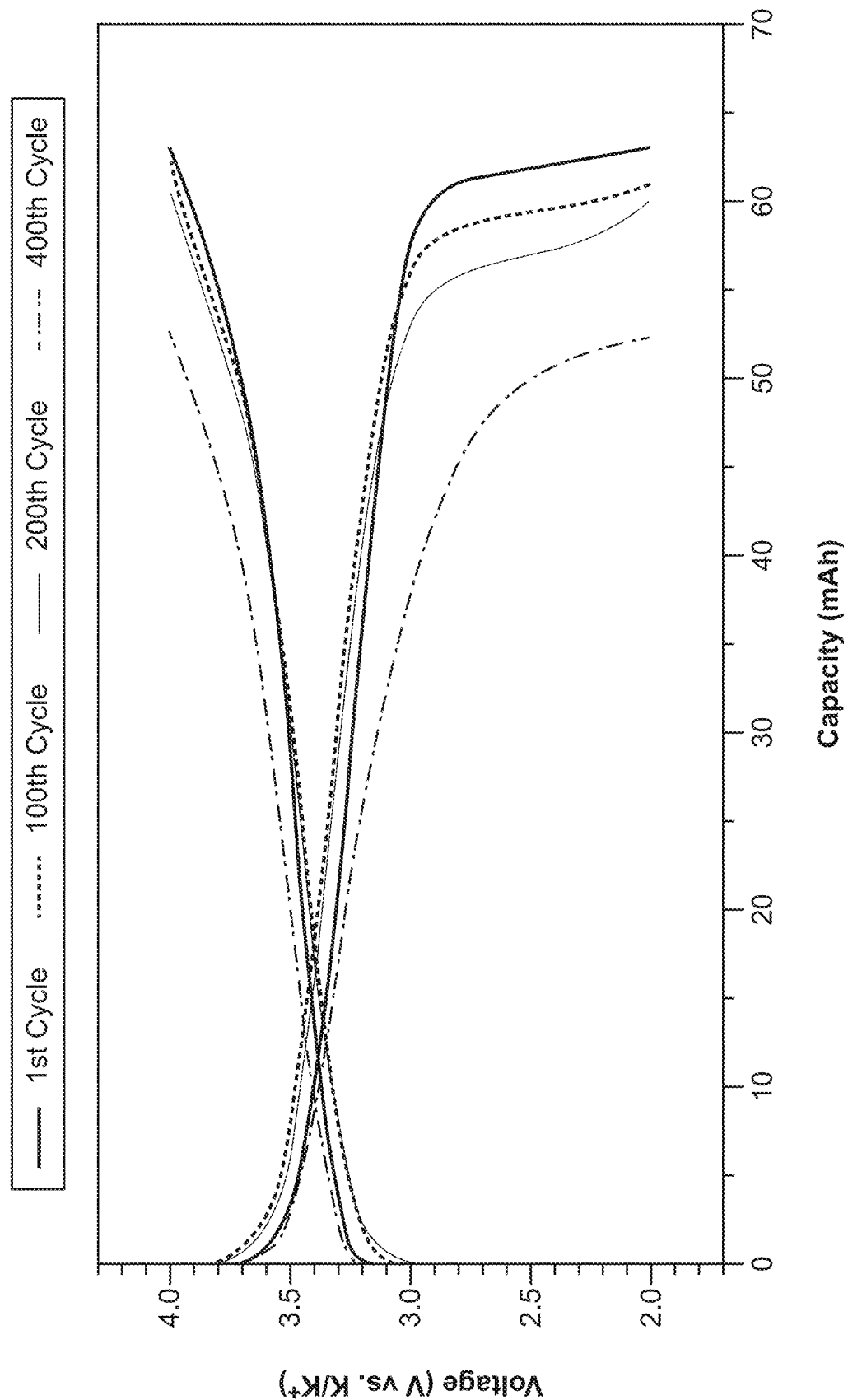
FIGS. 13A-B illustrate the voltage profiles (FIG. 13A) and cycling performance (FIG. 13B) of K/KPB cell with KFSI-DME=0.6 electrolyte (water<15 ppm) at a rate of 100 mA/g$_{(KPB)}$ for over 500 cycles.
Figure 13B:
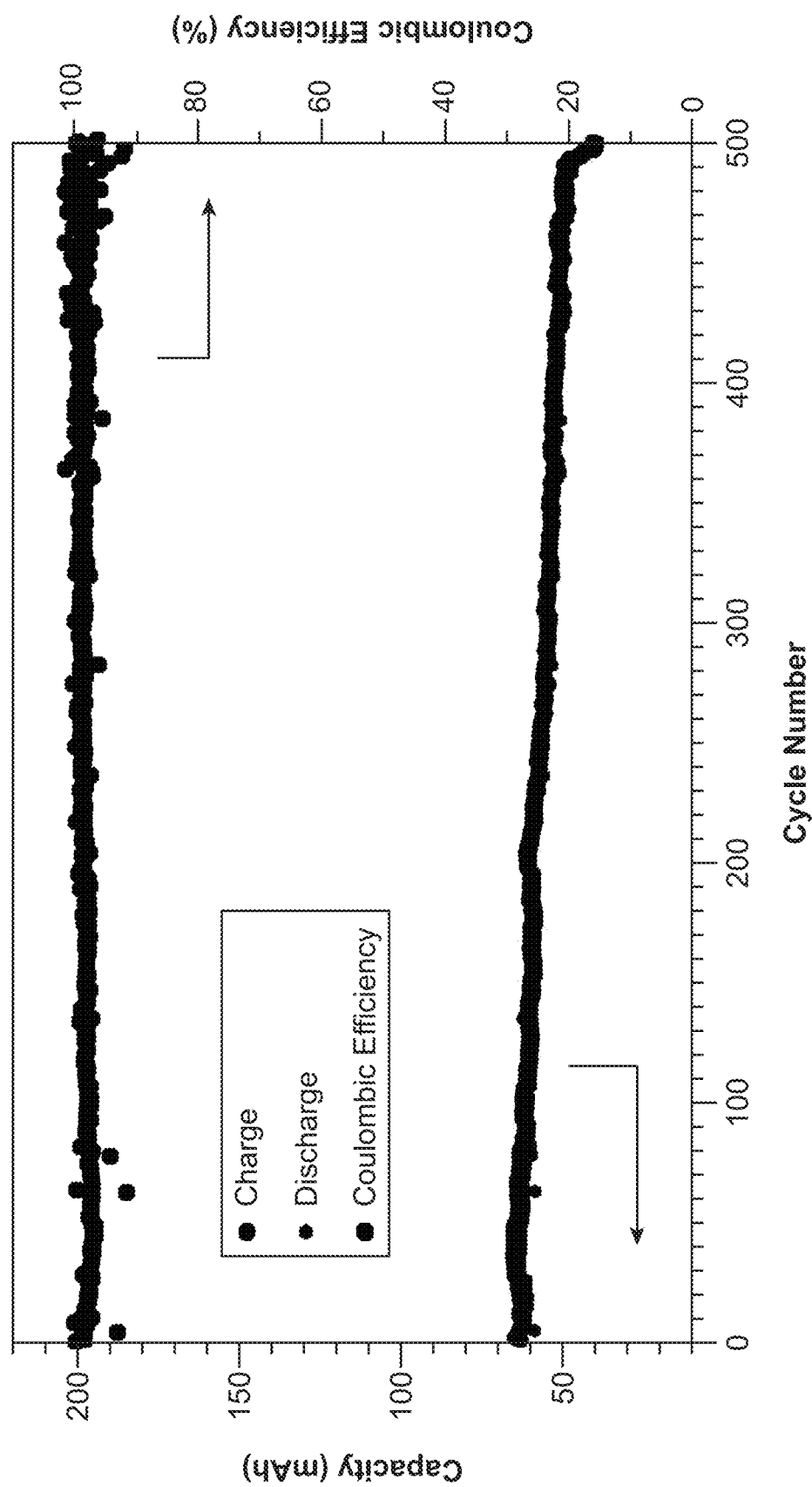
Figure 14A:
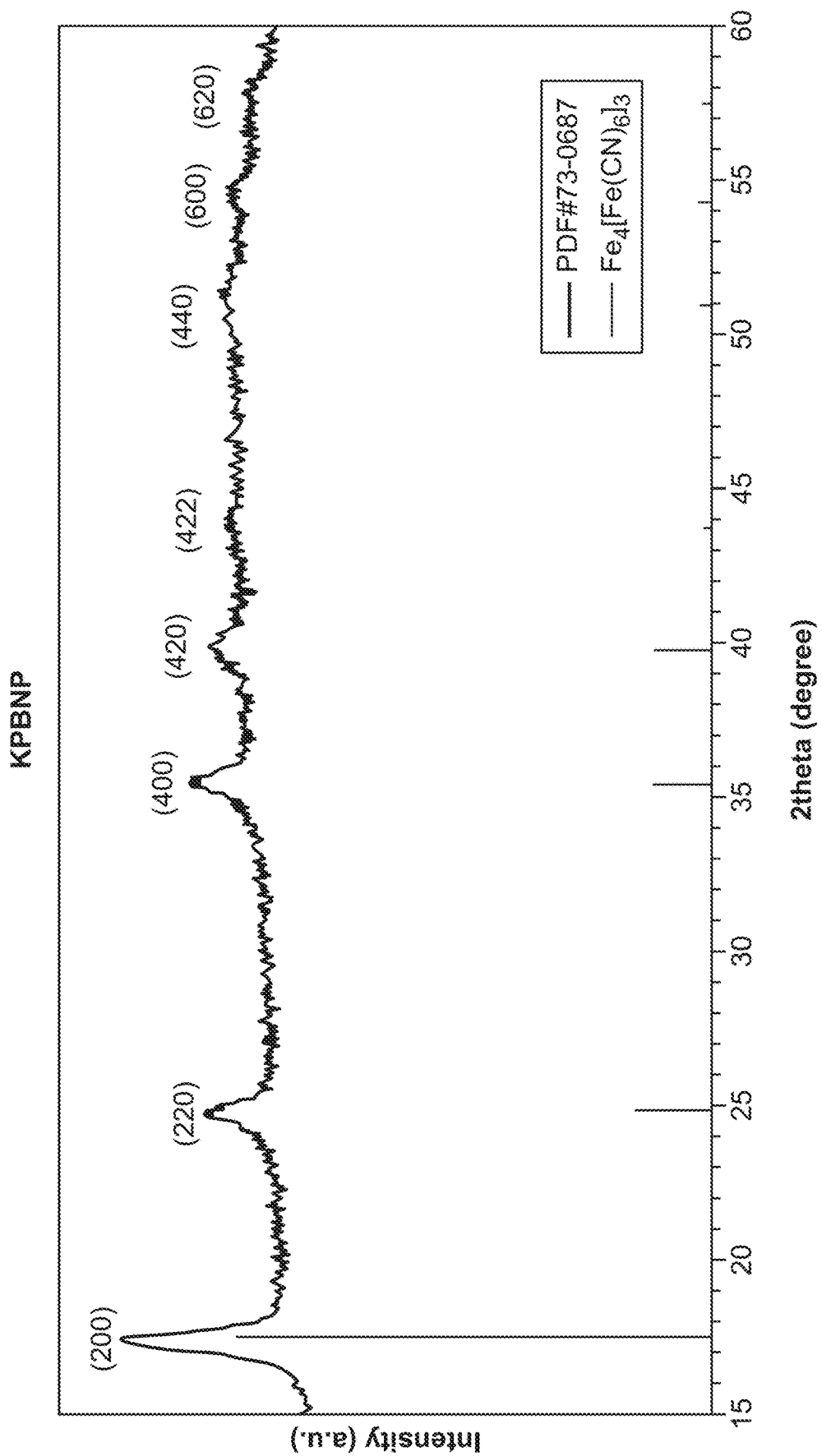
FIGS. 14A-C provide the characterization of synthesized potassium Prussian blue particles by XRD (FIG. 14A) and XPS (FIGS. 14B-C).
Figure 14B:
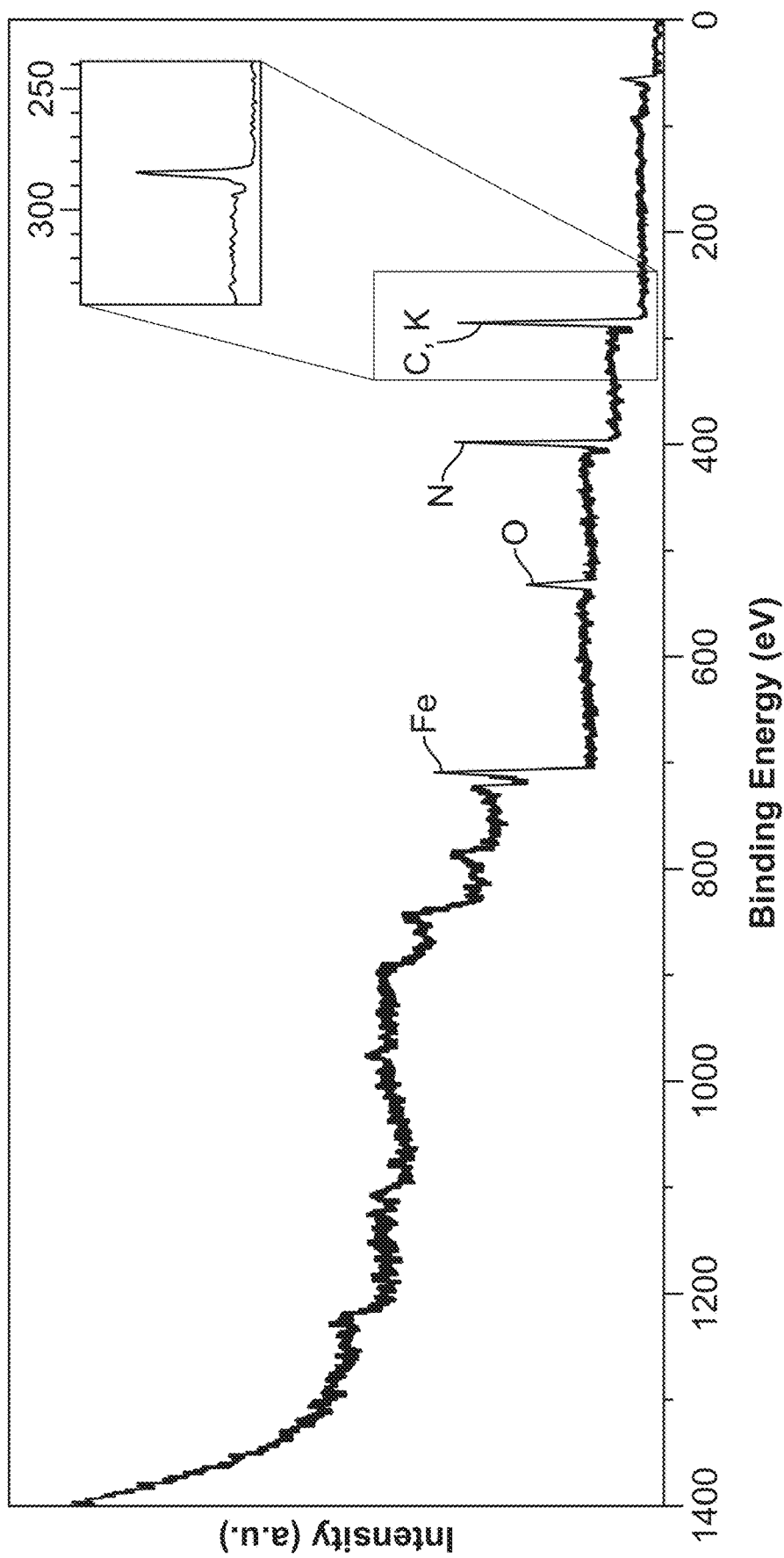
Figure 14C:
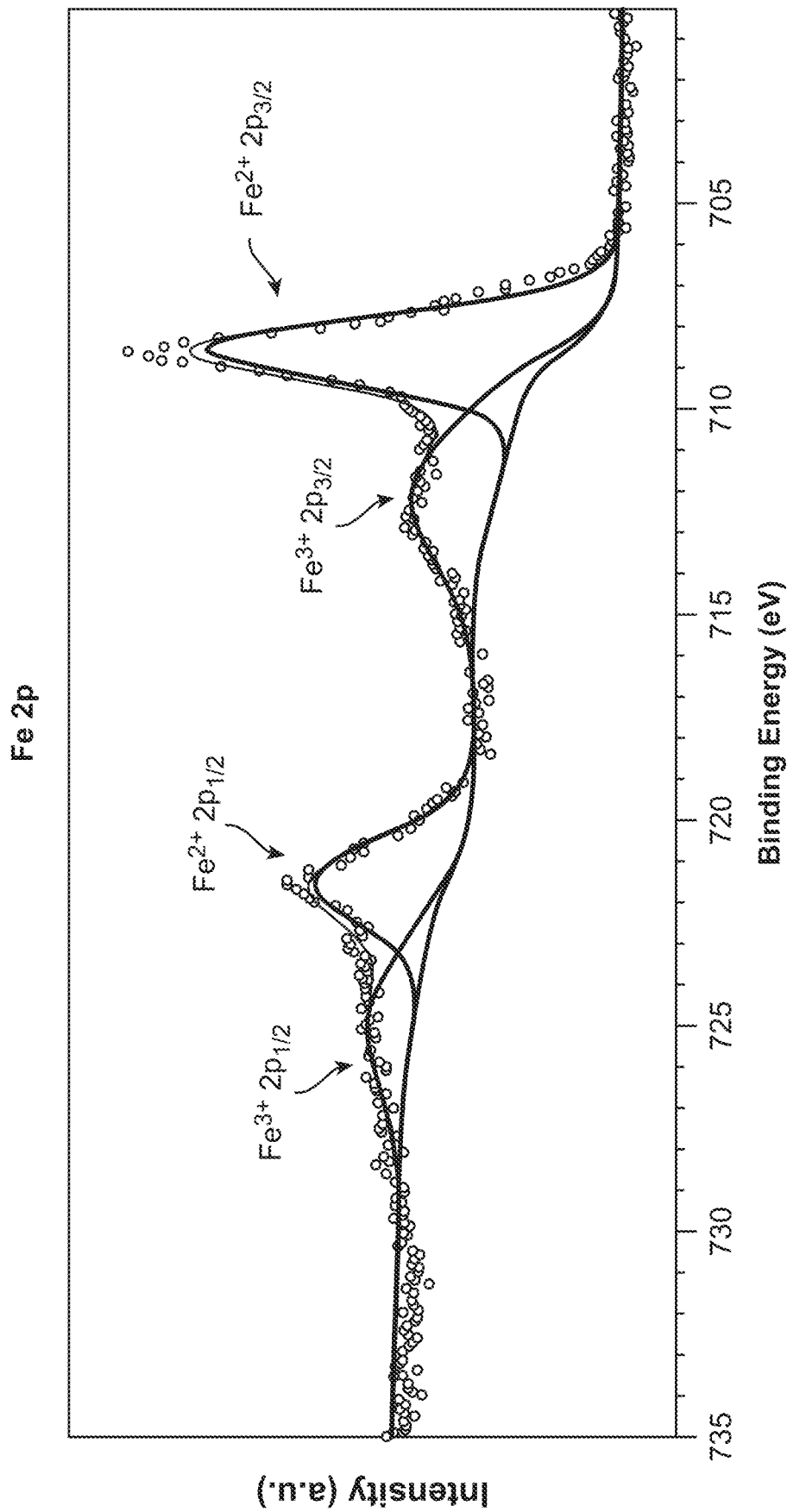

The enhanced electrochemical window of concentrated KFSI-DME makes it possible to couple with a high-voltage cathode in potassium metal batteries. For example, the cyanoperovskite K$_x$MnFe(CN)$_6$ cathode demonstrated by Goodenough et al. requires a charging voltage of 4.2 V (vs K/K$^+$).[7] Highly concentrated electrolyte is also known to preserve Al current collector by preventing the dissolution of Al complexes.[15,20] As shown in FIGS. 12A-B & 13A-B, the compatibility of KFSI/DME=0.6 electrolyte with a potassium Prussian blue (KPB) cathode (characterized data provided in FIG. 14) has been verified.[6] After precycling to remove the residual water in KPB material, the K/KPB cell displays a stable cycling performance at the rate of 100 mA/g$_{(KPB)}$ between 2.0 V and 4.0 V versus K/K$^+$. An average coulombic efficiency of 98% is achieved with the average discharge capacity of 65 mAh/g$_{(KPB)}$ in 50 cycles (FIG. 12B). As illustrated in FIGS. 13A-B, similar stable cylic performance, average coulombic efficiency, and average discharge capacity was exhibited for almost 500 cycles. The reversible K plating/stripping, high voltage stability and excellent cycling performance achieved by concentrated KFSI-DME electrolyte verifies that it is a electrolyte for ambient-temperature potassium metal batteries.

Series 2—Results and Discussions

K Plating and Stripping for Series 2: The plating and stripping reversibility of potassium metal anode was studied using CR2032-type coin cells. Each cell consisted of a Cu foil (15.5 cm in diamerter) as the working electrode, a glass fiber separator (GF/A, Whatman) and celgard membrane soaked with 60 μL electrolyte, and K metal foil (ca. 25 mg, 99.5%, Sigma-Aldrich) or electrochemically plated K as the counter electrode. The cycling was carried out using an MTI battery analyzer (BST8-WA) with the high cutoff voltage of 1.0 V (vs. K/K$^+$). The electrochemical cycling and plating was processed in a cell consisted of Cu foil as the working electrode, celgard soaked with concentrated KFSI/DME=0.6 electrolyte, and K metal foil as the counter electrode. 20 cycles of shallow (0.3 mAh) plating and stripping was performed to build the initial SEI on the electrode and then followed by a deep plating process (>3 mAh). The plated K metal anode with preformed SEI is rinsed with DME and transferred to the next coin cell or K—O$_2$ cell.

K—O$_2$ Cell Measurement: K—O$_2$ cells investigated in this study were assembled by stacking potassium metal anode (99.5% from Sigma-Aldrich or as prepared in previous paragraph ("ElDe K")), trilayer celgard separator (25 μm thickness), glass fiber separator (GF/D, Whatman) soaked with 250 μL DME-based electrolyte, and carbon fiber electrode (d=12 mm, Freudenberg H23, Fuel Cell Store) in a home-made stainless steel battery module. All battery fabrication was performed in an Argon-filled glovebox. The carbon electrodes were dried at 120° C. under vacuum for 2 days prior to battery assembly. Additionally, 250 μL DME solvent was added to the oxygen chamber to saturate the oxygen and prevent the solvent vaporization. After purging the oxygen chamber with high purity oxygen (99.993% UHP, ca. 1 atm), the batteries were allowed to rest for 2 hours prior to discharge to ensure oxygen dissolution and diffusion. Galvanostatic cycling tests were carried out using a MTI battery analyzer (BST8-WA) with the cutoff voltages set at 1.8 and 3.0 V (vs. K/K$^+$).

Characterizations: Cells were disassembled in glovebox to obtain the desired samples for optic photographs and characterizations. The electrodes were repeatedly rinsed with DME solvent to remove residual electrolyte before analysis. Scanning electron microscopy (SEM) was performed using FEI Quanta 200 SEM to image the morphological characteristics with an accelerating voltage of 5 kV. Discharged electrode samples were prepared in a glovebox and transferred to the SEM chamber using an air-free SEM holder to prevent sample exposure to the ambient air.[101] X-ray photoelectron spectroscopy (XPS) analysis was performed on a Kratos Axis Ultra XPS spectrometer using monochromatic Al Kα radiation. All spectra were calibrated by referencing the C 1s peak position of the C—C peak at a binding energy of 284.8 eV. The spectra curve was fitted using a combined Gaussian-Lorentzian profile using the CasaXPS program. The X-ray diffraction (XRD) were performed on Bruker D8 Advance Powder XRD with Cu Kα1 radiation (λ=1.5406 Å). The discharge electrode was rinsed with DME to remove electrolyte residual. A polymer thermoplastic sealant (3M Company) was applied to seal the holder against the ambient air. $^1$H NMR and $^{19}$F NMR were carried out on a 400 MHz NMR spectrometer (Bruker, Avance III) after immersing the samples in D$_2$O (99.9 atom % D, Sigma-Aldrich).

A versatile strategy that utilizes both KFSI and KTFSI salts is demonstrated herein to achieve stable and reversible K metal anode and KO$_2$ cathode for K—O$_2$ batteries, which were cycled over 200 cycles (>800 hours) with coulombic efficiency (CE) maintained ~100%.

Figure 15A:
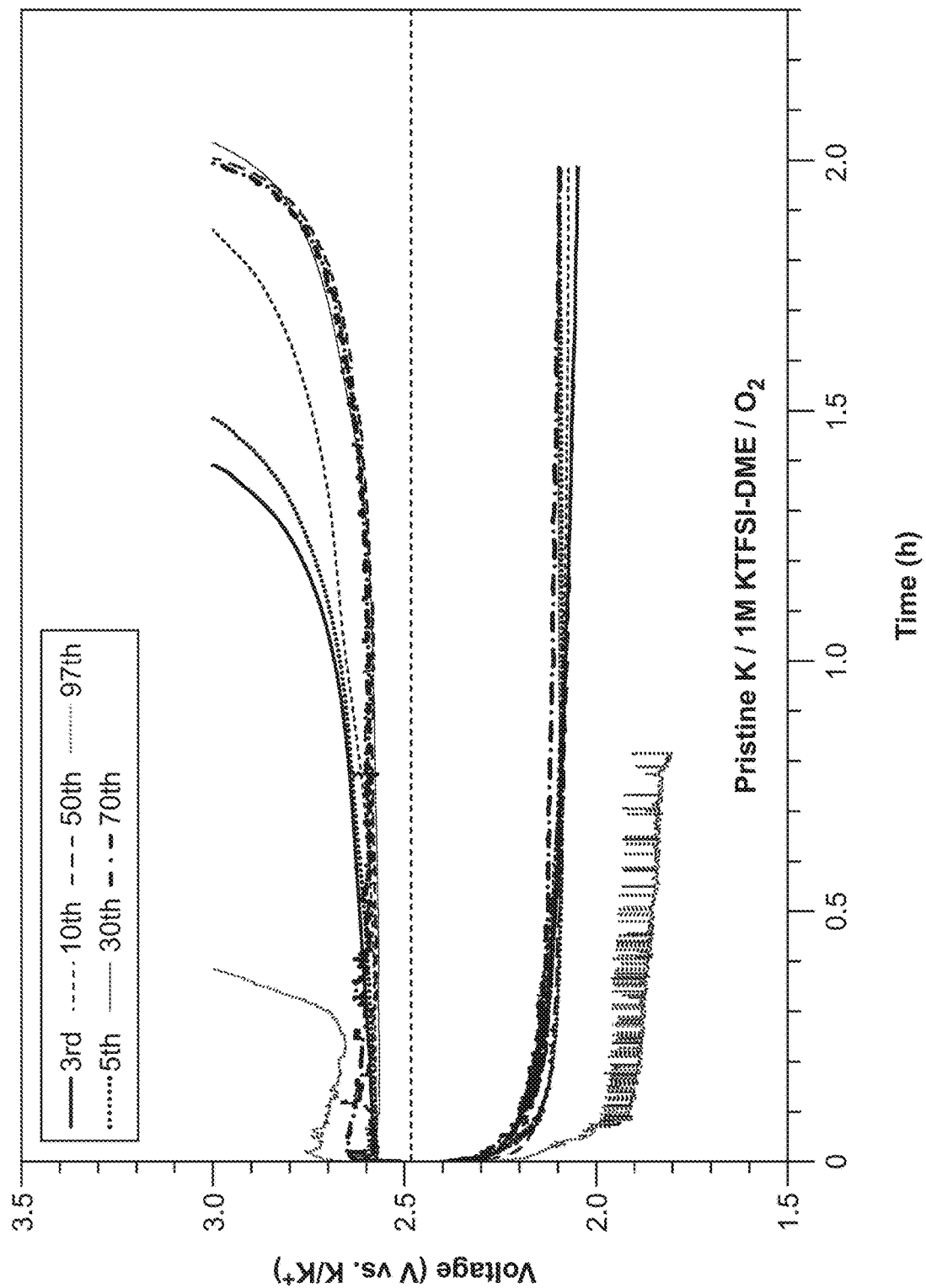
FIGS. 15A-D provide the voltage profile of a K—O$_2$ battery with 1M KTFSI-DME electrolyte (pristine K metal anode, current=50 µA) (FIG. 15A); K plating and stripping with 1M KTFSI-DME electrolyte in K/Cu cell (current=100 µA) (FIG. 15B); SEM analysis on the surface morphology of plated K in KTFSI-DME electrolyte (FIG. 15C); and an SEM analysis showing the growth of K dendrite.
Figure 15B:
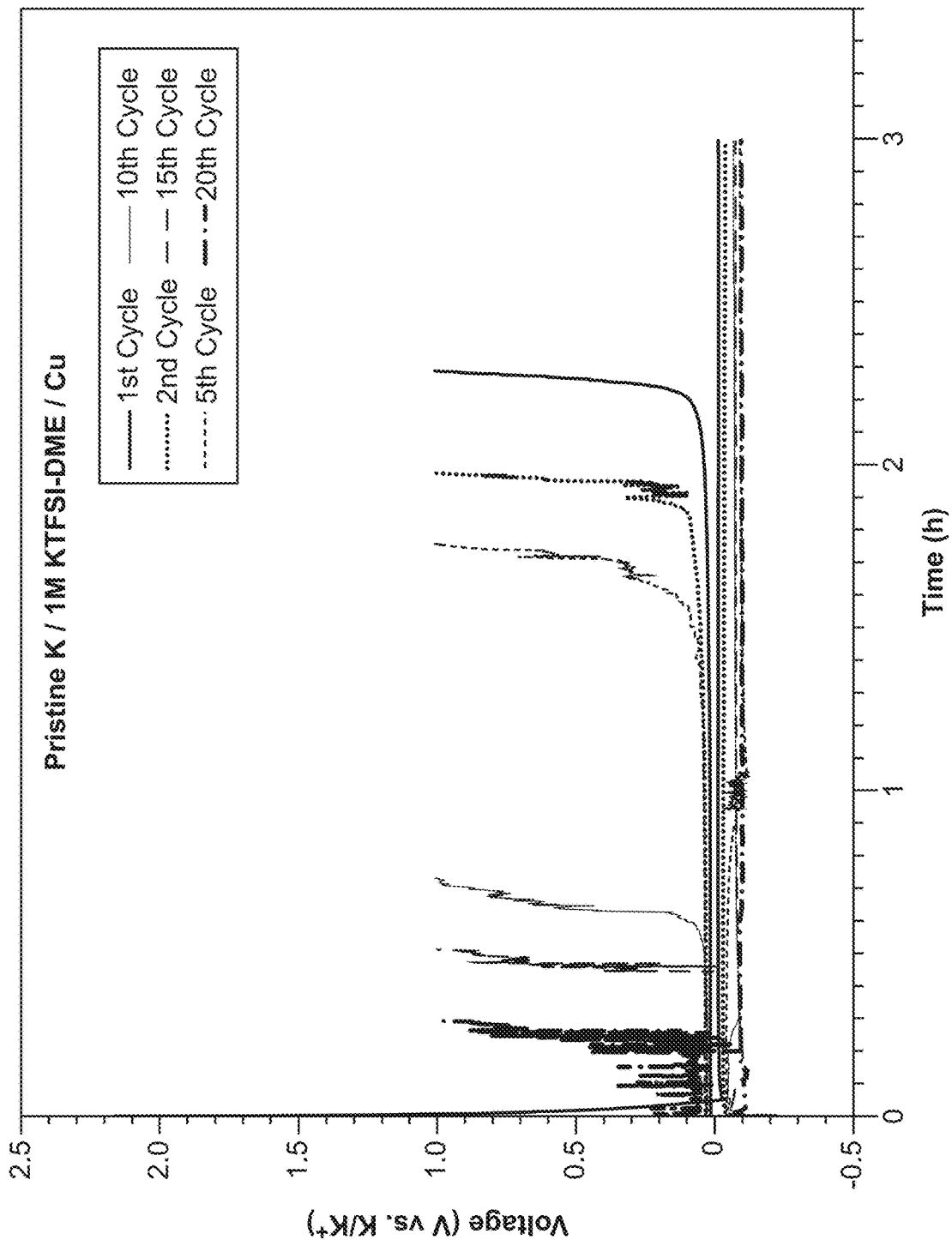
Figure 15C:
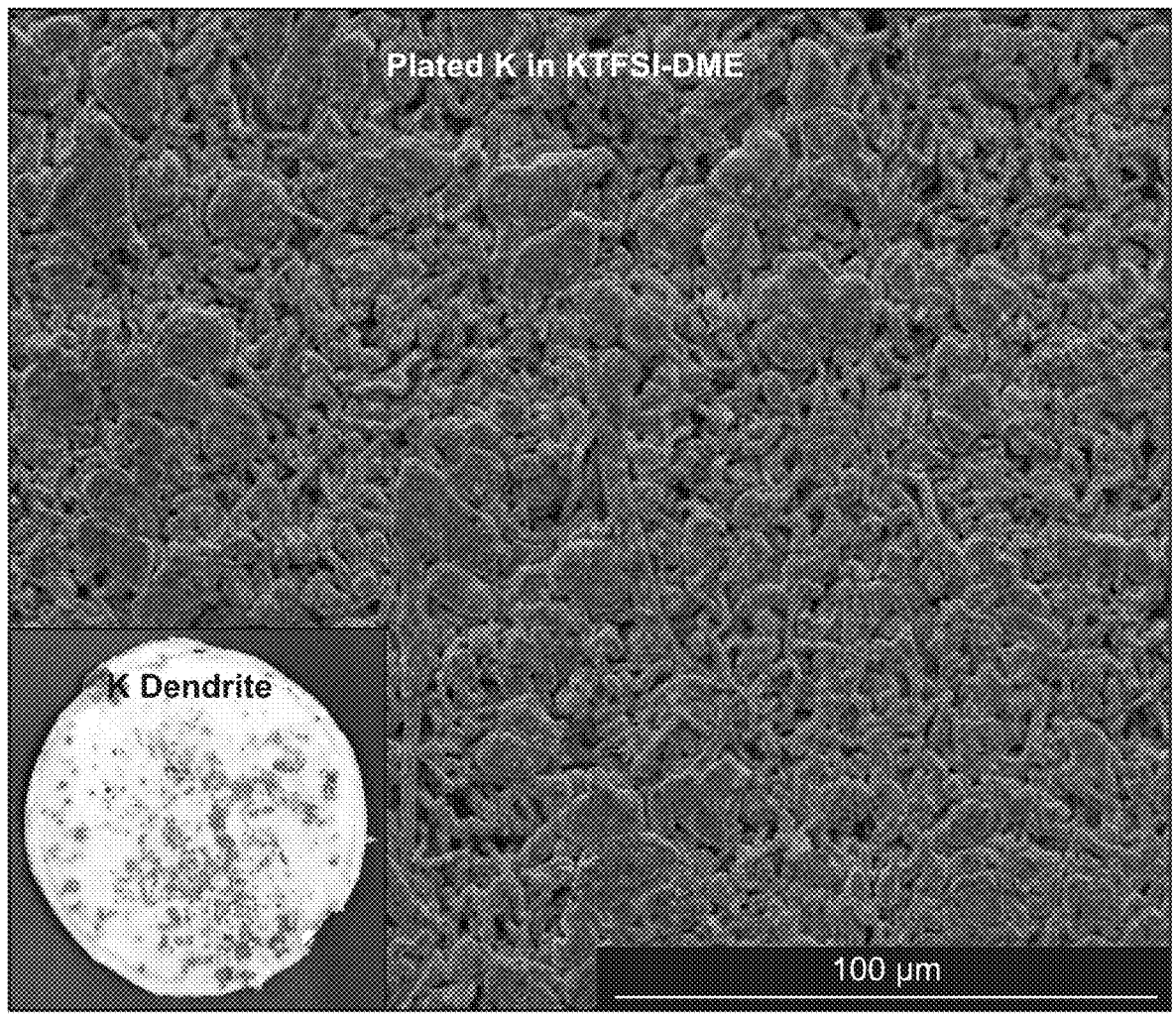
Figure 15D:
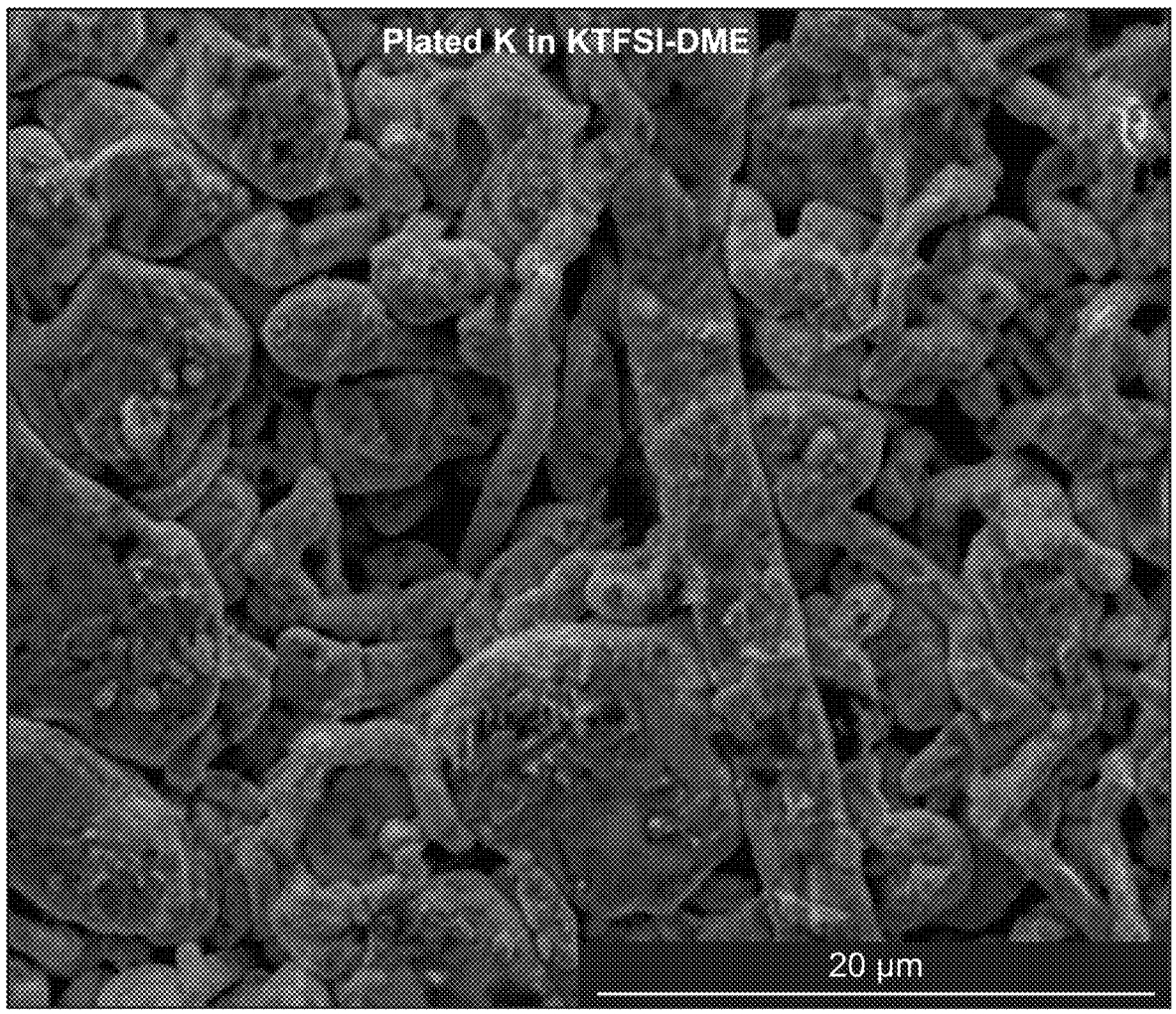

A KTFSI-DME electrolyte renders decent cyclability when applied in K—O$_2$ batteries utilizing commercially obtained potassium metal as the anode (FIG. 15A). No reaction was observed by mixing KTFSI salt with KO$_2$ or KOH, implying a better chemical stability in the presence of nucleophiles due to the stronger C—F bond. However, a large discharge overpotential is induced due to the low K$^+$ conductivity of the anode SEI.[109] Furthermore, electrochemically plating K in KTFSI-DME electrolyte resulted in a mossy deposition pattern (FIGS. 15C-D) and potentially dendrite growth, while FRI$^-$ anions lead to dendrite-free compact K deposition.[107] When cycling K/Cu half-cells in KTFSI-DME electrolyte, the reversibility of K plating and stripping is hindered due to the formation of a detrimental SEI (decreasing CE) as evidenced in FIG. 15B. This trend is in accordance with the observation for Na plating and stripping in NaTFSI-glyme electrolyte studied by Tarascon et al. and Cui et al.[122,123] The chemical difference of the SEI is further related to the reduction of anions on the K metal surface.[107,109] The weak N—S bond in TFSI$^-$ anions is cleaved, which leads to a KF-lean SEI,[124] while the reduction of FSI$^-$ anions occur via breaking the S—F bond as well as the N—S bond and that results in fluoride-abundant fragments.[116] Owing to the low solubility (in DME),[102] good chemical stability, and mechanical strength of alkali metal fluorides,[125] the KF-rich SEI in an anode of the present technology is expected to reduce electrolyte decomposition and suppress K dendrite formation.

Figure 16:
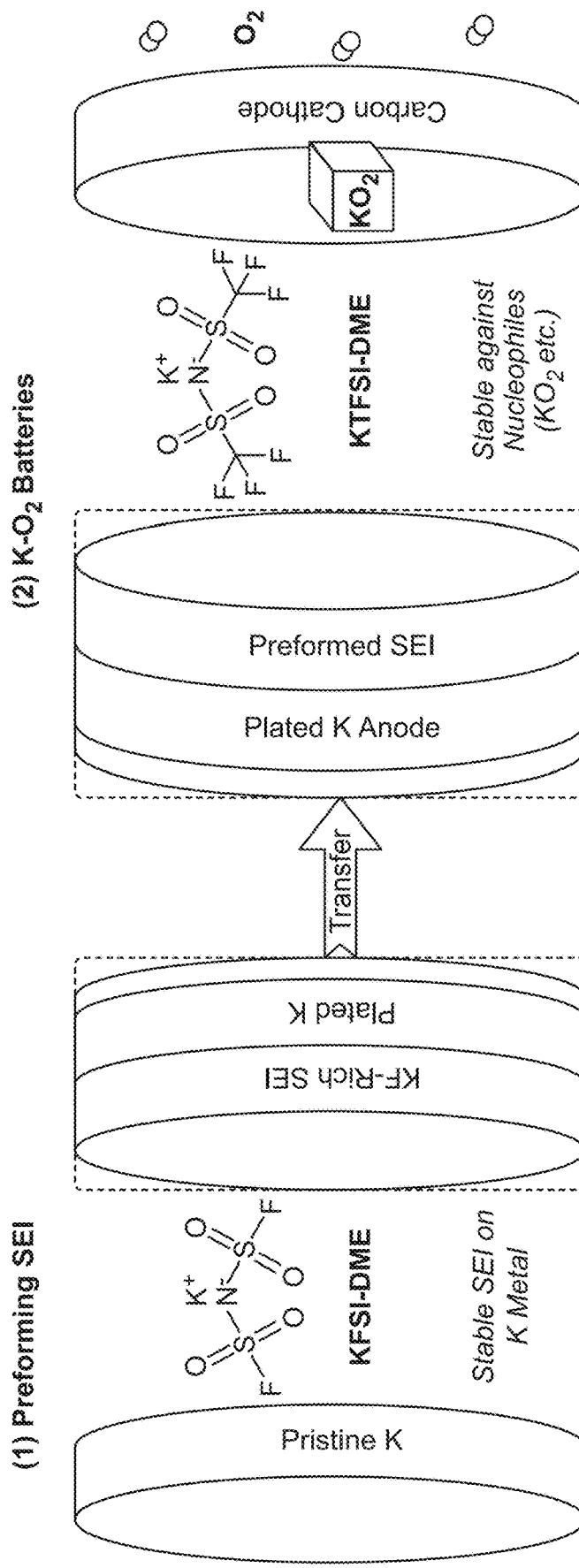
FIG. 16 illustrates a non-limiting representative embodiment of a two-step strategy to enhance K anode reversibility while maintaining electrolyte stability in K—O$_2$ batteries.

The strength of chemical bonds in the salt anion turns out to be a double-edged sword. On one hand, the cleavage of S—F bond in FSI favors the formation of a stable SEI on the K anode. On the other hand, the electrolyte stability in the presence of KO$_2$ relies on strong bond strength. It is challenging to have one salt meet both requirements. For that reason, a two-step strategy that aims to enhance K anode reversibility while maintaining anion stability was envisioned, wherein an embodiment is illustrated in FIG. 16. In such an embodiment, the first step is to use the KFSI electrolyte in a Cu/K cell to establish a stable SEI via cycling and plating a K film onto the Cu foil. This K film with the preformed SEI is then transferred into a K—O$_2$ full cell with the KTFSI electrolyte. In this way, we combine the advantage of KFSI, to form a stable SEI on the K metal, and the advantage of KTFSI for its stability with KO$_2$.

Figure 17A:
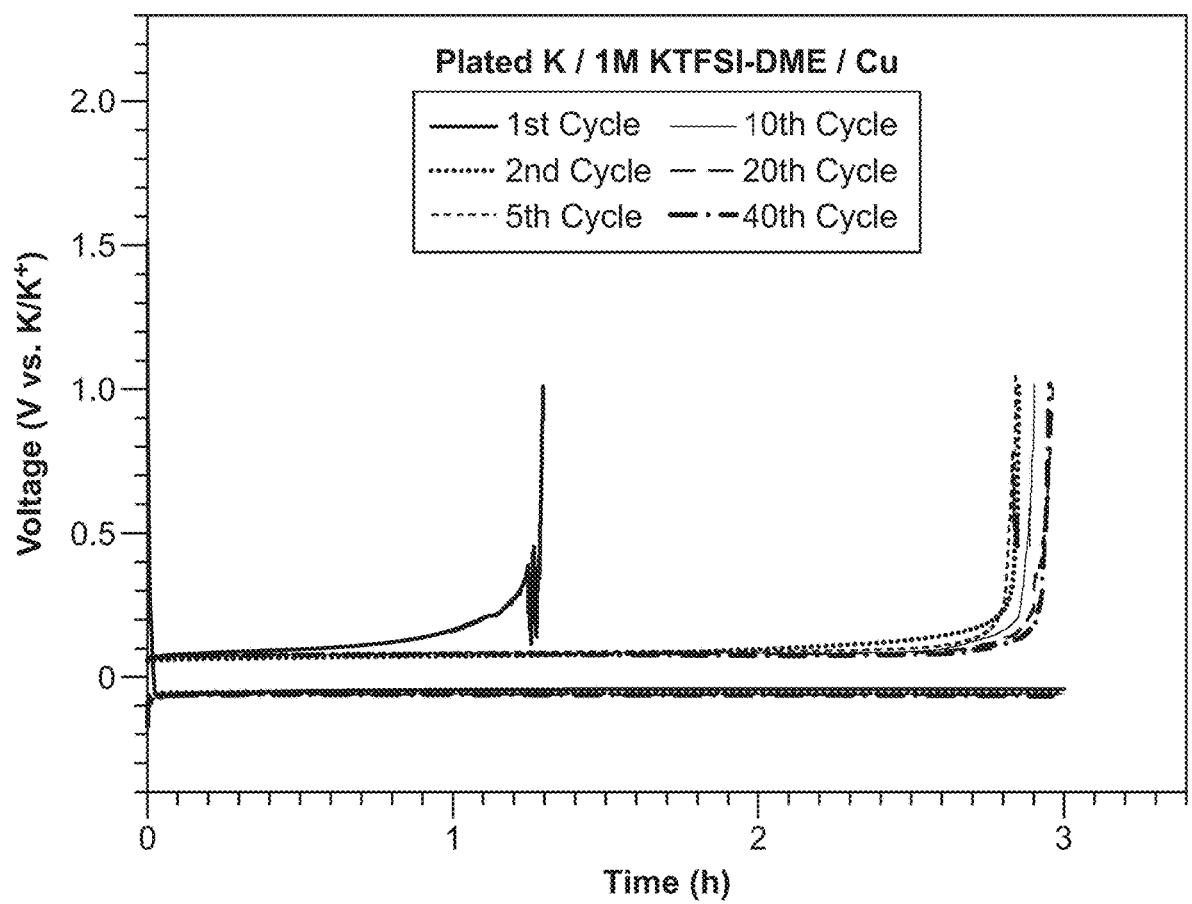
FIG. 17A provides the voltage profiles of a K—O$_2$ battery with 1M KTFSI-DME electrolyte using a electrochemically plated K anode with preformed SEI (current=100 µA) showing enhanced K plating and stripping reversibility.
Figure 17B:
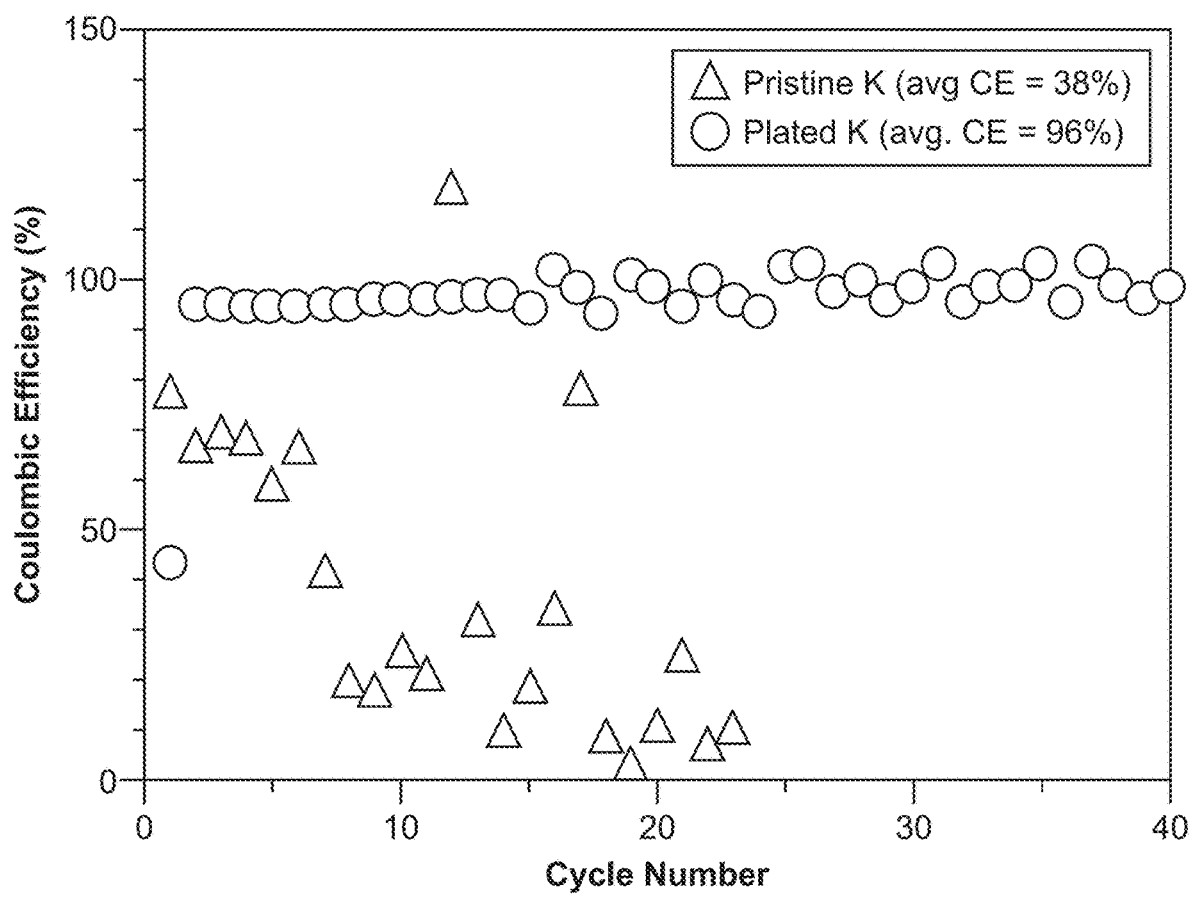
FIG. 17B provides a comparison of K anode reversibility of pristine and plated K anodes in K/Cu cells.

As shown in FIGS. 17A-B, the electrochemically plated K anode with preformed SEI exhibits significantly enhanced plating and stripping efficiency in KTFSI-DME electrolyte (avg. CE=96% vs. 38% with pristine K). Such improvement clearly verifies that the FSI$^-$ anion is a better SEI-precursor on the surface of bulk K metal compared to the TFSI$^-$ anion. The preformed SEI in KFSI-DME electrolyte stabilizes the K metal anode and improves its cycling reversibility.

Figure 18A:
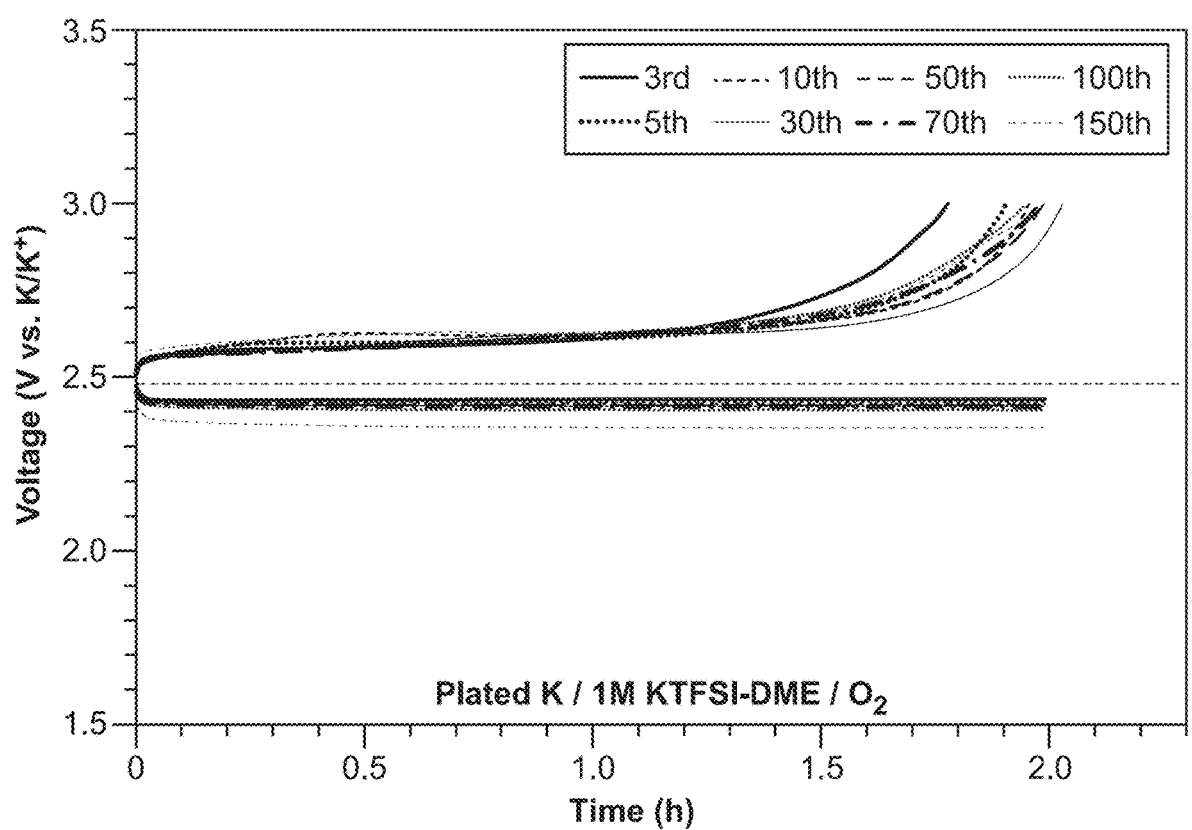
FIG. 18A provides the voltage profiles of a K—O$_2$ cell with plated K anode in 1M KTFSI-DME electrolyte (current=50 µA) where the dotted line indicates the E°=2.48 V.

To further prove the strategy in K—O$_2$ full cells, the voltage profiles and cycling performance of K—O$_2$ cells with a pristine K anode and a plated K anode in KTFSI-DME electrolyte are compared in FIG. 15A and FIG. 18A, respectively. In FIG. 15a, the K—O$_2$ cell using pristine K metal resulted in a large and asymmetric overpotential (ca.

Figure 18B:
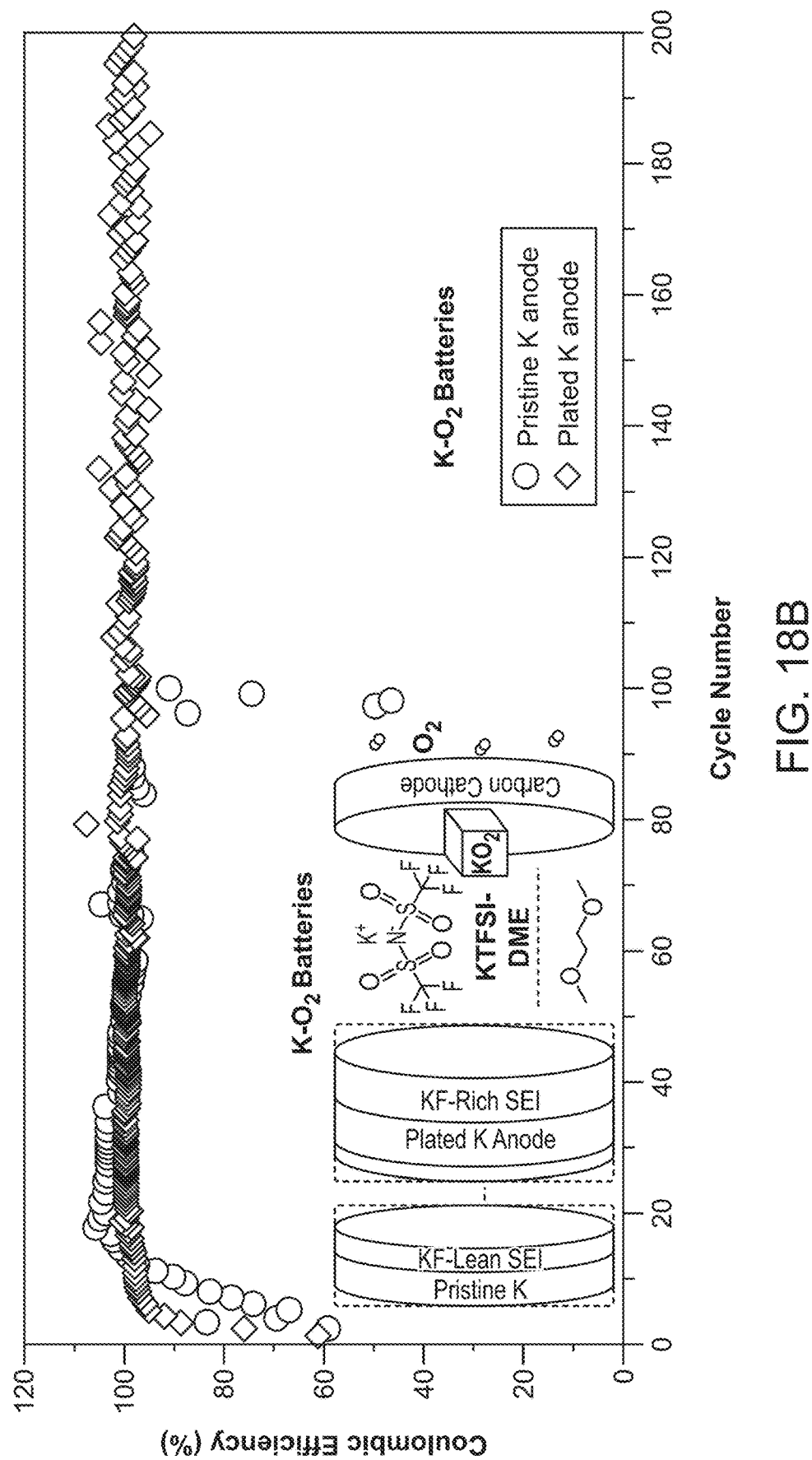
FIG. 18B provides a comparison of the cycling performance of K—O$_2$ cells with either pristine or plated K metal anodes.

0.4 V), as presented in our prior report, due to the 'impermeable' surface layer formed in KTFSI-DME electrolyte.[109] The cell failed before 100 cycles with a sudden increase in voltage fluctuation and overpotential. In contrast, the plated K anode in FIGS. 18A-B endows a significantly reduced overpotential (<0.2 V) and steadily cycled over 200 cycles (>800 hours, CE maintained ~100%) owing to the preformed KF-rich SEI. This two-step strategy has demonstrated great potential to achieve stabilized and reversible K metal anode while maintaining the superoxide stability for long cycle-life K—$O_2$ batteries. The electrolyte chemistry gained will also guide the development of electrolyte formulations and artificial SEI in the future.

In summary, this work reveals both beneficial and detrimental parasitic chemistry of $FSI^-$ anions in K—$O_2$ batteries. On one hand, the cleavage of S—F bond on K metal anode forms a compact KF-rich SEI, which leads to reversible K plating and stripping. On the other hand, the weak S—F bond makes $FSI^-$ anions vulnerable towards the nucleophilic attack from $O_2^-$ and/or $OH^-$ in K—$O_2$ batteries. A two-step strategy is demonstrated to circumvent the electrolyte decomposition and achieve reversible K metal anode and stable $KO_2$ cathode for long cycle-life K—$O_2$ batteries.

REFERENCES (1) Eftekhari, A.; Jian, Z.; Ji, X. *ACS Appl. Mater. Interfaces* 2017, 9 (5), 4404.
(2) Ren, X.; Wu, Y. *J. Am. Chem. Soc.* 2013, 135 (8), 2923.
(3) Ren, X.; He, M.; Xiao, N.; Mcculloch, W. D.; Wu, Y. *Adv. Energy Mater.* 2017, 7 (1), DOI: 10.1002/aenm.201601080.
(4) Zhao, Q.; Hu, Y.; Zhang, K.; Chen, J. *Inorg. Chem.* 2014, 53 (17), 9000.
(5) Lu, X.; Bowden, M. E.; Sprenkle, V. L.; Liu, J. *Adv. Mater.* 2015, 27 (39), 5915.
(6) Zhang, C.; Xu, Y.; Zhou, M.; Liang, L.; Dong, H.; Wu, M. *Adv. Funct. Mater.* 2017, 27, DOI: 10.1002/adfm.201604307.
(7) Xue, L.; Li, Y.; Gao, H.; Zhou, W.; Lu, X.; Kaveevivitchai, W.; Manthiram, A.; Goodenough, J. B. *J. Am. Chem. Soc.* 2017, 139 (6), 2164.
(8) Xiao, N.; Ren, X.; He, M.; McCulloch, W. D.; Wu, Y. *ACS Appl. Mater. Interfaces* 2017, 9 (5), 4301.
(9) McCulloch, W. D.; Ren, X.; Yu, M.; Huang, Z.; Wu, Y. *ACS Appl. Mater. Interfaces* 2015, 7 (47), 26158.
(10) Zhang, K.; Lee, G. H.; Park, M.; Li, W.; Kang, Y. M. *Adv. Energy Mater.* 2016, 6 (20), DOI: 10.1002/aenm.201600811.
(11) Lin, D.; Liu, Y.; Cui, Y. *Nat. Nanotechnol.* 2017, 12 (3), 194.
(12) Qian, J.; Henderson, W. A.; Xu, W.; Bhattacharya, P.; Engelhard, M.; Borodin, O.; Zhang, J.-G. *Nat. Commun.* 2015, 6, 6362.
(13) Zheng, J.; Engelhard, M. H.; Mei, D.; Jiao, S.; Polzin, B. J.; Zhang, J.-G.; Xu, W. *Nat. Energy* 2017, 2 (3), 17012.
(14) Seh, Z. W.; Sun, J.; Sun, Y.; Cui, Y. *ACS Cent. Sci.* 2015, 1 (8), 449.
(15) Lee, J.; Lee, Y.; Lee, J.; Lee, S.; Choi, J.; Kim, H.; Kwon, M.; Kang, K.; Lee, K. T.; Choi, N. *ACS Appl. Mater. Interfaces* 2017, 9 (4), 3723.
(16) Schafzahl, L.; Hanzu, I.; Wilkening, M.; Freunberger, S. A. *ChemSusChem* 2017, 10, 401.
(17) Cao, R.; Mishra, K.; Li, X.; Qian, J.; Engelhard, M. H.; Bowden, M. E.; Han, K. S.; Mueller, K. T.; Henderson, W. A.; Zhang, J.-G. *Nano Energy* 2016, 30, 825.
(18) Yamada, Y.; Yaegashi, M.; Abe, T.; Yamada, A. *Chem. Commun.* 2013, 49 (95), 11194.
(19) Yoshida, K.; Nakamura, M.; Kazue, Y.; Tachikawa, N.; Tsuzuki, S.; Seki, S.; Dokko, K.; Watanabe, M. *J. Am. Chem. Soc.* 2011, 133 (33), 13121.
(20) Yamada, Y.; Chiang, C. H.; Sodeyama, K.; Wang, J.; Tateyama, Y.; Yamada, A. *Chem Electro Chem* 2015, 2 (11), 1687.
(101) Ren, X.; Wu, Y. A Low-Overpotential Potassium-Oxygen Battery Based on Potassium Superoxide. *J. Am. Chem. Soc.* 2013, 135 (8), 2923-2926.
(102) Xiao, N.; Rooney, R. T.; Gewirth, A. A.; Wu, Y. The Long-Term Stability of $KO_2$ in K—$O_2$ Batteries. *Angew. Chem. Int. Ed.* 2018, 57 (5), 1227-1231.
(103) Lu, J.; Jung Lee, Y.; Luo, X.; Chun Lau, K.; Asadi, M.; Wang, H.-H.; Brombosz, S.; Wen, J.; Zhai, D.; Chen, Z.; et al. A Lithium-oxygen Battery Based on Lithium Superoxide. *Nature* 2016, 529 (7586), 377-382.
(104) Hartmann, P.; Bender, C. L.; Vračar, M.; Dürr, A. K.; Garsuch, A.; Janek, J.; Adelhelm, P. A Rechargeable Room-Temperature Sodium Superoxide (NaO2) Battery. *Nat. Mater.* 2013, 12 (3), 228-232.
(105) Black, R.; Shyamsunder, A.; Adeli, P.; Kundu, D.; Murphy, G. K.; Nazar, L. F. The Nature and Impact of Side Reactions in Glyme-Based Sodium-Oxygen Batteries. *Chem Sus Chem* 2016, 9 (14), 1795-1803.
(106) Ren, X.; Lau, K. C.; Yu, M.; Bi, X.; Kreidler, E.; Curtiss, L. A.; Wu, Y. Understanding Side Reactions in K—$O_2$ Batteries for Improved Cycle Life. *ACS Appl. Mater. Interfaces* 2014, 6 (21), 19299-19307.
(107) Xiao, N.; McCulloch, W. D.; Wu, Y. Reversible Dendrite-Free Potassium Plating and Stripping Electrochemistry for Potassium Secondary Batteries. *J. Am. Chem. Soc.* 2017, 139 (28), 9475-9478.
(108) Xiao, N.; Ren, X.; He, M.; McCulloch, W. D.; Wu, Y. Probing Mechanisms for Inverse Correlation between Rate Performance and Capacity in K—$O_2$ Batteries. *ACS Appl. Mater. Interfaces* 2017, 9 (5), 4301-4308.
(109) Ren, X.; He, M.; Xiao, N.; McCulloch, W. D.; Wu, Y. Greatly Enhanced Anode Stability in K—Oxygen Batteries with an In Situ Formed Solvent- and Oxygen-Impermeable Protection Layer. *Adv. Energy Mater.* 2017, 7 (1), DOI: 10.1002/aenm.201601080.
(110) McCulloch, W. D.; Ren, X.; Yu, M.; Huang, Z.; Wu, Y. Potassium-Ion Oxygen Battery Based on a High Capacity Antimony Anode. *ACS Appl. Mater. Interfaces* 2015, 7 (47), 26158-26166.
(111) Yu, W.; Lau, K. C.; Lei, Y.; Liu, R.; Qin, L.; Yang, W.; Li, B.; Curtiss, L. A.; Zhai, D.; Kang, F. Dendrite-Free Potassium-Oxygen Battery Based on a Liquid Alloy Anode. *ACS Appl. Mater. Interfaces* 2017, 9 (37), 31871-31878.
(112) Wang, W.; Lai, N.-C.; Liang, Z.; Wang, Y.; Lu, Y.-C. Superoxide Stabilization and a Universal $KO_2$ Growth Mechanism in Potassium-Oxygen Batteries. *Angew. Chem. Int. Ed.* 2018, DOI: 10.1002/anie.201801344.
(113) Shkrob, I. A.; Marin, T. W.; Zhu, Y.; Abraham, D. P. Why Bis(Fluorosulfonyl)Imide Is a "Magic Anion" for Electrochemistry. *J. Phys. Chem. C* 2014, 118 (34), 19661-19671.
(114) Qian, J.; Henderson, W. A.; Xu, W.; Bhattacharya, P.; Engelhard, M.; Borodin, O.; Zhang, J.-G. High Rate and Stable Cycling of Lithium Metal Anode. *Nat. Commun.* 2015, 6, 6362.

(115) Wang, J.; Yamada, Y.; Sodeyama, K.; Chiang, C. H.; Tateyama, Y.; Yamada, A. Superconcentrated Electrolytes for a High-Voltage Lithium-Ion Battery. *Nat. Commun.* 2016, 7, 12032.

(116) Basile, A.; Bhatt, A. I.; O'Mullane, A. P. Stabilizing Lithium Metal Using Ionic Liquids for Long-Lived Batteries. *Nat. Commun.* 2016, 7, 11794.

(117) Fan, X.; Chen, L.; Ji, X.; Deng, T.; Hou, S.; Chen, J.; Zheng, J.; Wang, F.; Jiang, J.; Xu, K.; et al. Highly Fluorinated Interphases Enable High-Voltage Li-Metal Batteries. *Chem* 2018, 4 (1), 174-185.

(118) Philippe, B.; Dedryvère, R.; Gorgoi, M.; Rensmo, H.; Gonbeau, D.; Edström, K. Improved Performances of Nanosilicon Electrodes Using the Salt LiFSI: A Photoelectron Spectroscopy Study. *J. Am. Chem. Soc.* 2013, 135 (26), 9829-9842.

(119) Lang, S.-Y.; Shi, Y.; Guo, Y.-G.; Wen, R.; Wan, L.-J. High-Temperature Formation of a Functional Film at the Cathode/Electrolyte Interface in Lithium-Sulfur Batteries: An In Situ AFM Study. *Angew. Chem. Int. Ed.* 2017, 56 (46), 14433-14437.

(120) Cuisinier, M.; Hart, C.; Balasubramanian, M.; Garsuch, A.; Nazar, L. F. Radical or Not Radical: Revisiting Lithium-Sulfur Electrochemistry in Nonaqueous Electrolytes. *Adv. Energy Mater.* 2015, 5 (16), 1401801.

(121) Johnson, R. A.; Nidy, E. G.; Merritt, M. V. Superoxide Chemistry. Reactions of Superoxide with Alkyl Halides and Alkyl Sulfonate Esters. *J. Am. Chem. Soc.* 1978, 100 (25), 7960-7966.

(122) Lutz, L.; Alves Dalla Corte, D.; Tang, M.; Salager, E.; Deschamps, M.; Grimaud, A.; Johnson, L.; Bruce, P. G.; Tarascon, J.-M. Role of Electrolyte Anions in the Na—$O_2$ Battery: Implications for $NaO_2$ Solvation and the Stability of the Sodium Solid Electrolyte Interphase in Glyme Ethers. *Chem. Mater.* 2017, 29 (14), 6066-6075.

(123) Seh, Z. W.; Sun, J.; Sun, Y.; Cui, Y. A Highly Reversible Room-Temperature Sodium Metal Anode. *ACS Cent. Sci.* 2015, 1 (8), 449-455.

(124) Girard, G. M. A.; Hilder, M.; Dupre, N.; Guyomard, D.; Nucciarone, D.; Whitbread, K.; Zavorine, S.; Moser, M.; Forsyth, M.; MacFarlane, D. R.; et al. Spectroscopic Characterization of the SEI Layer Formed on Lithium Metal Electrodes in Phosphonium Bis(Fluorosulfonyl) Imide Ionic Liquid Electrolytes. *ACS Appl. Mater. Interfaces* 2018, 10 (7), 6719-6729.

(125) Zhao, J.; Liao, L.; Shi, F.; Lei, T.; Chen, G.; Pei, A.; Sun, J.; Yan, K.; Zhou, G.; Xie, J.; et al. Surface Fluorination of Reactive Battery Anode Materials for Enhanced Stability. *J. Am. Chem. Soc.* 2017,139 (33), 11550-11558.

While certain embodiments have been illustrated and described, a person with ordinary skill in the art, after reading the foregoing specification, can effect changes, substitutions of equivalents and other types of alterations to the batteries and compounds of the present technology as set forth herein. Each aspect and embodiment described above can also have included or incorporated therewith such variations or aspects as disclosed in regard to any or all of the other aspects and embodiments.

The present technology is also not to be limited in terms of the particular aspects described herein, which are intended as single illustrations of individual aspects of the present technology. Many modifications and variations of this present technology can be made without departing from its spirit and scope, as will be apparent to those skilled in the art. Functionally equivalent methods within the scope of the present technology, in addition to those enumerated herein, will be apparent to those skilled in the art from the foregoing descriptions. Such modifications and variations are intended to fall within the scope of the appended claims. It is to be understood that this present technology is not limited to particular methods, reagents, compounds, compositions, labeled compounds or biological systems, which can, of course, vary. It is also to be understood that the terminology used herein is for the purpose of describing particular aspects only, and is not intended to be limiting. Thus, it is intended that the specification be considered as exemplary only with the breadth, scope and spirit of the present technology indicated only by the appended claims, definitions therein and any equivalents thereof.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

In addition, where features or aspects of the disclosure are described in terms of Markush groups, those skilled in the art will recognize that the disclosure is also thereby described in terms of any individual member or subgroup of members of the Markush group. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents (for example, journals, articles and/or textbooks) referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present technology may include, but is not limited to, the features and combinations of features recited in the following lettered paragraphs, it being understood that the following paragraphs should not be interpreted as limiting the scope of the claims as appended hereto or mandating that all such features must necessarily be included in such claims:

A. A battery comprising
  a cathode;
  an anode comprising potassium metal;
  a non-aqueous electrolyte comprising potassium bis(fluorosulfonyl)imide (KFSI) and a solvent;
  wherein the solvent comprises dimethoxyethane, digylme, triglyme, tetraglyme, dimethylsulfoxide, or a mixture of any two or more thereof.

B. The battery of Paragraph A, wherein the cathode comprises a potassium-containing positive electroactive material.

C. The battery of Paragraph A or Paragraph B, wherein the cathode comprises a potassium-containing olivine-based material, a fluorinated olivine-based material, a potassium-containing iron-cyano complex, a potassium-containing transition metal oxide, a potassium-containing transition metal sulfide, a potassium-containing transition metal halide, or a combination of any two or more thereof.

D. The battery of any one of Paragraphs A-C, wherein the cathode is an air cathode.

E. The battery of Paragraph D, wherein the air cathode comprises a porous carbon material.

F. The battery of Paragraph D or Paragraph E, wherein the air cathode further comprises a metal oxide.

G. The battery of Paragraph D or Paragraph E, wherein the air cathode is substantially free of a metal-based catalyst for promoting the reaction of air with the potassium metal and/or for promoting the decomposition of the discharged product back to its original state.

H. The battery of any one of Paragraphs D-E and G, wherein the air cathode is free of a metal-based catalyst for promoting the reaction of air with the potassium metal and/or for promoting the decomposition of the discharged product back to its original state.

I. The battery of any one of Paragraphs A-H, wherein the cathode further comprises a binder.

J. The battery of any one of Paragraphs A-I, wherein the KFSI is at a concentration in the solvent of about 0.05 M to about 1.0 M.

K. The battery of any one of Paragraphs A-J, wherein the electrolyte is substantially free of potassium salts that are not KFSI prior to initial discharge.

L. The battery of any one of Paragraphs A-K, wherein the potassium metal comprises about 10 ppm to about 500 ppm of one or more of Al, Ba, Be, B, Ca, Cr, Co, Cu, Fe, Pb, Mg, Mn, Mo, Ni, Si, Ag, Na, Sr, Sn, Ti, and V.

M. The battery of any one of Paragraphs A-L, wherein the potassium metal comprises about 100 ppm to about 500 ppm of one or more of Ca, Si, and Na.

N. The battery of any one of Paragraphs A-M, wherein the potassium metal comprises about 100 ppm to about 500 ppm of Na.

O. The battery of any one of Paragraphs A-N, wherein the potassium metal comprises about 100 ppm to about 3000 ppm of O prior to initial discharge.

P. A battery comprising
  a cathode;
  an anode comprising potassium metal;
  a first non-aqueous electrolyte comprising a potassium salt and a first solvent;
  wherein
    the potassium metal is provided by electrodeposition of potassium ions in a second non-aqueous electrolyte comprising potassium bis(fluorosulfonyl)imide (KFSI) and a second solvent.

Q. The battery of Paragraph P, wherein the first non-aqueous electrolyte comprises less than 0.01M KFSI.

R. The battery of Paragraph P or Paragraph Q, wherein the first non-aqueous electrolyte is substantially free of KFSI.

S. The battery of any one of Paragraphs P-R, wherein the first non-aqueous electrolyte does not comprise KFSI.

T. The battery of any one of Paragraphs P-S, wherein the first solvent comprises dimethoxyethane, digylme, triglyme, tetraglyme, or a mixture of any two or more thereof.

U. The battery of any one of Paragraphs P-T, wherein the second solvent comprises dimethoxyethane, digylme, triglyme, tetraglyme, or a mixture of any two or more thereof.

V. The battery of any one of Paragraphs P-U, wherein the cathode comprises a potassium-containing positive electroactive material.

W. The battery of any one of Paragraphs P-V, wherein the cathode comprises a potassium-containing olivine-based material, a fluorinated olivine-based material, a potassium-containing iron-cyano complex, a potassium-containing transition metal oxide, a potassium-containing transition metal sulfide, a potassium-containing transition metal halide, or a combination of any two or more thereof.

X. The battery of any one of Paragraphs P-W, wherein the cathode is an air cathode.

Y. The battery of Paragraph X, wherein the air cathode comprises a porous carbon material.

Z. The battery of Paragraph X or Paragraph Y, wherein the air cathode further comprises a metal oxide.

AA. The battery of Paragraph X or Paragraph Y, wherein the air cathode is substantially free of a metal-based catalyst (e.g., for promoting the reaction of air with the potassium metal and/or for promoting the decomposition of the discharged product back to its original state).

AB. The battery of any one of Paragraphs X-Y and AA, wherein the air cathode is free of a metal-based catalyst (e.g., for promoting the reaction of air with the potassium metal and/or for promoting the decomposition of the discharged product back to its original state).

AC. The battery of any one of Paragraphs P-AB, wherein the cathode further comprises a binder.

AD. The battery of any one of Paragraphs P-AC, wherein the potassium salt comprises bis(trifluoromethanesulfonyl)imide (KTFSI).

AE. The battery of any one of Paragraphs P-AD, wherein the potassium salt comprises bis(trifluoromethanesulfonyl)imide (KTFSI), and wherein the KTFSI is at a concentration in the first non-aqueous electrolyte of about 0.3 M to about 1.0 M.

AF. The battery of any one of Paragraphs P-AE, wherein the first non-aqueous electrolyte is substantially free of potassium salts that are not KTFSI prior to initial discharge.

AG. The battery of any one of Paragraphs P-AF, wherein the second solvent comprises dimethoxyethane, digylme, triglyme, tetraglyme, or a mixture of any two or more thereof.

AH. The battery of any one of Paragraphs P-AG, wherein the second non-aqueous electrolyte is substantially free of potassium salts that are not KFSI prior to electrodeposition.

AI. An anode for a battery comprising potassium metal that is provided by electrodeposition of potassium ions in a non-aqueous electrolyte comprising potassium bis(fluorosulfonyl)imide (KFSI) and a solvent.

AJ. The anode of Paragraph AI, wherein the solvent comprises dimethoxyethane, digylme, triglyme, tetraglyme, or a mixture of any two or more thereof.

AK. The anode of Paragraph AI or Paragraph AJ, wherein the non-aqueous electrolyte is substantially free of potassium salts that are not KFSI prior to electrodeposition.

Other embodiments are set forth in the following claims, along with the full scope of equivalents to which such claims are entitled.

What is claimed is:

1. A battery comprising
    a cathode;
    an anode comprising potassium metal; and
    a first non-aqueous electrolyte comprising bis(trifluoromethanesulfonyl)imide (KTFSI) and a first solvent, wherein the KTFSI is at a concentration in the first non-aqueous electrolyte of about 0.3 M to about 1.0 M;
    wherein
        the potassium metal is provided by electrodeposition of potassium ions in a second non-aqueous electrolyte comprising potassium bis(fluorosulfonyl)imide (KFSI) and a second solvent comprising dimethoxyethane.

2. The battery of claim 1, wherein the first non-aqueous electrolyte comprises less than 0.01M KFSI.

3. The battery of claim 1, wherein the first solvent comprises dimethoxyethane, digylme, triglyme, tetraglyme, or a mixture of any two or more thereof.

4. The battery of claim 1, wherein the cathode comprises a potassium-containing positive electroactive material.

5. The battery of claim 1, wherein the cathode comprises a potassium-containing olivine-based material, a fluorinated olivine-based material, a potassium-containing iron-cyano complex, a potassium-containing transition metal oxide, a potassium-containing transition metal sulfide, a potassium-containing transition metal halide, or a combination of any two or more thereof.

6. The battery of claim 1, wherein the cathode is an air cathode.

7. The battery of claim 6, wherein the air cathode comprises a porous carbon material.

8. The battery of claim 6, wherein the air cathode further comprises a metal oxide.

9. The battery of claim 6, wherein the cathode further comprises a binder.

10. An anode for a battery comprising potassium metal that is provided by electrodeposition of potassium ions in a non-aqueous electrolyte comprising potassium bis(fluorosulfonyl)imide (KFSI) and a solvent comprising dimethoxyethane, wherein the KFSI is at a concentration in the non-aqueous electrolyte of about 0.9 M to about 10 M.

11. The anode of claim 10, wherein the non-aqueous electrolyte is substantially free of potassium salts that are not KFSI prior to electrodeposition.

12. The battery of claim 1, wherein the second non-aqueous electrolyte is substantially free of potassium salts that are not KFSI prior to electrodeposition.

13. The battery of claim 1, wherein the first non-aqueous electrolyte is substantially free of potassium salts that are not KTFSI prior to initial discharge.

14. The battery of claim 1, wherein the KFSI is at a concentration in the second non-aqueous electrolyte of about 0.9 M to about 10 M.

* * * * *